United States Patent
Kovalev et al.

(10) Patent No.: US 12,155,067 B2
(45) Date of Patent: *Nov. 26, 2024

(54) ELECTROCHEMICAL CELLS AND/OR COMPONENTS THEREOF COMPRISING NITROGEN-CONTAINING SPECIES, AND METHODS OF FORMING THEM

(71) Applicant: Sion Power Corporation, Tucson, AZ (US)

(72) Inventors: Igor P. Kovalev, Vail, AZ (US); Yuriy V. Mikhaylik, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,454

(22) Filed: Apr. 26, 2023

(65) Prior Publication Data

US 2023/0261182 A1 Aug. 17, 2023

Related U.S. Application Data

(63) Continuation of application No. 17/492,063, filed on Oct. 1, 2021, now Pat. No. 11,705,554.

(60) Provisional application No. 63/089,862, filed on Oct. 9, 2020.

(51) Int. Cl.
*H01M 4/38* (2006.01)
*H01M 4/04* (2006.01)
*H01M 4/36* (2006.01)
*H01M 10/0525* (2010.01)

(52) U.S. Cl.
CPC ......... *H01M 4/382* (2013.01); *H01M 4/0407* (2013.01); *H01M 4/0471* (2013.01); *H01M 4/366* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 4,664,991 A | 5/1987 | Perichaud et al. |
| 4,739,018 A | 4/1988 | Armand et al. |
| 4,833,048 A | 5/1989 | Dejonghe et al. |
| 4,917,974 A | 4/1990 | De Jonghe et al. |
| 5,162,175 A | 11/1992 | Visco et al. |
| 5,324,599 A | 6/1994 | Oyama et al. |
| 5,441,831 A | 8/1995 | Okamoto et al. |
| 5,516,598 A | 5/1996 | Visco et al. |
| 5,529,860 A | 6/1996 | Skotheim et al. |
| 5,601,947 A | 2/1997 | Skotheim et al. |
| 5,648,187 A | 7/1997 | Skotheim |
| 5,690,702 A | 11/1997 | Skotheim et al. |
| 5,723,230 A | 3/1998 | Naoi et al. |
| 5,783,330 A | 7/1998 | Naoi et al. |
| 5,792,575 A | 8/1998 | Naoi et al. |
| 5,882,819 A | 3/1999 | Naoi et al. |
| 5,919,587 A | 7/1999 | Mukherjee et al. |
| 5,961,672 A | 10/1999 | Skotheim et al. |
| 6,117,590 A | 9/2000 | Skotheim et al. |
| 6,201,100 B1 | 3/2001 | Gorkovenko et al. |
| 6,238,821 B1 | 5/2001 | Mukherjee et al. |
| 6,733,924 B1 | 5/2004 | Skotheim et al. |
| 6,797,428 B1 | 9/2004 | Skotheim et al. |
| 6,936,381 B2 | 8/2005 | Skotheim et al. |
| 7,247,408 B2 | 7/2007 | Skotheim et al. |
| 7,688,075 B2 | 3/2010 | Kelley et al. |
| 7,771,870 B2 | 8/2010 | Affinito et al. |
| 7,785,730 B2 | 8/2010 | Affinito et al. |
| 7,939,198 B2 | 5/2011 | Mukherjee et al. |
| 8,076,024 B2 | 12/2011 | Affinito et al. |
| 8,084,102 B2 | 12/2011 | Affinito |
| 8,087,309 B2 | 1/2012 | Kelley et al. |
| 8,105,717 B2 | 1/2012 | Skotheim et al. |
| 8,197,971 B2 | 6/2012 | Skotheim et al. |
| 8,264,205 B2 | 9/2012 | Kopera |
| 8,338,034 B2 | 12/2012 | Affinito et al. |
| 8,415,054 B2 | 4/2013 | Skotheim et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |

(Continued)

FOREIGN PATENT DOCUMENTS

| | | | | |
|---|---|---|---|---|
| CN | 101188312 | * | 10/2007 | ............ H01M 10/40 |
| CN | 101188312 A | | 5/2008 | |

(Continued)

OTHER PUBLICATIONS

M. Wu, Z. Wen, J. Jin, Y. Cui. Effects of combinatorial AlCl3 and pyrrole on the SEI formation and electrochemical performance of Li electrode, Electrochimica Acta 103,199-205. (Year: 2013).*
International Search Report and Written Opinion for International Application No. PCT/US2021/053089 mailed Jan. 25, 2022.
[No Author Listed], Electrophilic aromatic directing groups. Wikipedia. Sep. 18, 2021. https://en.wikipedia.org/wiki/Electrophilic_aromatic_ directing_groups [last accessed Nov. 19, 2021]. 11 pages.
Egashira et al., Lithium-ion Capacitor Using Lithium Triazolate as Electrolyte Salt. 214th ECS Meeting. The Electrochemical Society. Oct. 12-17, 2008:1 page.
Henderson, Nonaqueous Electrolytes: Advances in Lithium Salts. In: Electrolytes for Lithium and Lithium-Ion Batteries. 2014. Jow et al., Eds. Chapter 1:1-92.
Masciocchi et al., Synthesis and characterization of two polymorphic crystalline phases and an amorphous powder of nickel(II) bisimidazolate. Inorg Chem. Sep. 22, 2003;42(19):6147-52. doi: 10.1021/ic0346190.

(Continued)

*Primary Examiner* — Carlos Barcena
(74) *Attorney, Agent, or Firm* — Wolf, Greenfield & Sacks, P.C.

(57) ABSTRACT

Articles and methods related to electrochemical cells and/or electrochemical cell components (such as electrodes) comprising species comprising a conjugated, negatively-charged ring comprising a nitrogen atom and/or reaction products of such species are generally provided. The electrochemical cell may comprise an electrode (e.g., a cathode) comprising a protective layer comprising a species comprising a conjugated, negatively-charged ring comprising a nitrogen atom and/or a reaction product thereof.

20 Claims, 4 Drawing Sheets

(56) References Cited

U.S. PATENT DOCUMENTS

| | | |
|---|---|---|
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Safont-Sempere et al. |
| 9,005,809 B2 | 4/2015 | Wilkening et al. |
| 9,034,421 B2 | 5/2015 | Mikhaylik et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,077,041 B2 | 7/2015 | Burnside et al. |
| 9,105,938 B2 | 8/2015 | Scordilis-Kelley et al. |
| 9,214,678 B2 | 12/2015 | Mikhaylik |
| 9,397,342 B2 | 7/2016 | Skotheim et al. |
| 9,419,274 B2 | 8/2016 | Wilkening et al. |
| 9,490,478 B2 | 11/2016 | Mikhaylik et al. |
| 9,531,009 B2 | 12/2016 | Kumaresan et al. |
| 9,548,492 B2 | 1/2017 | Affinito et al. |
| 9,559,348 B2 | 1/2017 | Kumaresan et al. |
| 9,577,243 B2 | 2/2017 | Schmidt et al. |
| 9,577,267 B2 | 2/2017 | Scordilis-Kelley et al. |
| 9,653,735 B2 | 5/2017 | Skotheim et al. |
| 9,653,750 B2 | 5/2017 | Laramie et al. |
| 9,711,784 B2 | 7/2017 | Kelley et al. |
| 9,728,768 B2 | 8/2017 | Mikhaylik et al. |
| 9,735,411 B2 | 8/2017 | Viner et al. |
| 9,755,268 B2 | 9/2017 | Fleischmann et al. |
| 9,780,404 B2 | 10/2017 | Scordilis-Kelley et al. |
| 9,825,328 B2 | 11/2017 | Du et al. |
| 9,853,287 B2 | 12/2017 | Mikhaylik et al. |
| 9,887,433 B2 | 2/2018 | Lee et al. |
| 9,947,963 B2 | 4/2018 | Du et al. |
| 9,994,959 B2 | 6/2018 | Laramie et al. |
| 9,994,960 B2 | 6/2018 | Laramie et al. |
| 10,020,479 B2 | 7/2018 | Mikhaylik et al. |
| 10,020,512 B2 | 7/2018 | Gronwald et al. |
| 10,050,308 B2 | 8/2018 | Liao et al. |
| 10,069,135 B2 | 9/2018 | Fleischmann et al. |
| 10,069,146 B2 | 9/2018 | Skotheim et al. |
| 10,122,043 B2 | 11/2018 | Du et al. |
| 10,243,202 B2 | 3/2019 | Fleischmann et al. |
| 10,312,545 B2 | 6/2019 | Scordilis-Kelley et al. |
| 10,319,988 B2 | 6/2019 | Kelley et al. |
| 10,320,027 B2 | 6/2019 | Scordilis-Kelley et al. |
| 10,320,031 B2 | 6/2019 | Mikhaylik et al. |
| 10,333,134 B2 | 6/2019 | Mikhaylik et al. |
| 10,333,149 B2 | 6/2019 | Affinito et al. |
| 10,388,987 B2 | 8/2019 | Du et al. |
| 10,461,333 B2 | 10/2019 | Mikhaylik et al. |
| 10,461,372 B2 | 10/2019 | Laramie et al. |
| 10,490,796 B2 | 11/2019 | Laramie et al. |
| 10,535,902 B2 | 1/2020 | Laramie et al. |
| 10,541,448 B2 | 1/2020 | Mikhaylik et al. |
| 10,553,893 B2 | 2/2020 | Laramie et al. |
| 10,573,869 B2 | 2/2020 | Mikhaylik et al. |
| 10,608,278 B2 | 3/2020 | Liao et al. |
| 10,629,947 B2 | 4/2020 | Affinito et al. |
| 10,629,954 B2 | 4/2020 | Mikhaylik et al. |
| 10,720,648 B2 | 7/2020 | Quero-Mieres et al. |
| 10,734,677 B2 | 8/2020 | Yang et al. |
| 10,847,833 B2 | 11/2020 | Bunte et al. |
| 10,862,105 B2 | 12/2020 | Gronwald et al. |
| 10,868,306 B2 | 12/2020 | Mudalige et al. |
| 10,879,527 B2 | 12/2020 | Laramie et al. |
| 10,944,094 B2 | 3/2021 | Liao et al. |
| 10,965,130 B2 | 3/2021 | Mikhaylik et al. |
| 10,991,925 B2 | 4/2021 | Wang et al. |
| 11,024,923 B2 | 6/2021 | Liao et al. |
| 11,038,178 B2 | 6/2021 | Liao et al. |
| 11,041,248 B2 | 6/2021 | Laramie et al. |
| 11,056,728 B2 | 7/2021 | Mikhaylik et al. |
| 11,088,395 B2 | 8/2021 | Mikhaylik et al. |
| 11,108,076 B2 | 8/2021 | Scordilis-Kelley et al. |
| 11,108,077 B2 | 8/2021 | Scordilis-Kelley et al. |
| 11,121,397 B2 | 9/2021 | Scordilis-Kelley et al. |
| 11,165,122 B2 | 11/2021 | Laramie et al. |
| 11,183,690 B2 | 11/2021 | Wang et al. |
| 11,705,554 B2 | 7/2023 | Kovalev et al. |
| 2002/0055040 A1 | 5/2002 | Mukherjee et al. |
| 2005/0196672 A1 | 9/2005 | Mukherjee et al. |
| 2006/0115579 A1 | 6/2006 | Mukherjee et al. |
| 2006/0222954 A1 | 10/2006 | Skotheim et al. |
| 2006/0238203 A1 | 10/2006 | Kelley et al. |
| 2007/0221265 A1 | 9/2007 | Affinito et al. |
| 2007/0224502 A1 | 9/2007 | Affinito et al. |
| 2008/0187663 A1 | 8/2008 | Affinito |
| 2008/0318128 A1 | 12/2008 | Simoneau et al. |
| 2009/0035646 A1 | 2/2009 | Mikhaylik et al. |
| 2009/0055110 A1 | 2/2009 | Kelley et al. |
| 2009/0200986 A1 | 8/2009 | Kopera |
| 2010/0035128 A1 | 2/2010 | Scordilis-Kelley et al. |
| 2010/0129699 A1 | 5/2010 | Mikhaylik et al. |
| 2010/0239914 A1 | 9/2010 | Mikhaylik et al. |
| 2010/0291442 A1 | 11/2010 | Wang et al. |
| 2010/0294049 A1 | 11/2010 | Kelley et al. |
| 2011/0006738 A1 | 1/2011 | Mikhaylik et al. |
| 2011/0008531 A1 | 1/2011 | Mikhaylik et al. |
| 2011/0014524 A1 | 1/2011 | Skotheim et al. |
| 2011/0059361 A1 | 3/2011 | Wilkening et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0159376 A1 | 6/2011 | Skotheim et al. |
| 2011/0165471 A9 | 7/2011 | Skotheim et al. |
| 2011/0177398 A1 | 7/2011 | Affinito et al. |
| 2011/0206992 A1 | 8/2011 | Campbell et al. |
| 2011/0256450 A1 | 10/2011 | Campbell et al. |
| 2012/0048729 A1 | 3/2012 | Mikhaylik et al. |
| 2012/0052339 A1 | 3/2012 | Mikhaylik et al. |
| 2012/0070746 A1 | 3/2012 | Mikhaylik et al. |
| 2012/0082872 A1 | 4/2012 | Schmidt et al. |
| 2012/0082901 A1 | 4/2012 | Schmidt et al. |
| 2013/0017441 A1 | 1/2013 | Affinito et al. |
| 2013/0095380 A1 | 4/2013 | Affinito et al. |
| 2013/0224601 A1 | 8/2013 | Burnside et al. |
| 2013/0252103 A1 | 9/2013 | Mikhaylik |
| 2013/0316072 A1 | 11/2013 | Scordilis-Kelley et al. |
| 2014/0123477 A1 | 5/2014 | Safont Sempere et al. |
| 2014/0193713 A1 | 7/2014 | Kumaresan et al. |
| 2014/0193723 A1 | 7/2014 | Kumaresan et al. |
| 2014/0220439 A1* | 8/2014 | Badding ............ H01M 4/0495 205/229 |
| 2014/0255780 A1 | 9/2014 | Mikhaylik et al. |
| 2014/0272565 A1 | 9/2014 | Gronwald et al. |
| 2014/0272594 A1 | 9/2014 | Safont Sempere et al. |
| 2014/0272595 A1 | 9/2014 | Cristadoro et al. |
| 2014/0272597 A1 | 9/2014 | Mikhaylik et al. |
| 2014/0310579 A1 | 10/2014 | Hwang et al. |
| 2015/0010804 A1 | 1/2015 | Laramie et al. |
| 2015/0044517 A1 | 2/2015 | Mikhaylik et al. |
| 2015/0111096 A1 | 4/2015 | Schmidt |
| 2015/0162586 A1 | 6/2015 | Fleischmann et al. |
| 2015/0188194 A1 | 7/2015 | Mikhaylik et al. |
| 2015/0236322 A1 | 8/2015 | Laramie et al. |
| 2015/0287986 A1 | 10/2015 | Affinito et al. |
| 2016/0072132 A1 | 3/2016 | Liao et al. |
| 2016/0118638 A1 | 4/2016 | Gronwald et al. |
| 2016/0118651 A1 | 4/2016 | Kovalev et al. |
| 2016/0197349 A1 | 7/2016 | Schmidt |
| 2016/0344067 A1 | 11/2016 | Laramie et al. |
| 2017/0025709 A1 | 1/2017 | Schmidt |
| 2017/0040640 A1 | 2/2017 | Schmidt et al. |
| 2017/0141385 A1 | 5/2017 | Scordilis-Kelley et al. |
| 2017/0141402 A1 | 5/2017 | Affinito et al. |
| 2017/0317352 A1 | 11/2017 | Lee et al. |
| 2017/0338475 A1 | 11/2017 | Laramie et al. |
| 2017/0352783 A1 | 12/2017 | Ishizaki et al. |
| 2018/0006303 A1 | 1/2018 | Mikhaylik et al. |
| 2018/0034106 A1 | 2/2018 | Schmidt |
| 2018/0076444 A1 | 3/2018 | Chauveau et al. |
| 2018/0076485 A1 | 3/2018 | Zhang et al. |
| 2018/0254516 A1 | 9/2018 | Han et al. |

(56) References Cited

U.S. PATENT DOCUMENTS

| | | |
|---|---|---|
| 2018/0261820 A1 | 9/2018 | Liao et al. |
| 2018/0301697 A1 | 10/2018 | Affinito et al. |
| 2018/0351148 A1 | 12/2018 | Schneider et al. |
| 2018/0375155 A1 | 12/2018 | Liao et al. |
| 2019/0006699 A1 | 1/2019 | Jones et al. |
| 2019/0088958 A1 | 3/2019 | Viner et al. |
| 2019/0229323 A1 | 7/2019 | Mikhaylik et al. |
| 2019/0267632 A1 | 8/2019 | Affinito et al. |
| 2020/0044460 A1 | 2/2020 | Mikhaylik et al. |
| 2020/0099108 A1 | 3/2020 | Laramie et al. |
| 2020/0185764 A1 | 6/2020 | Liao et al. |
| 2020/0194822 A1 | 6/2020 | Laramie et al. |
| 2020/0220146 A1 | 7/2020 | Laramie et al. |
| 2020/0220149 A1 | 7/2020 | Laramie et al. |
| 2020/0220197 A1 | 7/2020 | Laramie et al. |
| 2020/0220205 A1 | 7/2020 | Affinito et al. |
| 2020/0350631 A1 | 11/2020 | Mikhaylik et al. |
| 2020/0373551 A1 | 11/2020 | Milobar et al. |
| 2020/0373578 A1 | 11/2020 | Wang et al. |
| 2020/0395585 A1 | 12/2020 | Laramie et al. |
| 2021/0057753 A1 | 2/2021 | Viner et al. |
| 2021/0135297 A1 | 5/2021 | Mikhaylik et al. |
| 2021/0138673 A1 | 5/2021 | Shannon et al. |
| 2021/0151816 A1 | 5/2021 | Shayan et al. |
| 2021/0151817 A1 | 5/2021 | Jennings et al. |
| 2021/0151830 A1 | 5/2021 | Shayan et al. |
| 2021/0151839 A1 | 5/2021 | Niedzwiecki et al. |
| 2021/0151840 A1 | 5/2021 | Shayan et al. |
| 2021/0151841 A1 | 5/2021 | Johnson et al. |
| 2021/0193984 A1 | 6/2021 | Laramie et al. |
| 2021/0193985 A1 | 6/2021 | Laramie et al. |
| 2021/0193996 A1 | 6/2021 | Laramie et al. |
| 2021/0194069 A1 | 6/2021 | Hamblin et al. |
| 2021/0218243 A1 | 7/2021 | Hamblin et al. |
| 2021/0249651 A1 | 8/2021 | Laramie et al. |
| 2021/0265610 A1 | 8/2021 | Liao et al. |
| 2021/0328274 A1 | 10/2021 | Mikhaylik et al. |
| 2022/0115649 A1 | 4/2022 | Kovalev et al. |
| 2022/0115705 A1 | 4/2022 | Kovalev et al. |

FOREIGN PATENT DOCUMENTS

| | | |
|---|---|---|
| CN | 103814468 A | 5/2014 |
| CN | 109065832 A | 12/2018 |
| WO | WO 99/33130 A1 | 7/1999 |
| WO | WO 2014/198914 A1 | 12/2014 |
| WO | WO 2017/097766 A1 | 6/2017 |
| WO | WO 2018/064365 A1 | 4/2018 |
| WO | WO 2021/086377 A1 | 5/2021 |

OTHER PUBLICATIONS

Shkrob et al., Chemical Stability of Lithium 2-Trifluoromethyl-4,5-dicyanoimidazolide, an Electrolyte Salt for Li-Ion Cells. J Phys Chem C. Dec. 2016;120(50):28463-71.

Shkrob et al., The AHA Moment: Assessment of the Redox Stability of Ionic Liquids Based on Aromatic Heterocyclic Anions (AHAs) for Nuclear Separations and Electric Energy Storage. J Phys Chem B. Nov. 19, 2015;119(46):14766-79. doi: 10.1021/acs.jpcb.5b09057. Epub Nov. 5, 2015.

Storr et al., Transition metal azolates from metallocenes. Part 3: Polymeric manganese(II) and nickel(II) pyrazolates; synthesis, characterization, and magnetochemistry. Can J Chem. May 1998;76:1130-7.

Trofimenko, The coordination chemistry of pyrazole-derived ligands. Chem Rev. Oct. 1, 1972;72(5):497-509.

Wu et al., Effects of combinatorial AlCl3 and pyrrole on the SEI formation and electrochemical performance of Li electrode. Electrochim Acta. Jul. 30, 2013;103:199-205.

Zhang et al., Copper(I) 1,2,4-triazolates and related complexes: studies of the solvothermal ligand reactions, network topologies, and photoluminescence properties. J Am Chem Soc. Apr. 20, 2005;127(15):5495-506. doi: 10.1021/ja042222t.

* cited by examiner

ELECTROCHEMICAL CELLS AND/OR COMPONENTS THEREOF COMPRISING NITROGEN-CONTAINING SPECIES, AND METHODS OF FORMING THEM

RELATED APPLICATIONS

This application is a continuation of U.S. application Ser. No. 17/492,063, filed Oct. 1, 2021, which claims priority to U.S. Provisional Application No. 63/089,862, filed Oct. 9, 2020, each of which is incorporated herein by reference in its entirety.

FIELD

Articles and methods involving electrochemical cells and/or electrochemical cell components (such as electrodes) comprising species comprising a conjugated, negatively-charged ring comprising a nitrogen atom and/or reaction products of such species are generally provided.

BACKGROUND

There has been considerable interest in recent years in developing high energy density rechargeable batteries (e.g., rechargeable Li-ion batteries). In such cells, electrode material (e.g., cathode material) may degrade during cycling, leading to a decrease in capacity or cycle life. One reason for this degradation is the diffusion of cations (e.g., cobalt, nickel, manganese, etc.) from the electrode (e.g., cathode) to the electrolyte and reduction on the other electrode (e.g., anode). Another reason for this decrease in capacity and/or cycle life is because of oxidation of electrolyte components on an electrode surface (e.g., cathode surface), particularly at higher charge voltages. Accordingly, articles and methods for increasing the cycle lifetime and/or other improvements would be beneficial.

SUMMARY

Articles and methods related to electrochemical cells and/or electrochemical cell components (such as electrodes) comprising species comprising a conjugated, negatively-charged ring comprising a nitrogen atom and/or reaction products of such species are generally provided. The subject matter disclosed herein involves, in some cases, interrelated products, alternative solutions to a particular problem, and/or a plurality of different uses of one or more systems and/or articles.

Certain embodiments are related to electrochemical cells. In some embodiments, the electrochemical cell comprises a first electrode; and a second electrode comprising a species comprising a conjugated, negatively-charged ring comprising a nitrogen atom and/or a reaction product thereof.

In some embodiments, the electrochemical cell comprises a first electrode; a second electrode; and a protective layer disposed on the second electrode, wherein the protective layer disposed on the second electrode comprises a species comprising a conjugated, negatively-charged ring comprising a nitrogen atom and/or a reaction product thereof.

Certain embodiments are related to methods. In some embodiments, the method comprises exposing an electrode comprising a transition metal to a solution comprising a species comprising a conjugated, negatively-charged ring comprising a nitrogen atom; and forming a protective layer disposed on the electrode, wherein the protective layer comprises the species and/or a reaction product thereof. In some embodiments, the electrode comprises a second electrode. In some embodiments, the method comprises combining the second electrode with a first electrode to form an electrochemical cell.

In some embodiments, the method comprises exposing an electrode to a preliminary solution comprising a transition metal; exposing the electrode to a solution comprising a species comprising a conjugated, negatively-charged ring comprising a nitrogen atom; and forming a protective layer disposed on the electrode, wherein the protective layer comprises the species and/or a reaction product thereof. In some embodiments, the electrode comprises a second electrode. In some embodiments, the method comprises combining the second electrode with a first electrode to form an electrochemical cell.

In some embodiments, an electron-withdrawing substituent is absent from the species comprising a conjugated, negatively-charged ring comprising a nitrogen atom.

In some embodiments, reaction product comprises a reaction product between the transition metal and the species comprising a conjugated, negatively-charged ring comprising a nitrogen atom. In some embodiments, the reaction product comprises a reaction product between the species comprising a conjugated, negatively-charged ring comprising a nitrogen atom and a second species comprising a labile halogen atom. In some embodiments, the reaction product comprises a reaction product between the species comprising a conjugated, negatively-charged ring comprising a nitrogen atom, the second species comprising a labile halogen atom, and the transition metal.

In some embodiments, the electrochemical cell comprises an electrolyte. In some embodiments, the electrolyte comprises the species comprising a conjugated, negatively-charged ring comprising a nitrogen atom and/or a second species comprising a labile halogen atom.

In some embodiments, the first electrode comprises lithium metal. In some embodiments, a protective layer is disposed on the first electrode. In some embodiments, the protective layer comprises the species comprising a conjugated, negatively-charged ring comprising a nitrogen atom and/or a reaction product thereof. In some embodiments, the reaction product comprises a reaction product between the lithium metal and the species comprising a conjugated, negatively-charged ring comprising a nitrogen atom. In some embodiments, the reaction product comprises a reaction product between the species comprising a conjugated, negatively-charged ring comprising a nitrogen atom and a second species comprising a labile halogen atom. In some embodiments, the reaction product comprises a reaction product between the species comprising a conjugated, negatively-charged ring comprising a nitrogen atom, the second species comprising a labile halogen atom, and the lithium metal.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
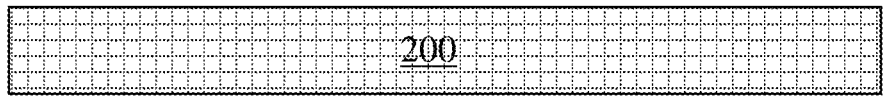
FIG. 1A shows, in accordance with some embodiments, an electrode (e.g., a cathode).

Articles and methods related to electrochemical cells and/or electrochemical cell components (e.g., electrodes) including a species comprising a conjugated, negatively-charged ring including a nitrogen atom, and reaction products of such species, are generally provided. As described in further detail below, such species may be referred to throughout as "first reactive species." Accordingly, as used herein, the phrase "first reactive species" should be understood to refer to all species comprising a conjugated, negatively-charged ring including a nitrogen atom. The conjugated, negatively-charged ring including the nitrogen atom in the first reactive species may be referred to throughout as a "reactive ring." Accordingly, the phrase "reactive ring" should be understood to refer to all conjugated, negatively-charged rings including a nitrogen atom forming part of a first reactive species. In some embodiments there may be more than one first reactive species (e.g., a first reactive species disposed on an electrode and a first reactive species in an electrolyte). In such embodiments, the first reactive species may be the same or different.

As described herein, an electrochemical cell may comprise an electrode (e.g., a second electrode). In some embodiments, the second electrode comprises a transition metal. In some embodiments, the second electrode comprises a first reactive species (i.e., a species comprising a conjugated, negatively-charged ring including a nitrogen atom) and/or a reaction product thereof and/or a protective layer (e.g., a protective layer comprising a first reactive species and/or a reaction product thereof) is disposed on the second electrode. In some embodiments, the reaction product comprises a reaction product between a transition metal and the first reactive species (i.e., a species comprising a conjugated, negatively-charged ring including a nitrogen atom)). In some embodiments, the reaction product comprises a reaction product between the first reactive species (i.e., a species comprising a conjugated, negatively-charged ring including a nitrogen atom) and a second reactive species (e.g., a species comprising a labile halogen atom). In some embodiments, the reaction comprises a reaction product between a transition metal, the first reactive species, and the second reactive species (e.g., a reaction product between a transition metal and a reaction product between the first reactive species and the second reactive species).

A reaction product disclosed herein and/or a protective layer disclosed herein may be formed in any suitable way. In some embodiments, the second electrode (e.g., the transition metal) interacts with the first reactive species (i.e., a species comprising a conjugated, negatively-charged ring including a nitrogen atom) and/or with a reaction product thereof. In some embodiments, the first reactive species and/or a reaction product thereof may deposit onto an electrode (e.g., the electrode comprising a transition metal) to form a protective layer, or a component thereof, with desirable properties. For example, in some embodiments, a transition metal in an electrode comprising a transition metal reacts with a first reactive species (i.e., a species comprising a conjugated, negatively-charged ring including a nitrogen atom) to form a reaction product. The reaction product of this reaction may deposit onto an electrode (e.g., the electrode comprising a transition metal) to form a protective layer, or a component thereof, with desirable properties. As another example, in some embodiments, a first reactive species (i.e., a species comprising a conjugated, negatively-charged ring including a nitrogen atom) reacts with a second reactive species (e.g., a species comprising a labile halogen atom) to form a reaction product. The reaction product of this reaction may deposit onto an electrode (e.g., the electrode comprising a transition metal) to form a protective layer, or a component thereof, with desirable properties. In yet another example, in some embodiments, a transition metal in an electrode comprising a transition metal reacts with a first reactive species (i.e., a species comprising a conjugated, negatively-charged ring including a nitrogen atom) and a second reactive species (e.g., a species comprising a labile halogen atom) (e.g., a transition metal reacts with a reaction product of a first reactive species and a second reactive species). The reaction product of this reaction may deposit onto an electrode (e.g., the electrode comprising a transition metal) to form a protective layer, or a component thereof, with desirable properties.

One or more of the reaction products disclosed herein and/or protective layer(s) may be desirable in one or more ways. For instance, in some embodiments, the protective layer may be capable of protecting an electrode, such as a cathode (e.g., for a transition metal), from deleterious reactions with one or more other species also present in the electrochemical cell, such as one or more species present in the electrolyte. In some embodiments, the protective layer formed by a reaction described herein may be advantageous. By way of example, it may have a relatively low resistance. As another example, the first reactive species may react with a metal to produce a solid electrolyte layer (SEI) and/or a component of an SEI. In some embodiments, the SEI formed by a reaction described herein may be advantageous in comparison to other SEIs in one or more ways. By way of example, the SEI formed by a reaction described herein may be particularly stable, may function as a protective layer, and/or may have a relatively low resistance.

As described herein, an electrochemical cell may comprise an electrolyte. In some embodiments, the electrolyte comprises a first reactive species (i.e., a species comprising a conjugated, negatively-charged ring including a nitrogen atom) and a second reactive species (e.g., a species comprising a labile halogen atom).

As described herein, an electrochemical cell may comprise a first electrode. In some embodiments, the first electrode comprises lithium metal (e.g., vacuum deposited lithium). In some embodiments, the first electrode (e.g., the lithium metal) interacts with the first reactive species (i.e., a species comprising a conjugated, negatively-charged ring including a nitrogen atom) and/or with a reaction product thereof (e.g., in the electrolyte). In some embodiments, the first reactive species and/or a reaction product thereof may deposit onto an electrode (e.g., the electrode comprising a transition metal) to form a protective layer, or a component thereof, with desirable properties. For example, in some embodiments, lithium metal in an electrode comprising lithium metal reacts with a first reactive species (i.e., a species comprising a conjugated, negatively-charged ring including a nitrogen atom) to form a reaction product. The reaction product of this reaction may deposit onto an electrode (e.g., the electrode comprising lithium metal) to form a protective layer, or a component thereof, with desirable properties. As another example, in some embodiments, a first reactive species (i.e., a species comprising a conjugated, negatively-charged ring including a nitrogen atom) reacts with a second reactive species (e.g., a species comprising a labile halogen atom) to form a reaction product. The reaction product of this reaction may deposit onto an electrode (e.g., the electrode comprising lithium metal) to form a protective layer, or a component thereof, with desirable properties. As yet another example, in some embodiments, lithium metal in an electrode comprising lithium metal reacts with a first reactive species (i.e., a species comprising a conjugated, negatively-charged ring including a nitrogen atom) and a second reactive species (e.g., a species comprising a labile halogen atom) (e.g., lithium metal reacts with a reaction product of a first reactive species and a second reactive species). The reaction product of this reaction may deposit onto an electrode (e.g., the electrode comprising lithium metal) to form a protective layer, or a component thereof, with desirable properties.

Reaction of a metal (e.g., lithium metal) with the first reactive species and/or a reaction product thereof (e.g., a reaction product of a first reactive species and a second reactive species) may produce a reaction product that is desirable in one or more ways. For instance, in some embodiments, the reaction product may react with a metal to produce a protective layer and/or a component of a protective layer. The protective layer may be capable of protecting an electrode, such as an anode (e.g., for lithium), from deleterious reactions with one or more other species also present in the electrochemical cell, such as one or more species present in the electrolyte. In some embodiments, the protective layer formed by a reaction described herein may be advantageous. By way of example, it may have a relatively low resistance. As another example, the first reactive species may react with a metal to produce a solid electrolyte layer (SEI) and/or a component of an SEI. In some embodiments, the SEI formed by a reaction described herein may be advantageous in comparison to other SEIs in one or more ways. By way of example, the SEI formed by a reaction described herein may be particularly stable, may function as a protective layer, and/or may have a relatively low resistance.

In some embodiments, an electrochemical cell described herein comprises a protective layer having one or more advantageous properties. In some embodiments, the protective layer may comprise, or consist essentially of, an SEI. The SEI may protect the electrode by reducing the area of the electrode exposed directly to the electrolyte and/or by preventing or reducing the rate of reaction between the electrode and the electrolyte. In some embodiments, the protective layer comprises the first reactive species and/or one or more reaction products thereof, and, in some embodiments, further comprises other species. These other species may include reaction products of the electrode with one or more components of the electrolyte, such as one or more organic solvents. The presence of some of the reaction products described herein may enhance the properties of the SEI in comparison to otherwise equivalent SEIs lacking the first reactive species and/or reaction product(s). This may be especially true for electrodes that comprise lithium metal or a transition metal, which may interact especially favorably with the first reactive species and/or reaction products of the first reactive species to form a part of the SEI and/or which may react with the first reactive species and/or reaction products of the first reactive species (e.g., reaction products of a reaction between the first reactive species and the second reactive species) to form a reaction product advantageous for inclusion in the SEI. While the reaction products described herein may be especially advantageous when incorporated into the SEI, it should also be understood that the first reactive species and/or reaction products thereof may, also or instead, be incorporated into other types of protective layers (e.g., protective layers comprising one or more particles or protective layers formed by aerosol deposition).

Some embodiments relate to SEIs that would not typically be considered protective layers for one or more reasons. For instance, some such SEIs do not protect the electrode and/or may be present in an electrochemical cell further comprising a protective layer. Such SEIs may, however, have one or more of the advantageous features described above with respect to protective layers. In some embodiments, an electrochemical cell comprises an SEI that is not a protective layer.

As discussed above, some embodiments relate to an electrochemical cell including a species comprising a first reactive species and a species reactive with the first reactive species, referred to herein as a "second reactive species." Accordingly, the phrase "second reactive species" should be understood to refer to all species reactive with the first reactive species.

Reaction of a second reactive species with a first reactive species may produce a reaction product that is desirable in one or more ways. For instance, in some embodiments, the second reactive species may react with the first reactive species to produce a protective layer and/or a component of a protective layer. The protective layer may be capable of protecting an electrode, such as a cathode, from deleterious reactions with one or more other species also present in the electrochemical cell, such as one or more species present in the electrolyte. In some embodiments, the protective layer formed by a reaction described herein may be advantageous. By way of example, it may have a relatively low resistance. As another example, the second reactive species may react with the first reactive species to produce a solid electrolyte layer (SEI) and/or a component of an SEI. In some embodiments, the SEI formed by a reaction described herein may be advantageous in comparison to other SEIs in one or more ways. By way of example, the SEI formed by a reaction described herein may be particularly stable, may function as a protective layer, and/or may have a relatively low resistance.

In some embodiments, an electrochemical cell (e.g., an electrolyte) and/or a solution (e.g., a solution to which an electrode is exposed) comprises a species comprising a labile halogen atom. The species comprising the labile halogen atom may be a second reactive species. One type of reaction that may occur (e.g., in a solution or in an electrolyte) between a species comprising the labile halogen atom (e.g., a second reactive species) and a first reactive species is a nucleophilic substitution reaction. In this reaction, as shown below in Reaction I, the first reactive species may displace the labile halogen atom from the species comprising the labile halogen atom.

(Reaction I)

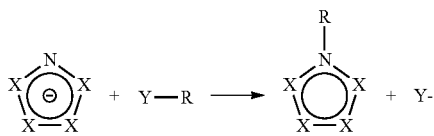

As will be described in further detail below, in Reaction I, each X may be independently selected from the group consisting of —N= and

Y may be a halogen atom, and each instance of R may each independently be any suitable R group (e.g., any R group described herein). It should be understood that, although Reaction I shows a first reactive species with a 5-member reactive ring, some embodiments may relate to reactive species comprising reactive rings of other sizes. Such reactive species may also undergo nucleophilic substitution reactions with second reactive species (e.g., second reactive species comprising a labile halogen atom).

The progress of a nucleophilic substitution reaction, such as a nucleophilic substitution reaction described by Reaction I, may be detectable by an NMR measurement, such as a $^{19}F$ NMR measurement, a $^{31}P$ NMR measurement, a $^{13}C$ NMR measurement, and/or a $^{1}H$ NMR measurement. The NMR measurement may be made on a solution and/or on a component(s) of the electrochemical cell comprising the first reactive species (i.e., a species comprising a conjugated, negatively-charged ring including a nitrogen atom) and/or the second reactive species (e.g., the species comprising the labile halogen atom). For instance, in some embodiments, the nucleophilic substitution reaction may cause the electrolyte to undergo a change in composition detectable by the NMR measurement. By way of example, the nucleophilic substitution reaction may cause the concentration of the first reactive species and/or the second reactive species to decrease, and the decrease may be to an extent observable by the NMR measurement. In some embodiments, the reaction product of the nucleophilic substitution reaction comprising a tertiary nitrogen, such as an azole derivative, deposits onto an electrode to form a protective layer, or a component thereof, with desirable properties.

Reaction of a first reactive species (i.e., a species comprising a conjugated, negatively-charged ring including a nitrogen atom) with a metal (e.g., lithium metal or a transition metal) may produce a reaction product that is desirable in one or more ways. For instance, in some embodiments, the first reactive species may react with a metal to produce a protective layer and/or a component of a protective layer. The protective layer may be capable of protecting an electrode, such as an anode (e.g., for lithium) or a cathode (e.g., for a transition metal), from deleterious reactions with one or more other species also present in the electrochemical cell, such as one or more species present in the electrolyte. In some embodiments, the protective layer formed by a reaction described herein may be advantageous. By way of example, it may have a relatively low resistance. As another example, the first reactive species may react with a metal to produce a solid electrolyte layer (SEI) and/or a component of an SEI. In some embodiments, the SEI formed by a reaction described herein may be advantageous in comparison to other SEIs in one or more ways. By way of example, the SEI formed by a reaction described herein may be particularly stable, may function as a protective layer, and/or may have a relatively low resistance.

In some embodiments, the reaction product(s) comprises the reaction product of a first reactive species (i.e., a species comprising a conjugated, negatively-charged ring including a nitrogen atom) and a metal (e.g., lithium metal, such as lithium metal of an electrode (e.g., first electrode) comprising lithium metal, or a transition metal, such as transition metal of an electrode (e.g., second electrode) comprising a transition metal); the reaction product of a first reactive species (i.e., a species comprising a conjugated, negatively-charged ring including a nitrogen atom) and a second reactive species (e.g., a species comprising a labile halogen atom); and/or the reaction product of a metal (e.g., lithium metal, such as lithium metal of an electrode (e.g., first electrode) comprising lithium metal, or a transition metal, such as transition metal of an electrode (e.g., second electrode) comprising a transition metal), a first reactive species (i.e., a species comprising a conjugated, negatively-charged ring including a nitrogen atom) and a second reactive species (e.g., a species comprising a labile halogen atom) (e.g., a reaction product of a metal and a reaction product of a first reactive species and a second reactive species).

In some embodiments, the reaction product(s) comprises covalent and/or coordination bonds. For example, in some embodiments, the reaction product(s) comprises covalent and/or coordination bonds with the metal (e.g., the lithium metal and/or transition metal).

In some embodiments, the reaction product(s) comprises a polymer. In some embodiments, the reaction product(s) comprises a polymeric network (e.g., a 2D polymeric network and/or a 3D polymeric network).

In some embodiments, one or more (e.g., all) of the reaction products is insoluble in the electrolyte. In some embodiments, one or more (e.g., all) of the reaction products is insoluble in one or more (e.g., all) organic solvents (e.g., the non-aqueous organic solvents disclosed herein).

FIGS. 1A-1F show an electrochemical cell, or components thereof, that may comprise one or more advantageous components described herein and/or in which one or more advantageous methods described herein may occur. It should be understood that the electrochemical cells shown in FIGS. 1A-1F may optionally include one or more components not shown, such as a separator, one or more current collectors, housing, external circuitry, species in the electrolyte, protective layer(s), additional electrode(s), and the like.

Figure 1B:
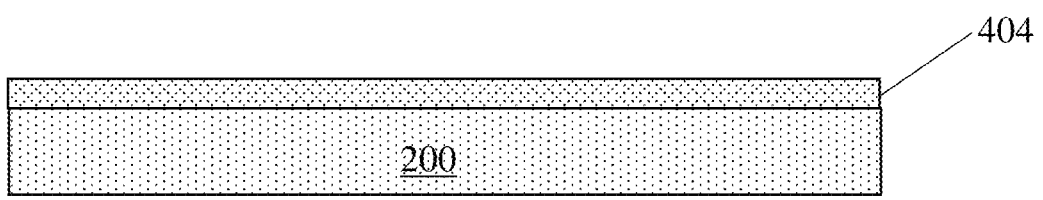
FIG. 1B shows, in accordance with some embodiments, a layer (e.g., a protective layer) disposed on an electrode (e.g., a cathode).
Figure 1C:
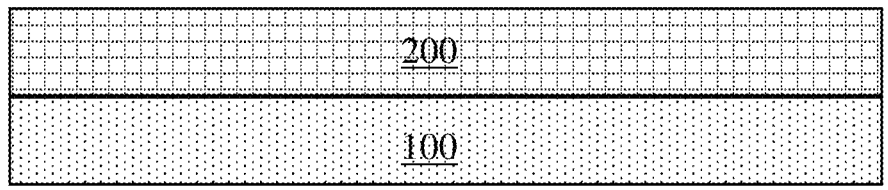
FIG. 1C shows, in accordance with some embodiments, an electrochemical cell comprising a first electrode and a second electrode.
Figure 1D:
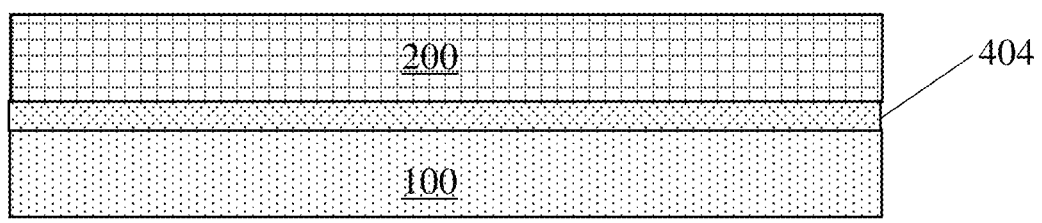
FIG. 1D shows, in accordance with some embodiments, an electrochemical cell comprising a first electrode and a second electrode, wherein a layer (e.g., a protective layer) is disposed on one of the electrodes (e.g., the second electrode, such as a cathode).
Figure 1E:
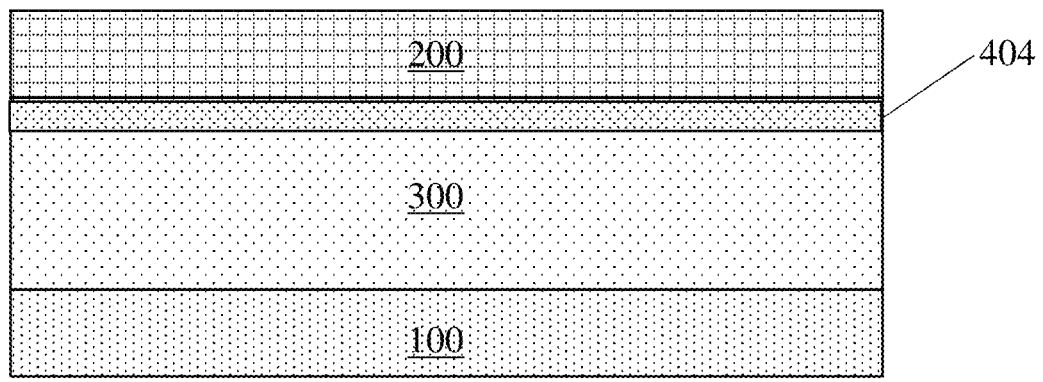
FIG. 1E shows, in accordance with some embodiments, an electrochemical cell comprising a first electrode, a second electrode, and an electrolyte, wherein a layer (e.g., a protective layer) is disposed on the second electrode (e.g., a cathode).
Figure 1F:
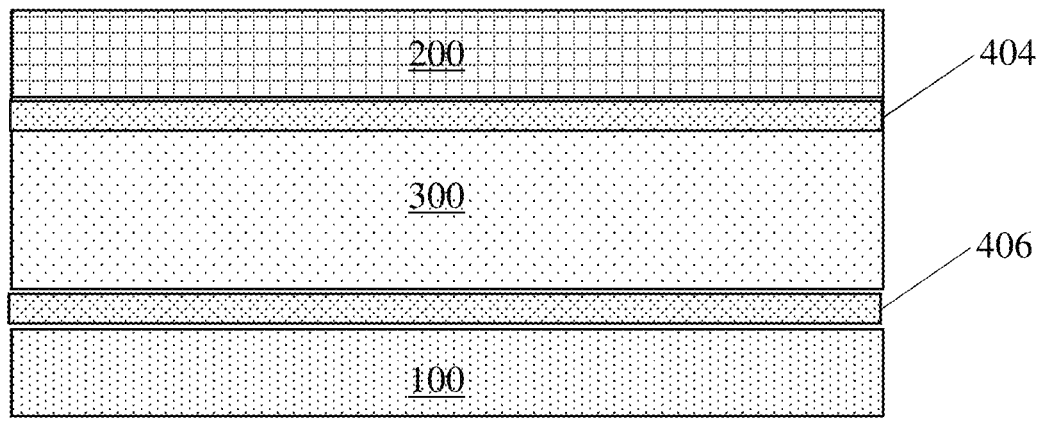
FIG. 1F shows, in accordance with some embodiments, an electrochemical cell comprising a first electrode, a second electrode, and an electrolyte, wherein a layer (e.g., a protective layer) is disposed on the second electrode (e.g., cathode) and a layer (e.g., a protective layer) is disposed on the first electrode (e.g., anode).

In FIG. 1B, in some embodiments, a layer 404 (e.g., a protective layer) is disposed on an electrode 200 (e.g., a second electrode). In some embodiments, this layer comprises a first reactive species and/or a reaction product thereof (e.g., a reaction product between a transition metal and the first reactive species (i.e., a species comprising a conjugated, negatively-charged ring including a nitrogen atom); a reaction product between a first reactive species and a second reactive species; and/or a reaction product between a transition metal, a first reactive species, and a second reactive species (e.g., a reaction product between a transition metal and a reaction product of a first reactive species and a second reactive species).

The protective layer may be formed by any suitable method. For example, in some embodiments, a method comprises exposing an electrode (e.g., electrode 200 in FIG. 1B) to a preliminary solution comprising a transition metal (e.g., a transition metal disclosed herein), and exposing the electrode to a solution comprising the first reactive species (i.e., a species comprising a conjugated, negatively-charged ring including a nitrogen atom)), forming the protective layer disposed on the electrode, wherein the protective layer comprises the first reactive species and/or a reaction product thereof (e.g., a reaction product between the transition metal and the first reactive species).

As another example, in some embodiments, the method comprises exposing an electrode (e.g., electrode 200 in FIG. 1B) comprising a transition metal to a solution comprising the first reactive species (i.e., a species comprising a conjugated, negatively-charged ring including a nitrogen atom)), forming the protective layer disposed on the electrode, wherein the protective layer comprises the first reactive species and/or a reaction product thereof (e.g., a reaction product between the transition metal and the first reactive species).

In some embodiments, the solution (e.g., a solution comprising a transition metal and/or the first reactive species) comprises an organic solvent (e.g., any organic solvent disclosed herein). In some embodiments, the organic solvent comprises an alcohol (e.g. ethanol) and/or a nitrile (e.g., benzonitrile).

The transition metal (e.g., transition metal salt) may be present in the solution comprising a transition metal in any suitable amount. In some embodiments, the transition metal (e.g., transition metal salt) is present in the solution in an amount greater than or equal to 0.5 wt %, greater than or equal to 1 wt %, greater than or equal to 2 wt %, greater than or equal to 3 wt %, or greater than or equal to 4 wt %. In some embodiments, the transition metal (e.g., transition metal salt) is present in the solution in an amount less than or equal to 10 wt %, less than or equal to 9 wt %, less than or equal to 8 wt %, less than or equal to 7 wt %, less than or equal to 6 wt %, or less than or equal to 5 wt %. Combinations of these ranges are also possible (e.g., greater than or equal to 0.5 wt % and less than or equal to 10 wt % or greater than or equal to 3 wt % and less than or equal to 5 wt %).

In some embodiments, the solution comprising a transition metal comprises one or more (e.g., 1, 2, 3, 4, 5, 6, or ranges thereof, such as 1-6 or 1-3) anions. Non-limiting examples of suitable anions may include halides, triflates, sulfates, and/or nitrates.

The first reactive species may be present in the solution comprising a first reactive species in any suitable amount. In some embodiments, the first reactive species is present in the solution in an amount greater than or equal to 0.1 wt. %, greater than or equal to 0.2 wt. %, greater than or equal to 0.3 wt. %, greater than or equal to 0.4 wt. %, greater than or equal to 0.5 wt. %, greater than or equal to 1 wt. %, greater than or equal to 1.5 wt. %, greater than or equal to 2 wt. %, greater than or equal to 3 wt. %, or greater than or equal to 4 wt. %. In some embodiments, the first reactive species is present in the solution in an amount less than or equal to 5 wt. %, less than or equal to 4 wt. %, less than or equal to 3 wt. %, less than or equal to 2 wt. %, less than or equal to 1.5 wt. %, less than or equal to 1 wt. %, or less than or equal to 0.5 wt. %. Combinations of these ranges are also possible (e.g., greater than or equal to 0.1 wt. % and less than or equal to 5 wt. % or greater than or equal to 0.5 wt. % and less than or equal to 2 wt. %).

In some embodiments, exposing an electrode (e.g., a second electrode, such as a cathode) to a solution (e.g., a solution comprising a transition metal and/or a first reactive species) comprises any suitable means of wetting (e.g., partially wetting) the electrode, electroactive material contained within the electrode, and/or a surface thereof with the solution. For example, in some embodiments, exposing an electrode to a solution comprises dipping the electrode into the solution, immersing the electrode into the solution, and/or spraying the electrode with the solution.

In some embodiments, exposing an electrode to a solution comprises wetting greater than or equal to 80%, greater than or equal to 85%, greater than or equal to 90%, greater than or equal to 95%, or greater than or equal to 99% of an electrode, electroactive material containing within the electrode, and/or a surface thereof with the solution. In some embodiments, exposing an electrode to a solution comprises wetting less than or equal to 100%, less than or equal to 99%, less than or equal to 95%, or less than or equal to 90% of an electrode, electroactive material containing within the electrode, and/or a surface thereof with the solution. Combinations of these ranges are also possible (e.g., greater than or equal to 80% and less than or equal to 100%, greater than or equal to 90% and less than or equal to 100%, or greater than or equal to 95% and less than or equal to 100%). In some embodiments, exposing an electrode to a solution comprises wetting 100% of an electrode, electroactive material containing within the electrode, and/or a surface thereof with the solution.

The electrode (e.g., a second electrode, such as a cathode) may be exposed to a solution (e.g., a solution comprising a transition metal and/or a first reactive species) at any suitable temperature. In some embodiments, the electrode is exposed to a solution at a temperature of greater than the freezing point of the solution. In some embodiments, the electrode is exposed to a solution at a temperature of greater than or equal to 0° C., greater than or equal to 10° C., greater than or equal to 20° C., greater than or equal to room temperature, or greater than or equal to 30° C. In some embodiments, the electrode is exposed to a solution at a temperature of less than or equal to 40° C., less than or equal to 30° C., less than or equal to room temperature, less than or equal to 20° C., or less than or equal to 10° C. Combinations of these ranges are also possible (e.g., greater than or equal to 0° C. and less than or equal to 40° C.). In some embodiments, electrode is exposed to a solution at room temperature.

The electrode (e.g., a second electrode, such as a cathode) may be exposed to a solution (e.g., a solution comprising a transition metal and/or a first reactive species) for any suitable duration of time. In some embodiments, the electrode is exposed to a solution for a duration of time of greater than or equal to 30 seconds, greater than or equal to 1 minute, greater than or equal to 2 minutes, greater than or equal to 3 minutes, or greater than or equal to 4 minutes. In some embodiments, the electrode is exposed to a solution for a duration of time of less than or equal to 5 minutes, less than or equal to 4 minutes, less than or equal to 3 minutes, less than or equal to 2 minutes, or less than or equal to 1 minute. Combinations of these ranges are also possible (e.g., greater than or equal to 30 seconds and less than or equal to 5 minutes).

In some embodiments, the electrode (e.g., a second electrode, such as a cathode) is exposed to a solution (e.g., a solution comprising a transition metal and/or a first reactive species) under vacuum (e.g., partial or full).

In some embodiments, the method comprises drying the electrode. In some embodiments, the method comprises drying the electrode after exposing the electrode to a solution (e.g., after exposing the electrode to a solution comprising a transition metal and/or after exposing the electrode to a solution comprising a first reactive species) and/or before exposing the electrode to a solution (e.g., after exposing the electrode to a solution comprising a transition metal and before exposing the electrode to a solution comprising a first reactive species).

The electrode may be dried at any suitable temperature. In some embodiments, the electrode is dried at a temperature of greater than or equal to room temperature, greater than or equal to 30° C., greater than or equal to 40° C., greater than or equal to 50° C., greater than or equal to 60° C., greater than or equal to 70° C., greater than or equal to 80° C., greater than or equal to 90° C., greater than or equal to 100° C., greater than or equal to 110° C., greater than or equal to 120° C., greater than or equal to 130° C., or greater than or equal to 140° C. In some embodiments, the electrode is dried at a temperature of less than or equal to 150° C., less than or equal to 140° C., less than or equal to 130° C., less than or equal to 120° C., less than or equal to 110° C., less than or equal to 100° C., less than or equal to 90° C., less than or equal to 80° C., less than or equal to 70° C., less than or equal to 60° C., less than or equal to 50° C., less than or equal to 40° C., or less than or equal to 30° C. Combinations of these ranges are also possible (e.g., greater than or equal to room temperature and less than or equal to 150° C. or greater than or equal to 120° C. and less than or equal to 130° C.).

The electrode may be dried for any suitable duration of time. In some embodiments, the electrode is dried for a duration of time of greater than or equal to 1 second, greater than or equal to 5 seconds, greater than or equal to 15 seconds, greater than or equal to 30 seconds, greater than or equal to 1 minute, greater than or equal to 15 minutes, greater than or equal to 30 minutes, greater than or equal to 1 hour, greater than or equal to 2 hours, greater than or equal to 3 hours, greater than or equal to 4 hours, greater than or equal to 5 hours, greater than or equal to 7 hours, greater than or equal to 10 hours, greater than or equal to 12 hours, greater than or equal to 15 hours, greater than or equal to 18 hours, or greater than or equal to 20 hours. In some embodiments, the electrode is dried for a duration of time of less than or equal to 24 hours, less than or equal to 22 hours, less than or equal to 20 hours, less than or equal to 18 hours, less than or equal to 15 hours, less than or equal to 12 hours, less than or equal to 10 hours, less than or equal to 8 hours, less than or equal to 5 hours, less than or equal to 4 hours, less than or equal to 3 hours, less than or equal to 2 hours, less than or equal to 1 hour, less than or equal to 30 minutes, less than or equal to 15 minutes, less than or equal to 1 minute, less than or equal to 30 second, or less than or equal to 15 seconds. Combinations of these ranges are also possible (e.g., greater than or equal to 1 second and less than or equal to 24 hours or greater than or equal to 5 hours and less than or equal to 15 hours).

In some embodiments, the method comprises drying the electrode at a first temperature (e.g., any temperature disclosed therein) for a first duration of time (e.g., any duration of time disclosed herein) and then drying at a second temperature (e.g., any temperature disclosed therein) (e.g., greater than or equal to room temperature and less than or equal to 150° C. or greater than or equal to 120° C. and less than or equal to 130° C.) for a second duration of time (e.g., any duration of time disclosed herein) (e.g., greater than or equal to 1 second and less than or equal to 24 hours or greater than or equal to 5 hours and less than or equal to 15 hours). In some embodiments, the second temperature is greater than the first temperature. In some embodiments, the second duration of time is greater than the first duration of time.

In some embodiments, the method comprises drying the electrode under vacuum (e.g., partial or full).

In some embodiments, the solution comprising the first reactive species further comprises a second reactive species (e.g., a species comprising a labile halogen atom). In some embodiments, the first reactive species reacts with the second reactive species (e.g., in solution) to form a reaction product. In some embodiments, exposing the electrode to this solution results in formation of a protective layer disposed on the electrode, wherein the protective layer comprises a reaction product comprising the first reactive species and the second reactive species (e.g., a reaction product between the first reactive species and the second reactive species). In some embodiments, exposing the electrode to this solution results in reaction of the first reactive species and/or second reactive species with a metal (e.g., a transition metal or lithium metal of an electrode) to form a reaction product (e.g., a reaction product between the metal and a reaction product of the first reactive species and the second reactive species). In some embodiments, the protective layer comprises first reactive species and/or a reaction product thereof (e.g., the reaction product of a metal (e.g., the lithium metal and/or transition metal of an electrode) and the first reactive species), the reaction product of the first reactive species and the second reactive species, and/or the reaction product of the first reactive species, the second reactive species, and a metal (e.g., the lithium metal and/or transition metal of an electrode) (e.g., a reaction product between the metal and a reaction product of the first reactive species and the second reactive species)).

When present, a second reactive species (e.g., a species comprising a labile halogen atom) may make up a variety of suitable amounts of a solution. In some embodiments, the solution comprises a second reactive species (e.g., a species comprising a labile halogen atom) and any counter ion(s) thereof in an amount of greater than or equal to 5 wt %, greater than or equal to 7 wt %, greater than or equal to 10 wt %, greater than or equal to 15 wt %, greater than or equal to 20 wt %, or greater than or equal to 25 wt %. In some embodiments, the solution comprises a second reactive species (e.g., a species comprising a labile halogen atom) and any counter ion(s) thereof in an amount of less than or equal to 50 wt %, less than or equal to 45 wt %, less than or equal to 40 wt %, less than or equal to 35 wt %, or less than or equal to 30 wt %. Combinations of these ranges are also possible (e.g., greater than or equal to 5 wt % and less than or equal to 50 wt % or greater than or equal to 10 wt % and less than or equal to 30 wt %).

In some embodiments, FIG. 1A comprises electrode 200 (e.g., second electrode, such as cathode). The electrode may be formed by any suitable method. In some embodiments, the method comprises combining an electrode material (e.g., any material described herein as forming part of an electrode, such as an electroactive material, such as a transition metal or a transition metal oxide) with the first reactive species (i.e., a species comprising a conjugated, negatively-charged ring including a nitrogen atom) and/or a second reactive species (e.g., a species comprising a labile halogen atom) (e.g., in solution, such as any solution described herein) to form a mixture (e.g., slurry).

In some embodiments, the mixture (e.g., slurry) comprises any suitable amount of the first reactive species (i.e., a species comprising a conjugated, negatively-charged ring including a nitrogen atom). In some embodiments, the mixture comprises greater than or equal to 0.1 wt. %, greater than or equal to 0.5 wt. %, greater than or equal to 1 wt. %, greater than or equal to 2 wt. %, greater than or equal to 3 wt. %, greater than or equal to 4 wt. %, greater than or equal to 5 wt. %, greater than or equal to 7 wt. %, greater than or equal to 10 wt. %, greater than or equal to 12 wt. %, greater than or equal to 15 wt. %, or greater than or equal to 17 wt. % of the first reactive species. In some embodiments, the mixture comprises less than or equal to 20 wt. %, less than or equal to 18 wt. %, less than or equal to 15 wt. %, less than or equal to 13 wt. %, less than or equal to 10 wt. %, less than or equal to 8 wt. %, less than or equal to 5 wt. %, less than or equal to 4 wt. %, less than or equal to 3 wt. %, less than or equal to 2 wt. %, or less than or equal to 1 wt. % of the first reactive species. Combinations of these ranges are also possible (e.g., greater than or equal to 0.1 wt. % and less than or equal to 20 wt. % or greater than or equal to 5 wt. % and less than or equal to 15 wt. %).

When present, a second reactive species (e.g., a species comprising a labile halogen atom) may make up a variety of suitable amounts of a mixture (e.g., slurry). In some embodiments, the mixture comprises a second reactive species (e.g., a species comprising a labile halogen atom) and any counter ion(s) thereof in an amount of greater than or equal to 5 wt %, greater than or equal to 7 wt %, greater than or equal to 10 wt %, greater than or equal to 15 wt %, greater than or equal to 20 wt %, or greater than or equal to 25 wt %. In some embodiments, the mixture comprises a second reactive species (e.g., a species comprising a labile halogen atom) and any counter ion(s) thereof in an amount of less than or equal to 50 wt %, less than or equal to 45 wt %, less than or equal to 40 wt %, less than or equal to 35 wt %, or less than or equal to 30 wt %. Combinations of these ranges are also possible (e.g., greater than or equal to 5 wt % and less than or equal to 50 wt % or greater than or equal to 10 wt % and less than or equal to 30 wt %).

In some embodiments, the mixture (e.g., slurry) comprises a solid component and a liquid component. The mixture may comprise any suitable amount of the solid component and/or liquid component. In some embodiments, the liquid component comprises greater than or equal to 50 wt. %, greater than or equal to 60 wt. %, greater than or equal to 70 wt. %, or greater than or equal to 80 wt. % of the mixture. In some embodiments, the liquid component comprises less than or equal to 90 wt. %, less than or equal to 80 wt. %, less than or equal to 70 wt. %, or less than or equal to 60 wt. % of the mixture. Combinations of these ranges are also possible (e.g., greater than or equal to 50 wt. % and less than or equal to 90 wt. %).

In some embodiments, the solid component comprises less than or equal to 50 wt. %, less than or equal to 40 wt. %, less than or equal to 30 wt. %, or less than or equal to 20 wt. % of the mixture. In some embodiments, the solid component comprises greater than or equal to 10 wt. %, greater than or equal to 20 wt. %, greater than or equal to 30 wt. %, or greater than or equal to 40 wt. % of the mixture. Combinations of these ranges are also possible (e.g., greater than or equal to 10 wt. % and less than or equal to 50 wt. %).

In some embodiments, the liquid component comprises a solvent. In some embodiments, the solvent comprises an organic solvent (e.g., such as N-methyl-2-pyrrolidone or any organic solvent described herein).

In some embodiments, the electrode material, mixture (e.g., slurry), and/or solid component comprises a metal and/or metal oxide (e.g., any metal or metal oxide described herein, including lithium metal, a transition metal, and/or a transition metal oxide). The metal and/or metal oxide may be present in the electrode material and/or solid component in any suitable amount. In some embodiments, the electrode material, mixture, and/or solid component comprises greater than or equal to 80 wt. %, greater than or equal to 85 wt. %, greater than or equal to 90 wt. %, greater than or equal to 95 wt. %, or greater than or equal to 99 wt. % metal and/or metal oxide. In some embodiments, the electrode material, mixture, and/or solid component comprises less than or equal to 100 wt. %, less than or equal to 99 wt. %, less than or equal to 97 wt. %, less than or equal to 95 wt. %, less than or equal to 90 wt. %, or less than or equal to 80 wt. % metal and/or metal oxide. Combinations of these ranges are also possible (e.g., greater than or equal to 80 wt. % and less than or equal to 100 wt. %, greater than or equal to 80 wt. % and less than or equal to 97 wt. %, or greater than or equal to 90 wt. % and less than or equal to 99 wt. %).

In some embodiments, the electrode material, mixture, and/or solid component comprises a binder. The electrode material, mixture, and/or solid component may comprise any suitable binder. One non-limiting example of a suitable binder may be PVDF. The electrode material, mixture, and/or solid component may comprise any suitable amount of binder. In some embodiments, the electrode material, mixture, and/or solid component comprises greater than or equal to 0.1 wt. %, greater than or equal to 0.5 wt. %, greater than or equal to 1 wt. %, greater than or equal to 1.5 wt. %, greater than or equal to 2 wt. %, greater than or equal to 3 wt. %, greater than or equal to 4 wt. %, or greater than or equal to 5 wt. % binder. In some embodiments, the electrode material, mixture, and/or solid component comprises less than or equal to 10 wt. %, less than or equal to 9 wt. %, less than or equal to 8 wt. %, less than or equal to 7 wt. %, less than or equal to 6 wt. %, less than or equal to 5 wt. %, less than or equal to 4 wt. %, less than or equal to 3 wt. %, less than or equal to 2 wt. %, or less than or equal to 1 wt. % binder. Combinations of these ranges are also possible (e.g., greater than or equal to 0.1 wt. % and less than or equal to 10 wt. % or greater than or equal to 0.5 wt. % and less than or equal to 5 wt. %).

In some embodiments, the electrode material, mixture, and/or solid component comprises carbon-based materials (e.g., carbon black and/or graphite). The electrode material, mixture, and/or solid component may comprise any suitable amount of carbon-based materials (e.g., carbon black and/or graphite). In some embodiments, the electrode material, mixture, and/or solid component comprises greater than or equal to 0.1 wt. %, greater than or equal to 0.5 wt. %, greater than or equal to 1 wt. %, greater than or equal to 1.5 wt. %, greater than or equal to 2 wt. %, greater than or equal to 3 wt. %, greater than or equal to 4 wt. %, or greater than or equal to 5 wt. % carbon-based materials (e.g., carbon black and/or graphite). In some embodiments, the electrode material, mixture, and/or solid component comprises less than or equal to 10 wt. %, less than or equal to 9 wt. %, less than or equal to 8 wt. %, less than or equal to 7 wt. %, less than or equal to 6 wt. %, less than or equal to 5 wt. %, less than or equal to 4 wt. %, less than or equal to 3 wt. %, less than or equal to 2 wt. %, or less than or equal to 1 wt. % carbon-based materials (e.g., carbon black and/or graphite). Combinations of these ranges are also possible (e.g., greater than or equal to 0.1 wt. % and less than or equal to 10 wt. % or greater than or equal to 0.5 wt. % and less than or equal to 5 wt. %).

In some embodiments, the method comprises coating a metal substrate with the mixture. In some embodiments, the metal substrate comprises aluminum, an aluminum alloy, and/or a metallized polymer film.

The metal substrate may have any suitable thickness. In some embodiments, the metal substrate has a thickness of greater than or equal to 4 microns, greater than or equal to 5 microns, greater than or equal to 7 microns, greater than or equal to 10 microns, greater than or equal to 12 microns, greater than or equal to 15 microns, greater than or equal to 20 microns, greater than or equal to 25 microns, greater than or equal to 30 microns, greater than or equal to 35 microns, or greater than or equal to 40 microns. In some embodiments, the metal substrate has a thickness of less than or equal to 50 microns, less than or equal to 45 microns, less than or equal to 40 microns, less than or equal to 35 microns, less than or equal to 30 microns, less than or equal to 25 microns, less than or equal to 20 microns, less than or equal to 15 microns, or less than or equal to 10 microns. Combinations of these ranges are also possible (e.g., greater than or equal to 4 microns and less than or equal to 50 microns or greater than or equal to 7 microns and less than or equal to 15 microns).

In some embodiments, the method comprises drying the mixture (e.g., at any temperature below the decomposition temperature of the electrode material) to form an electrode (e.g., any electrode described herein, such as a second electrode, such as a cathode). In some embodiments, a protective layer (e.g., any protective layer described herein) is disposed on the electrode. In some embodiments, the protective layer comprises a first reactive species and/or a reaction product thereof (e.g., any reaction product described herein, such as a reaction product between a transition metal in the electrode material and the first reactive species, a reaction product between the first reactive species and the second reactive species, and/or a reaction product between a transition metal, the first reactive species, and the second reactive species (e.g., a reaction product between a transition metal and a reaction product of the first reactive species and the second reactive species)).

In some embodiments, the method comprises combining the electrode (e.g., second electrode, such as a cathode) (e.g., electrode 200 of FIG. 1A or FIG. 1B) with another electrode (e.g., a first electrode, such as an anode) (e.g., first electrode 100 of FIG. 1C and first electrode 100 of FIG. 1D) to form an electrochemical cell.

In some embodiments, the method comprises adding an electrolyte (e.g., electrolyte 300 of FIG. 1E and electrolyte 300 of FIG. 1F) to the electrochemical cell. The electrolyte may be any suitable electrolyte (e.g., any electrolyte described herein). In some embodiments, the electrolyte comprises a first reactive species (i.e., a species comprising a conjugated, negatively-charged ring including a nitrogen atom) and/or a second reactive species (e.g., a species comprising a labile halogen atom), as discussed in more detail herein. In some embodiments, the first reactive species and/or the second reactive species may react with each other and/or an electrode (e.g., lithium metal in the first electrode and/or a transition metal in the second electrode) to form reaction products (e.g., a reaction product between a metal (e.g., lithium metal and/or transition metal) and the first reactive species, a reaction product between the first reactive species and the second reactive species, and/or a reaction product between a metal (e.g., lithium metal and/or transition metal), the first reactive species, and the second reactive species (e.g., a reaction product between a metal and a reaction product of the first reactive species and the second reactive species).

When present, a second reactive species (e.g., a species comprising a labile halogen atom) may make up a variety of suitable amounts of an electrochemical cell (e.g., an electrolyte). Although the second reactive species may be present in portions of the electrochemical cell other than the electrolyte (in addition to or instead of being present in the electrolyte), it may be convenient to describe the amount of the second reactive species with reference to the amount of the electrolyte. Therefore, the wt % ranges listed below are with respect to the total weight of the electrolyte, including any second reactive species present therein and any counter ions therein. Additionally, it should be understood that the ranges listed below may refer to any of the following: (1) the total amount of a particular second reactive species and any counter ion(s) in the electrochemical cell as a whole; (2) the amount of a particular second reactive species and any counter ion(s) in the electrolyte (with further amounts of the second reactive species, or not); (3) the amount of all second reactive species and any counter ions in the electrochemical cell as a whole; and (4) the amount of all second reactive species and any counter ions in the electrolyte (with further amounts of the second reactive species in other locations in the electrochemical cell, or not).

In some embodiments, an electrochemical cell comprises a second reactive species (e.g., a species comprising a labile halogen atom) and any counter ion(s) thereof in an amount of greater than or equal to 5 wt %, greater than or equal to 7 wt %, greater than or equal to 10 wt %, greater than or equal to 15 wt %, greater than or equal to 20 wt %, or greater than or equal to 25 wt %. In some embodiments, an electrochemical cell comprises a second reactive species (e.g., a species comprising a labile halogen atom) and any counter ion(s) thereof in an amount of less than or equal to 50 wt %, less than or equal to 45 wt %, less than or equal to 40 wt %, less than or equal to 35 wt %, or less than or equal to 30 wt %. Combinations of these ranges are also possible (e.g., greater than or equal to 5 wt % and less than or equal to 50 wt % or greater than or equal to 10 wt % and less than or equal to 30 wt %).

In some embodiments, the method comprises forming a protective layer disposed on the first electrode, wherein the protective layer comprises a first reactive species (i.e., a species comprising a conjugated, negatively-charged ring including a nitrogen atom) and/or one or more of these reaction products. For example, in FIG. 1F, in some embodiments, layer 406 (e.g., a protective layer) is disposed on first electrode 100, and may comprise a first reactive species and/or a reaction product thereof (e.g., a reaction product between lithium metal and the first reactive species, a reaction product between the first reactive species and the second reactive species, and/or a reaction product between lithium metal, the first reactive species, and the second reactive species (e.g., between lithium metal and a reaction product of the first reactive species and the second reactive species).

In some embodiments, the method comprises forming a protective layer disposed on the second electrode, wherein the protective layer comprises a first reactive species (i.e., a species comprising a conjugated, negatively-charged ring including a nitrogen atom) and/or a reaction product thereof (e.g., a reaction product between the transition metal and the first reactive species; a reaction product between the first reactive species and the second reactive species; and/or a reaction product between the transition metal, the first reactive species, and the second reactive species (e.g., a reaction product between the transition metal and a reaction product of the first reactive species and the second reactive species)). In some embodiments, the protective layer disposed on the second electrode may be disposed on a protective layer that was disposed on the electrode before addition of the electrolyte. In some embodiments, the two protective layers may be the same or they may be different.

In some embodiments, the electrolyte is placed in the electrochemical cell prior to an initial use (e.g., prior to an initial charge-discharge cycle, or prior to 5th, 10th, 15th, or 20th charge-discharge cycles). For example, in some embodiments, the electrolyte is placed in the electrochemical cell prior to an initial use, such that there is sufficient time for a reaction product(s) and/or protective layer to be formed. In some embodiments, the electrolyte is placed in the electrochemical cell at least 24 hours, at least 36 hours, at least 48 hours, or at least 72 hours prior to an initial use (e.g., 1-7 days prior to an initial use (e.g., prior to an initial charge-discharge cycle, or prior to 5th, 15th, or 20th charge-discharge cycles)).

It should be understood that the location of the first reactive species and/or the second reactive species may not be limited to the electrolyte. In some embodiments, an electrode may comprise pores, and one or both of a first reactive species and a second reactive species may be present in the pores of the electrode. In some embodiments, the electrode is a second electrode (e.g., a cathode). Other possible locations for the first reactive species and the second reactive species include the pores of a separator in an electrochemical cell (e.g., in electrolyte disposed therein) and/or in one or more reservoir(s) from which they may be released into another location in the electrochemical cell (e.g., the electrolyte). In some embodiments, the first reactive species and/or the second reactive species may be in multiple locations within an electrochemical cell.

In some embodiments, an electrochemical cell includes a first reactive species, i.e., a species comprising a conjugated, negatively-charged ring including a nitrogen atom, in a first location and a second reactive species, such as a species comprising a labile halogen atom, in a location other than the first location (e.g. a second location). In some embodiments, the first location lacks the species comprising the second reactive species, and/or the second location lacks the first reactive species. By way of example, an electrochemical cell may include a first reservoir comprising the first reactive species (and, optionally, lacking the second reactive species) and a second reservoir comprising the second reactive species (and, optionally, lacking the first reactive species).

In some embodiments, a single component of an electrochemical cell (e.g., electrolyte) comprises both the first reactive species (i.e., a species comprising a conjugated, negatively-charged ring including a nitrogen atom) and the second reactive species (e.g., a species comprising the labile halogen atom).

It should also be understood that FIGS. 1A-1F are exemplary, and that other variations from FIGS. 1A-1F not described herein are also possible. For instance, some embodiments relate to protective layers comprising the first reactive species and/or advantageous reaction products formed by methods other than that shown in FIGS. 1A-1F. As another example, some processes and/or reactions described herein, such as the deposit of the first reactive species and/or a reaction of the first reactive species (e.g., between the first reactive species and a metal; between the first reactive species and the second reactive species; or between a metal, the first reactive species, and the second reactive species), may result in the formation of an advantageous structure other than a layer and/or may result in the formation of an advantageous reaction product that is incorporated into an existing structure already present in the electrochemical cell (e.g., an SEI, a previously-formed protective layer, an electrode, an electrolyte).

When present, a first reactive species (i.e., a species comprising a conjugated, negatively-charged ring including a nitrogen atom) may make up a variety of suitable amounts of an electrochemical cell. Although the first reactive species may be present in portions of the electrochemical cell other than the electrolyte (in addition to or instead of being present in the electrolyte), it may be convenient to describe the amount of the first reactive species with reference to the amount of the electrolyte. Therefore, the wt % ranges listed below are with respect to the total weight of the electrolyte, including any first reactive species present therein and any counter ions therein. Additionally, it should be understood that the ranges listed below may refer to any of the following: (1) the total amount of a particular first reactive species and any counter ion(s) in the electrochemical cell as a whole; (2) the amount of a particular first reactive species and any counter ion(s) in the electrolyte (with further amounts of the first reactive species, or not); (3) the amount of all first reactive species and any counter ions in the electrochemical cell as a whole; and (4) the amount of all first reactive species and any counter ions in the electrolyte (with further amounts of the first reactive species in other locations in the electrochemical cell, or not).

In some embodiments, an electrochemical cell comprises a first reactive species (i.e., a species comprising a conjugated, negatively-charged ring including a nitrogen atom) and any counter ion(s) thereof in an amount of greater than or equal to 0.01 wt %, greater than or equal to 0.02 wt %, greater than or equal to 0.05 wt %, greater than or equal to 0.075 wt %, greater than or equal to 0.1 wt %, greater than or equal to 0.2 wt %, greater than or equal to 0.5 wt %, greater than or equal to 0.75 wt %, greater than or equal to 1 wt %, greater than or equal to 2 wt %, or greater than or equal to 3 wt % versus the total weight of the electrolyte. In some embodiments, an electrochemical cell comprises a first reactive species and its counter ion(s) in an amount of less than or equal to 5 wt %, less than or equal to 3 wt %, less than or equal to 2 wt %, less than or equal to 1 wt %, less than or equal to 0.75 wt %, less than or equal to 0.5 wt %, less than or equal to 0.2 wt %, less than or equal to 0.1 wt %, less than or equal to 0.075 wt %, less than or equal to 0.05 wt %, or less than or equal to 0.02 wt % versus the total weight of the electrolyte. Combinations of the above-referenced ranges are also possible (e.g., greater than or equal to 0.01 wt % and less than or equal to 5 wt %, or greater than or equal to 1 wt % and less than or equal to 3 wt %). Other ranges are also possible.

A variety of first reactive species may be appropriate for inclusion in the electrochemical cells described herein. As described above, the first reactive species comprises a conjugated, negatively-charged ring including a nitrogen atom (i.e., a "reactive ring"). In some embodiments, the first reactive species and/or reactive ring comprises more than one nitrogen atom (e.g., greater than or equal to 2 nitrogen atoms or greater than or equal to 3 nitrogen atoms; less than or equal to 5 nitrogen atom, less than or equal to 4 nitrogen atoms, less than or equal to 3 nitrogen atoms, or less than or equal to 2 nitrogen atoms; combinations thereof are also possible, such as 1-5 nitrogen atoms or 2-3 nitrogen atoms).

In some embodiments, the first reactive species and/or reactive ring comprises a substituted or unsubstituted 1,2,4-triazole, substituted or unsubstituted 1,2,3-triazole, substituted or unsubstituted 1,3,4-triazole, substituted or unsubstituted pyrazole, substituted or unsubstituted imidazole, substituted or unsubstituted tetrazole, substituted or unsubstituted benzimidazole, substituted or unsubstituted indazole, and/or substituted or unsubstituted benzotriazole. In some embodiments, the first reactive species and/or reactive ring comprises a pyrrolate derivative, an azolate derivative, an imidazolate derivative, a pyrazolate derivative, and/or a triazolate derivative.

In some embodiments, the first reactive species and/or reactive ring is substituted (e.g., mono-substituted or poly-substituted). Examples of suitable substituents include alkyl, aryl, alkoxy, aryloxy, nitro, amino, thio, fluoro, chloro, bromo, iodo, and/or phosphate substituents, and/or any substituent disclosed herein.

Some first reactive species may have one or more structural features that are particularly advantageous. In some embodiments, first reactive species that are particularly reactive with species comprising a labile halogen atom may be particularly desirable. In other words, in some embodiments, it may be particularly desirable for the second reactive species to be a species comprising a labile halogen atom and for the first reactive species to be particularly reactive with such species. Thus, chemical properties of the first reactive species that promote reaction with the species comprising a labile halogen atom may also be desirable, in some embodiments. These chemical properties may include, for example, a negative charge that delocalizes to a relatively high degree over the reactive ring.

Without wishing to be bound by any particular theory, electron withdrawing groups may reduce the reactivity of the reactive ring and/or first reactive species in nucleophilic substitution reactions (e.g., in nucleophilic substitution reactions, in reactions with the second reactive species, and/or in reactions with metals (e.g., lithium metal and/or transition metal)), while electron donating groups may increase the reactivity of the reactive ring and/or first reactive species (e.g., in nucleophilic substitution reactions, in reactions with the second reactive species, and/or in reactions with metals (e.g., lithium metal and/or transition metal)). Without wishing to be bound by any particular theory, a localized negative charge on a reactive ring may increase the reactivity of the reactive ring and/or first reactive species (compared to a relatively more delocalized negative charge) (e.g., in nucleophilic substitution reactions, in reactions with the second reactive species, and/or in reactions with metals (e.g., lithium metal and/or transition metal)). Structural features of the reactive ring that may cause it to have one or more advantageous chemical properties are described in further detail below.

As described above, it may be beneficial for a first reactive species to be negatively charged. In some embodiments, the first reactive species is charged as a whole. The charge may be a negative charge; i.e., the first reactive species may be an anion. In some embodiments, the first reactive species is a monovalent anion. When charged, the first reactive species may have one or more counter ions. The counter ion(s) may be present in the same location(s) in the electrochemical cell as the first reactive species, such as the electrolyte and/or the second electrode. Further details regarding suitable counter ions will be provided below.

In some embodiments, the presence of certain functional groups (e.g., electron-withdrawing groups, such as strong electron-withdrawing groups) on the first reactive species is disadvantageous. Accordingly, in some embodiments, such disadvantageous functional groups (e.g., electron-withdrawing groups, such as strong electron-withdrawing groups) are absent from the first reactive species and/or reactive ring.

In other embodiments, a first reactive species and/or reactive ring includes one or more functional groups that may be disadvantageous in limited amounts. By way of example, some first reactive species and/or reactive rings include a relatively small number of electron-withdrawing groups in total and/or in some locations. For instance, the first reactive species and/or reactive ring may include at most one electron-withdrawing group. In other embodiments, the first reactive species and/or reactive ring includes more than one electron-withdrawing group but still includes relatively few electron-withdrawing groups. For instance, the first reactive species and/or reactive ring may include at most two or at most three electron-withdrawing groups. Without wishing to be bound by any particular theory, it is believed that electron-withdrawing groups may reduce the reactivity of the reactive ring (e.g., in nucleophilic substitution reactions, in reactions with the second reactive species, and/or in reactions with metals (e.g., lithium metal and/or transition metal). For example, it is believed that the electron-withdrawing groups may make it less likely to, e.g., attack the relatively electropositive portion of the species comprising the labile halogen atom to which the labile halogen atom is attached. This reduction in reactivity may undesirably cause the formation of one or more reaction products (e.g., a reaction product between the metal (e.g., lithium metal or transition metal) and the first reactive species; a reaction product between the first reactive species and the second reactive species; and/or a reaction product between the metal, the first reactive species, and the second reactive species (e.g., a reaction product between the metal and the reaction product between the first reactive species and the second reactive species) to occur more slowly or not at all.

Electron-withdrawing groups are typically classified into strong electron-withdrawing groups, moderate electron-withdrawing groups, and weak electron-withdrawing groups, examples of which are provided below. Strong electron-withdrawing groups are believed to provide the above-mentioned undesirable effects to a greater degree than moderate electron-withdrawing groups, and moderate electron-withdrawing groups are believed to provide the above-mentioned undesirable effects to a greater degree than weak electron-withdrawing groups. In some embodiments, a first reactive species and/or reactive ring comprises one or more moderate and/or weak electron-withdrawing groups but no strong electron-withdrawing groups, or comprises one or more weak electron-withdrawing groups but no moderate or strong electron-withdrawing groups. In some embodiments, a first reactive species and/or reactive ring comprises no weak, moderate, or strong electron-withdrawing groups (i.e., a first reactive species and/or reactive ring comprises no electron-withdrawing groups).

In some embodiments, a first reactive species and/or reactive ring may comprise at most one, at most two, or at most three strong electron-withdrawing groups. A first reactive species and/or reactive ring may comprise at most one, at most two, or at most three moderate electron-withdrawing groups. A first reactive species and/or reactive ring may comprise at most one, at most two, or at most three weak electron-withdrawing groups. Suitable combinations of the above are also possible (e.g., a first reactive species and/or reactive ring may comprise between one and three electron-withdrawing groups, between one and three strong electron-withdrawing groups, between one and three moderate electron-withdrawing groups, or between one and three weak electron-withdrawing groups).

Non-limiting examples of strong electron-withdrawing groups include triflyl groups, trihalide groups, cyano groups, sulfonate groups, nitro groups, ammonium groups, and quaternary amine groups. Non-limiting examples of moderate electron-withdrawing groups include aldehyde groups, ketone groups, carboxylic acid groups, acyl chloride groups, ester groups, and amide groups. Non-limiting examples of weak electron-withdrawing groups include halide groups, phosphate groups, thiocyanate groups, isocyanate groups, isothiocyanate groups, and thiocarbamate groups.

In some embodiments, a first reactive species and/or reactive ring comprises one or more functional groups that may be advantageous. The first reactive species and/or reactive ring may comprise these functional groups in relatively higher amounts compared to other first reactive species and/or compared to the number of other types of functional groups (e.g., functional groups that are not advantageous and/or functional groups that are disadvantageous) present in the first reactive species and/or reactive ring. By way of example, some first reactive species and/or reactive rings include a relatively large number of electron-donating groups in total and/or in some locations. For instance, the first reactive species and/or reactive ring may include one or more electron-donating groups. In some embodiments, the first reactive species and/or reactive ring including the nitrogen atom comprises at least two, at least three, or more electron-donating groups. In other embodiments, the first reactive species and/or reactive ring lacks electron-donating groups.

Without wishing to be bound by any particular theory, it is believed that electron-donating groups may enhance the reactivity of a reactive ring (e.g., in nucleophilic substitution reactions, in reactions with the second reactive species, and/or in reactions with metals (e.g., lithium metal and/or transition metal)). It is believed that this occurs for similar reasons described above with respect to electron-withdrawing groups, namely, that the electron-donating groups increase the charge on the reactive ring (compared to reactive rings lacking the electron-withdrawing group, all other factors being equal). The increased charge on the reactive ring may make it more likely to react (e.g., in nucleophilic substitution reactions, in reactions with the second reactive species, and/or in reactions with metals (e.g., lithium metal and/or transition metal)). For instance, when the second reactive species is a species comprising a labile halogen atom, the increased charge on the reactive ring may allow it to attack the relatively electropositive portion of the species comprising the labile halogen atom to which the labile halogen atom is attached. This may advantageously cause the formation of the desirable reaction product shown in Reaction I to occur more rapidly.

In some embodiments, a first reactive species and/or reactive ring comprises one or more electron-donating groups and an electron-withdrawing group (e.g., at most one electron-withdrawing group). In some embodiments, a first reactive species and/or reactive ring comprises the same number of electron-donating groups and electron-withdrawing groups. In some embodiments, a first reactive species and/or reactive ring comprises more electron-donating groups than electron-withdrawing groups. In some embodiments, the total strength of electron-donating groups on a first reactive species and/or reactive ring is higher than the total strength of electron-withdrawing groups on a first reactive species and/or reactive ring (e.g., if a first reactive species and/or reactive ring had a strong electron-donating group and a weak electron-withdrawing group). Without wishing to be bound by any particular theory, it is believed that the presence of one or more electron-donating groups may offset the negative effects of the electron-withdrawing groups described above.

Electron-donating groups are typically classified into strong electron-donating groups, moderate electron-donating groups, and weak electron-donating groups. Strong electron-donating groups are believed to provide the above-mentioned desirable effects to a greater degree than moderate electron-donating groups, and moderate electron-donating groups are believed to provide the above-mentioned desirable effects to a greater degree than weak electron-donating groups. In some embodiments, a first reactive species and/or reactive ring includes one or more strong electron-donating groups but no moderate or weak electron-donating groups, or includes one or more strong and/or moderate electron-donating groups but no weak electron-donating groups. A first reactive species and/or reactive ring may comprise at least one, at least two, or at least three strong electron-donating groups. A first reactive species and/or reactive ring may comprise at least one, at least two, or at least three moderate electron-donating groups. A first reactive species and/or reactive ring may include at least one, at least two, or at least three weak electron-donating groups. Suitable combinations of the above are also possible (e.g., a first reactive species and/or reactive ring may comprise between one and three electron-donating groups, between one and three strong electron-donating groups, between one and three moderate electron-donating groups, or between one and three weak electron-donating groups). In some embodiments, a first reactive species and/or reactive ring has no strong electron-donating groups, no moderate electron-donating groups, and/or no weak electron-donating groups.

Non-limiting examples of strong electron-donating groups include oxide groups, thiolate groups, tertiary amine groups, secondary amine groups, primary amine groups, ether groups, thioether groups, alcohol groups, thiol groups, and some alkoxy groups. Non-limiting examples of moderate electron-donating groups include amide groups, thioamide groups, ester groups, thioate groups, dithioate groups, thioester groups, and some alkoxy groups. Non-limiting embodiments of weak electron-donating groups include aliphatic groups (e.g., alkyl groups), aromatic groups (e.g., phenyl groups), heteroaromatic groups, and vinyl groups.

In some embodiments, a first reactive species may have one or more chemical properties indicative of an advantageous level of reactivity (e.g., with a metal, such as a lithium metal or a transition metal, and/or with a second reactive species, such as a species comprising a labile halogen atom). These chemical properties may include, for example, a lack of stability in some chemical environments, which may give an indication of the general reactivity of the first reactive species. By way of example, in some embodiments, the first reactive species is unstable in water at standard pressure and temperature conditions.

A first reactive species may comprise a variety of suitable numbers of rings. Such a species may be monocyclic or may be polycyclic. In some embodiments where the first reactive species is monocyclic, the first reactive species and/or reactive ring is a 5-membered ring, a 6-membered ring, a 9-membered ring, a 12-membered ring, or a 16-membered ring. When the first reactive species is polycyclic, it may be bicyclic, tricyclic, or may include four or more rings. Each ring present in a polycyclic first reactive species may be a variety of sizes. For instance, a polycyclic first reactive species may comprise a 5-membered ring, a 6-membered ring, a 9-membered ring, a 12-membered ring, a 16-membered ring, and/or combinations thereof. In some embodiments, a polycyclic first reactive species comprises both a 5-membered ring and a 6-membered ring. In some embodiments, a polycyclic first reactive species comprises two 6-membered rings (e.g., in addition to a 5-membered ring).

In some embodiments, a first reactive species may have a structure as shown below:

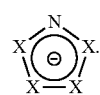

(Formula I)

In some embodiments of Formula each instance of X may independently be selected from the group consisting of —N= and

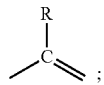

wherein each instance of R may independently be selected from the group consisting of hydrogen, optionally substituted alkyl, alkoxy, halo, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, nitro, optionally substituted sulfonyl, optionally substituted acyl, optionally substituted oxyacyloxy, optionally substituted aminoacyl, azide, optionally substituted amino, optionally substituted phosphine, optionally substituted sulfide, isonitrile, cyanate, isocyanate, or nitrile, or, optionally, wherein any two instances of R are joined to form a ring.

In some embodiments of Formula I: each instance of X may independently be selected from the group consisting of —N= and

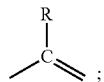

wherein each instance of R may independently be selected from the group consisting of hydrogen, optionally substituted alkyl, alkoxy, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, optionally substituted oxyacyloxy, optionally substituted aminoacyl, azide, optionally substituted amino, optionally substituted phosphine, optionally substituted sulfide, or, optionally, wherein any two instances of R are joined to form a ring.

In some embodiments, a first reactive species has a structure as in Formula I, and at most one instance of R, or no instance of R, is an electron-withdrawing group. In some embodiments, a first reactive species has a structure as in Formula I, and at least one instance of R (or at least two instances of R, at least three instances of R, or four instances of R) is an electron-donating group. In some embodiments, a first reactive species has a structure as in Formula I, and comprises one instance of R that is an electron-withdrawing group and at least one instance of R that is an electron-donating group. Molecules with the structure shown in Formula I may be referred to elsewhere herein as "azolates."

In some embodiments, no instance of X is —N= and four instances of X are —CR=. In some embodiments, one instance of X is —N= and three instances of X are —CR=. In some embodiments, two instances of X are —N= and two instances of X are —CR=. In some embodiments, three instances of X are —N= and one instance of X is —CR=.

In some embodiments, no two instances of R are joined to form a ring. In some embodiments, two instances of R are joined to form a ring (e.g., a first aromatic ring). In some embodiments, the first aromatic ring comprises at least one nitrogen atom. In some embodiments, two instances of R are joined to form a first ring (e.g., a first aromatic ring) and two instances of R are joined to form a second ring (e.g., a second aromatic ring). In some such embodiments, at least one of the first and second aromatic rings comprises at least one nitrogen atom.

In Formula I, the negative charge is shown as being delocalized over the five-membered ring of Formula I. For some first reactive species, such as some azolates, Formula I may appropriately show the distribution of charge. For other species, a representation in which the negative charge is localized to one or more atoms or regions of the molecule is more representative of the actual charge distribution in the molecule. Formula IA, below, shows one such representation of the molecule shown in Formula I.

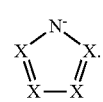

(Formula iA)

It should be understood that first reactive species may have a variety of distributions of the negative charge, including a distribution like that shown in Formula I, a distribution like that shown in Formula IA, and distributions other than those shown in Formulas I and IA. It should also be understood that the depiction of the distribution of charge in the chemical structure of a molecule is not limiting, and that references to Formulas shown herein should be understood to refer to the arrangement of atoms shown in the Formula but not necessarily the distribution of charge shown in the Formula.

In some embodiments, a first reactive species has a structure as in Formula I and at least two instances of X are

and at least two instances of R are joined to form a ring. In other words, two groups attached to the reactive ring (e.g., in the 1,2-position of a double bond therein) may form, together with one or more atoms forming the reactive ring, a first further ring fused to the reactive ring. The first further ring fused to the reactive ring may be substituted or unsubstituted, unsaturated or saturated, and heterocyclic or homocyclic. In some embodiments, the first further fused ring is a 5-membered ring or a 6-membered ring. One or more further rings may optionally be fused to the first fused ring and/or the reactive ring. These additional rings may each, independently, be substituted or unsubstituted, unsaturated or saturated, heterocyclic or homocyclic, and may have a variety of suitable ring sizes (e.g., 5-membered ring or 6-membered ring). An example of such a structure is shown illustratively in Formula IB.

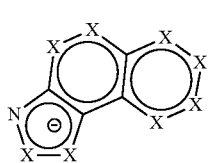

(Formula IB)

In some embodiments, a first reactive species comprises two further fused rings (in addition to the reactive ring) that are not directly fused to each other. For instance, two sets of groups attached in the 1,2-positions of two double bonds of the reactive ring may each form separate rings, each of which includes one of the double bonds. Each of these additional rings may, independently, be substituted or unsubstituted, unsaturated or saturated, heterocyclic or homocyclic, and may have a variety of suitable ring sizes (e.g., 5-membered ring or 6-membered ring). An example of such a structure is shown illustratively in Formula IC.

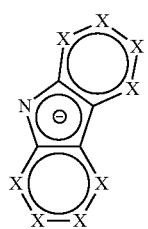

(Formula IC)

In other embodiments, fewer than two instances of X are

and/or no two instances of R are joined to form a ring.

In some embodiments, an electrochemical cell comprises a first reactive species having a structure as in Formula I for which each instance of X is independently

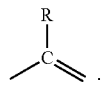

This structure is shown below in Formula II.

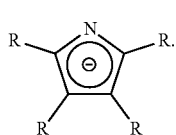

(Formula II)

In some embodiments of Formula II, each instance of R is independently selected from the group consisting of hydrogen, optionally substituted alkyl, alcohol, halo, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, nitro, optionally substituted sulfonyl, optionally substituted acyl, optionally substituted oxyacyloxy, optionally substituted aminoacyl, azide, optionally substituted amino, optionally substituted phosphine, optionally substituted sulfide, isonitrile, cyanate, isocyanate, or nitrile, or, optionally, wherein any two instances of R are joined to form a ring.

In some embodiments of Formula II, each instance of R is independently selected from the group consisting of hydrogen, optionally substituted alkyl, alcohol, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, optionally substituted oxyacyloxy, optionally substituted aminoacyl, azide, optionally substituted amino, optionally substituted phosphine, optionally substituted sulfide, or, optionally, wherein any two instances of R are joined to form a ring.

In some embodiments, a first reactive species has a structure as in Formula II, and at most one instance of R, or no instance of R, is an electron-withdrawing group. In some embodiments, a first reactive species has a structure as in Formula II, and at least one instance of R (or at least two instances of R, at least three instances of R, or four instances of R) is an electron-donating group. In some embodiments, a first reactive species has a structure as in Formula I, and comprises one instance of R that is an electron-withdrawing group and at least one instance of R that is an electron-donating group. Molecules having the structure shown in Formula II may be referred to elsewhere herein as "pyrrolates."

In some embodiments, a first reactive species has a structure as in Formula II and two instances of R are joined together to form a ring. Several such first reactive species are shown below:

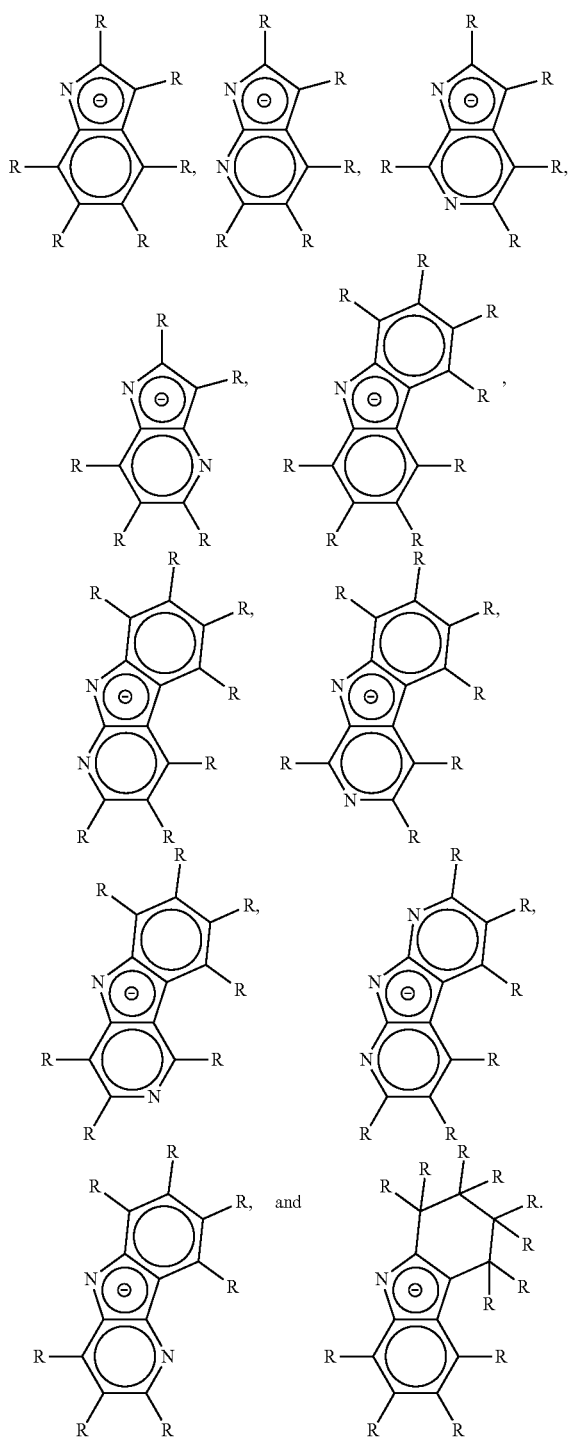

For each of the structures shown above, in some embodiments, each instance of R is independently selected from the group consisting of hydrogen, optionally substituted alkyl, alcohol, halo, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, nitro, optionally substituted sulfonyl, optionally substituted acyl, optionally substituted oxyacyloxy, optionally substituted aminoacyl, azide, optionally substituted amino, optionally substituted phosphine, optionally substituted sulfide, isonitrile, cyanate, isocyanate, or nitrile. In some embodiments, at least two instances of R are joined to form a further ring in addition to the rings shown in the structures above.

For each of the structures shown above, in some embodiments, each instance of R is independently selected from the group consisting of hydrogen, optionally substituted alkyl, alcohol, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, nitro, optionally substituted oxyacyloxy, optionally substituted aminoacyl, azide, optionally substituted amino, optionally substituted phosphine, or optionally substituted sulfide. In some embodiments, at least two instances of R are joined to form a further ring in addition to the rings shown in the structures above.

In some embodiments, an electrochemical cell comprises a first reactive species having a

structure as in Formula I for which three instances of X are and one instance of X is —N=. One possible structure having this feature is shown below in Formula III.

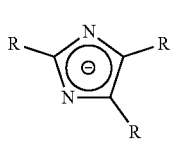

(Formula III)

In Formula III, in some embodiments, each instance of R is independently selected from the group consisting of hydrogen, optionally substituted alkyl, alcohol, halo, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, nitro, optionally substituted sulfonyl, optionally substituted acyl, optionally substituted oxyacyloxy, optionally substituted aminoacyl, azide, optionally substituted amino, optionally substituted phosphine, optionally substituted sulfide, isonitrile, cyanate, isocyanate, or nitrile, or at least two instances of R are joined to form a further ring in addition to the rings shown in the structures above.

In some embodiments of Formula III, each instance of R is independently selected from the group consisting of hydrogen, optionally substituted alkyl, alcohol, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, optionally substituted oxyacyloxy, optionally substituted aminoacyl, azide, optionally substituted amino, optionally substituted phosphine, or optionally substituted sulfide, or at least two instances of R are joined to form a further ring in addition to the rings shown in the structures above.

In some embodiments, a first reactive species has a structure as in Formula III, and at most one instance of R, or no instance of R, is an electron-withdrawing group. In some embodiments, a first reactive species has a structure as in Formula III, and at least one instance of R (or at least two instances of R, or three instances of R) is an electron-donating group. In some embodiments, a first reactive species has a structure as in Formula III, and comprises one instance of R that is an electron-withdrawing group and at least one instance of R that is an electron-donating group. Molecules having the structure shown in Formula III may be referred to elsewhere herein as "imidazolates."

In some embodiments, a first reactive species has a structure as in Formula III and two instances of R are joined together to form a ring. Two such first reactive species are shown below:

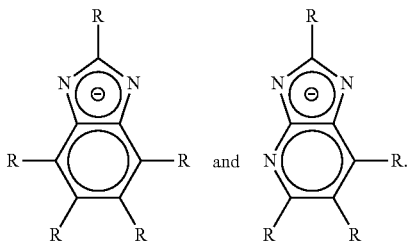

For each of the structures shown above, in some embodiments, each instance of R is independently selected from the group consisting of hydrogen, optionally substituted alkyl, alcohol, halo, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, nitro, optionally substituted sulfonyl, optionally substituted acyl, optionally substituted oxyacyloxy, optionally substituted aminoacyl, azide, optionally substituted amino, optionally substituted phosphine, optionally substituted sulfide, isonitrile, cyanate, isocyanate, or nitrile. In some embodiments, at least two instances of R are joined to form a further ring in addition to the rings shown in the structures above.

For each of the structures shown above, in some embodiments, each instance of R is independently selected from the group consisting of hydrogen, optionally substituted alkyl, alcohol, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, optionally substituted oxyacyloxy, optionally substituted aminoacyl, azide, optionally substituted amino, optionally substituted phosphine, or optionally substituted sulfide. In some embodiments, at least two instances of R are joined to form a further ring in addition to the rings shown in the structures above.

Another possible structure for a first reactive species having a structure as in Formula I for which three instances of X are

and one instance of X is —N= is shown below in Formula IV.

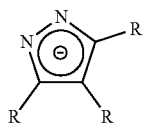

(Formula IV)

In some embodiments of Formula IV, each instance of R is independently selected from the group consisting of hydrogen, optionally substituted alkyl, alcohol, halo, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, nitro, optionally substituted sulfonyl, optionally substituted acyl, optionally substituted oxyacyloxy, optionally substituted aminoacyl, azide, optionally substituted amino, optionally substituted phosphine, optionally substituted sulfide, isonitrile, cyanate, isocyanate, or nitrile. In some embodiments, at least two instances of R are joined to form a further ring in addition to the rings shown in the structures above.

In some embodiments of Formula IV, each instance of R is independently selected from the group consisting of hydrogen, optionally substituted alkyl, alcohol, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, optionally substituted oxyacyloxy, optionally substituted aminoacyl, azide, optionally substituted amino, optionally substituted phosphine, or optionally substituted sulfide. In some embodiments, at least two instances of R are joined to form a further ring in addition to the rings shown in the structures above.

In some embodiments, a first reactive species has a structure as in Formula IV, and at most one instance of R, or no instance of R, is an electron-withdrawing group. In some embodiments, a first reactive species has a structure as in Formula IV, and at least one instance of R (or at least two instances of R, or three instances of R) is an electron-donating group. In some embodiments, a first reactive species has a structure as in Formula IV, and comprises one instance of R that is an electron-withdrawing group and at least one instance of R that is an electron-donating group. Molecules having the structure shown in Formula IV may be referred to elsewhere herein as "pyrazolates."

In some embodiments, a first reactive species has a structure as in Formula IV and two instances of R are joined together to form a ring. One such first reactive species is shown below:

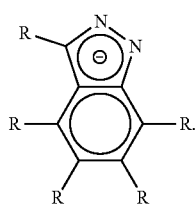

For the structure shown above, in some embodiments, each instance of R is independently selected from the group consisting of hydrogen, optionally substituted alkyl, alcohol, halo, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, nitro, optionally substituted sulfonyl, optionally substituted acyl, optionally substituted oxyacyloxy, optionally substituted aminoacyl, azide, optionally substituted amino, optionally substituted phosphine, optionally substituted sulfide, isonitrile, cyanate, isocyanate, or nitrile. In some embodiments, at least two instances of R are joined to form a further ring in addition to the rings shown in the structure above.

For the structure shown above, in some embodiments, each instance of R is independently selected from the group consisting of hydrogen, optionally substituted alkyl, alcohol, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, optionally substituted oxyacyloxy, optionally substituted aminoacyl, azide, optionally substituted amino, optionally substituted phosphine, or optionally substituted sulfide. In some embodiments, at least two instances of R are joined to form a further ring in addition to the rings shown in the structure above.

In some embodiments, an electrochemical cell comprises a first reactive species having a structure as in Formula I for which two instances of X are

and two instances of X are —N═. Molecules with this feature may be referred to elsewhere herein as "triazolates." One possible structure having this feature is shown below in Formula V.

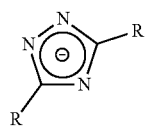

(Formula V)

In some embodiments of Formula V, each instance of R is independently selected from the group consisting of hydrogen, optionally substituted alkyl, alcohol, halo, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, nitro, optionally substituted sulfonyl, optionally substituted acyl, optionally substituted oxyacyloxy, optionally substituted aminoacyl, azide, optionally substituted amino, optionally substituted phosphine, optionally substituted sulfide, isonitrile, cyanate, isocyanate, or nitrile. In some embodiments, at least two instances of R are joined to form a further ring in addition to the rings shown in the structure above.

In some embodiments of Formula V, each instance of R is independently selected from the group consisting of hydrogen, optionally substituted alkyl, alcohol, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, optionally substituted oxyacyloxy, optionally substituted aminoacyl, azide, optionally substituted amino, optionally substituted phosphine, or optionally substituted sulfide. In some embodiments, at least two instances of R are joined to form a further ring in addition to the rings shown in the structure above.

In some embodiments, a first reactive species has a structure as in Formula V, and at most one instance of R, or no instance of R, is an electron-withdrawing group. In some embodiments, a first reactive species has a structure as in Formula V, and at least one instance of R (or two instances of R) is an electron-donating group. In some embodiments, a first reactive species has a structure as in Formula V, and comprises one instance of R that is an electron-withdrawing group and one instance of R that is an electron-donating group. In some embodiments, a first reactive species has a structure as in Formula V and two instances of R are joined together to form a ring.

Another possible structure for a first reactive species having a structure as in Formula I for which two instances of X are

and two instances of X are —N═ is shown below in Formula VI.

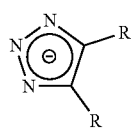

(Formula VI)

In some embodiments of Formula VI, each instance of R is independently selected from the group consisting of hydrogen, optionally substituted alkyl, alcohol, halo, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, nitro, optionally substituted sulfonyl, optionally substituted acyl, optionally substituted oxyacyloxy, optionally substituted aminoacyl, azide, optionally substituted amino, optionally substituted phosphine, optionally substituted sulfide, isonitrile, cyanate, isocyanate, or nitrile. In some embodiments, at least two instances of R are joined to form a further ring in addition to the rings shown in the structure above.

In some embodiments of Formula VI, each instance of R is independently selected from the group consisting of hydrogen, optionally substituted alkyl, alcohol, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, optionally substituted oxyacyloxy, optionally substituted aminoacyl, azide, optionally substituted amino, optionally substituted phosphine, or optionally substituted sulfide. In some embodiments, at least two instances of R are joined to form a further ring in addition to the rings shown in the structure above.

In some embodiments, a first reactive species has a structure as in Formula VI, and at most one instance of R, or no instance of R, is an electron-withdrawing group. In some embodiments, a first reactive species has a structure as in Formula VI, and at least one instance of R (or two instances of R) is an electron-donating group. In some embodiments, a first reactive species has a structure as in Formula VI, and comprises one instance of R that is an electron-withdrawing group and one instance of R that is an electron-donating group. In some embodiments, a first reactive species has a structure as in Formula VI and two instances of R are joined together to form a ring.

In some embodiments, an electrochemical cell comprises a first reactive species having a structure as in Formula I for which one instance of X is

and three instances of X are —N═. Molecules with this feature may be referred to elsewhere herein as "tetrazolates." This structure is shown below in Formula VII.

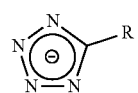
(Formula VII)

In some embodiments of Formula VI, R is selected from the group consisting of hydrogen, optionally substituted alkyl, alcohol, halo, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, nitro, optionally substituted sulfonyl, optionally substituted acyl, optionally substituted oxyacyloxy, optionally substituted aminoacyl, azide, optionally substituted amino, optionally substituted phosphine, optionally substituted sulfide, isonitrile, cyanate, isocyanate, or nitrile. R may be an electron-withdrawing group, an electron-donating group, or neither.

In some embodiments of Formula VI, R is selected from the group consisting of hydrogen, optionally substituted alkyl, alcohol, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, optionally substituted oxyacyloxy, optionally substituted aminoacyl, azide, optionally substituted amino, optionally substituted phosphine, or optionally substituted sulfide.

In some embodiments, the first reactive species of Formula I

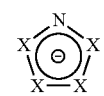

following structures:

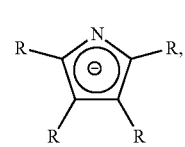
(Formula II)

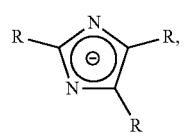
(Formula III)

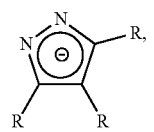
(Formula IV)

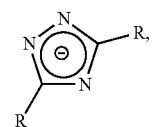
(Formula V)

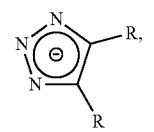
(Formula VI)

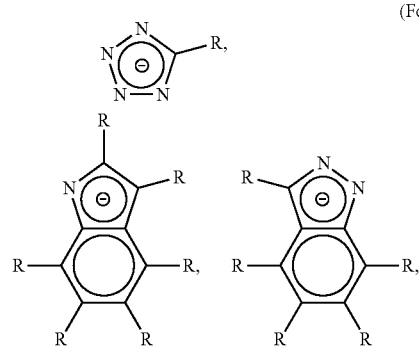
(Formula VII)

-continued

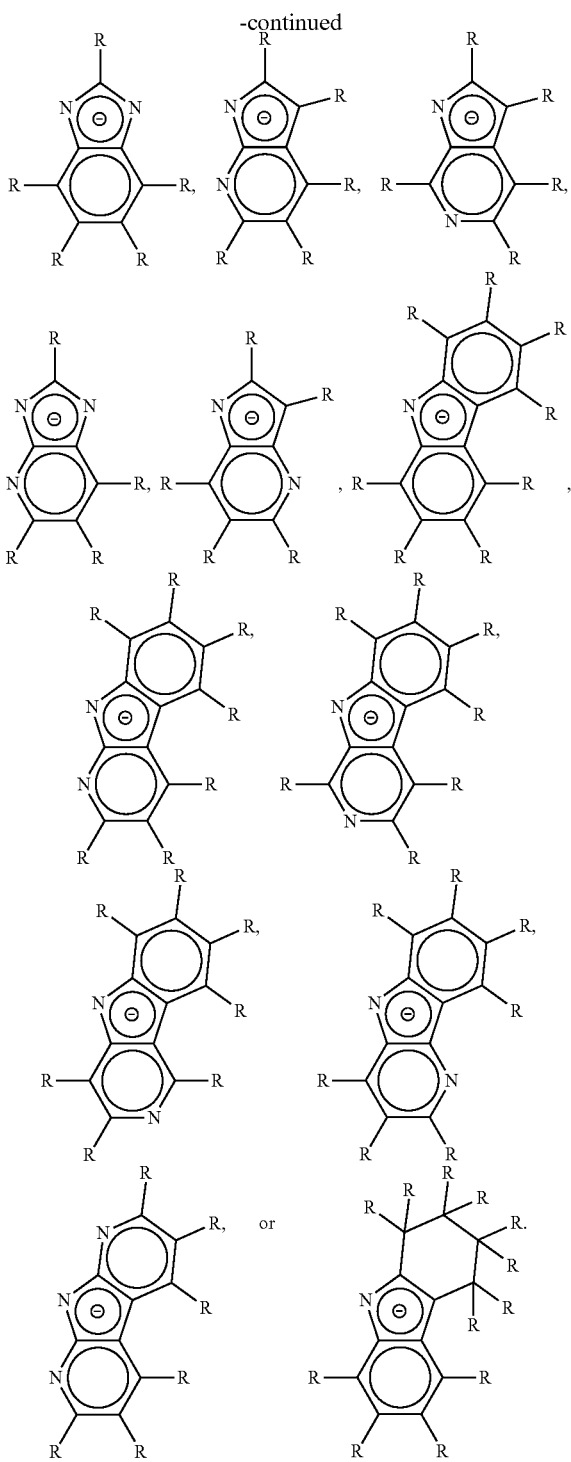

For the structures shown above, in some embodiments, each instance of R is independently hydrogen, optionally substituted alkyl, alcohol, halo, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, nitro, optionally substituted sulfonyl, optionally substituted acyl, optionally substituted oxyacyloxy, optionally substituted aminoacyl, azide, optionally substituted amino, optionally substituted phosphine, optionally substituted sulfide, isonitrile, cyanate, isocynanate, or nitrile; and optionally, wherein any two instances of R are joined to form a ring.

For the structures shown above, in some embodiments, each instance of R is independently hydrogen, optionally substituted alkyl, alcohol, optionally substituted heteroalkyl, optionally substituted cycloheteroalkyl, optionally substituted alkenyl, optionally substituted alkynyl, optionally substituted aryl, optionally substituted heteroaryl, optionally substituted alkenyloxy, optionally substituted alkoxy, optionally substituted thio, epoxy, optionally substituted oxyacyloxy, optionally substituted aminoacyl, azide, optionally substituted amino, optionally substituted phosphine, or optionally substituted sulfide; and optionally, wherein any two instances of R are joined to form a ring.

A wide variety of suitable counter ions may be provided (e.g., in a solution and/or electrolyte) with a first reactive species (i.e., a species comprising a conjugated, negatively-charged ring including a nitrogen atom) and/or the first reactive species may comprise a counter ion. In some embodiments, the counter ion is a monovalent counter ion. For instance, in some embodiments, the counter ion(s) comprise one or more alkali metal cations, such as $Li^+$, $Na^+$, $K^+$, $Rb^+$, $Fr^+$, and/or $Cs^+$. In some embodiments, the counter ion is a multivalent counter ion, such as a bivalent counter ion, a trivalent counter ion, or a counter ion of higher valency.

As described above, in some embodiments, an electrochemical cell and/or solution may comprise a second reactive species. The second reactive species may be a species comprising a labile halogen atom. In some embodiments, the labile halogen atom is a labile chlorine atom, a labile bromine atom, a labile iodine atom, and/or a labile fluorine atom. One example of a species comprising a labile chlorine atom is chloroethylene carbonate.

In some embodiments, the labile halogen atom is a labile fluorine atom. Non-limiting examples of suitable species comprising labile fluorine atoms include $PF_6^-$, fluorinated ethylene carbonates (e.g., fluoro(ethylene carbonate), difluoro(ethylene carbonate)), fluorinated (oxalato)borate anions (e.g., a difluoro(oxalato)borate anion), and fluorinated (sulfonyl)imide anions (e.g., a bis(fluorosulfonyl)imide anion, a bis(trifluoromethane sulfonyl)imide anion).

It should be understood that some electrochemical cells and/or solutions may comprise two or more species comprising labile halogen atoms. In some such embodiments, the labile halogen atoms may be different (e.g., a species comprising a labile fluorine atom and a species comprising a labile chlorine atom) or the same (e.g., two or more different species comprising labile fluorine atoms). For instance, an electrochemical cell and/or solution may comprise both $PF_6^-$ and fluoro(ethylene carbonate).

When an electrochemical cell and/or solution comprises a species comprising a labile halogen atom that is an ion, the electrochemical cell and/or solution may further comprise one or more counter ions. In some embodiments, the counter ion is a monovalent counter ion. For instance, in some embodiments, the counter ion(s) comprises one or more alkali metal cations, such as $Li^+$, $Na^+$, $K^+$, $Rb^+$, $Fr^+$, and/or $Cs^+$. In some embodiments, the counter ion is a multivalent counter ion, such as a bivalent counter ion, a trivalent counter ion, or a counter ion of higher valency.

As described above, in some embodiments, an electrochemical cell described herein comprises a protective layer (e.g., a protective layer disposed on an electrode, such as a cathode). As also described above, the protective layer may comprise a first reactive species (i.e., a species comprising a conjugated, negatively-charged ring including a nitrogen atom) and/or a reaction product thereof, such as a reaction product of a first reactive species (i.e., a species comprising a conjugated, negatively-charged ring including a nitrogen atom) and a metal (e.g., a transition metal or lithium metal), a reaction product of a first reactive species (i.e., a species comprising a conjugated, negatively-charged ring including a nitrogen atom) and a second reactive species (e.g., a species comprising a labile halogen atom), and/or a reaction product of a metal (e.g., a transition metal or lithium metal), the first reactive species, and the second reactive species (e.g., a reaction product between the metal and a reaction product of the first reactive species and the second reactive species). In some embodiments, the protective layer comprises further species such as those found in typical SEIs (e.g., reaction products of the electroactive material with one or more electrolyte components).

In some embodiments, the layer (e.g., protective layer) comprises various elements. In some embodiments, the identity of these elements and/or the amounts of these elements may be determined using Energy Dispersive X-ray Spectra (EDS). In some embodiments, the layer (e.g., protective layer) comprises nitrogen.

In embodiments where the layer comprises nitrogen, the layer may comprise any suitable amount of nitrogen. For example, in some embodiments, the layer (e.g., on the cathode and/or anode) comprises greater than or equal to 0.1 atomic %, greater than or equal to 0.25 atomic %, greater than or equal to 0.5 atomic %, greater than or equal to 0.75 atomic %, greater than or equal to 1 atomic %, greater than or equal to 1.25 atomic %, greater than or equal to 1.5 atomic %, greater than or equal to 1.75 atomic %, greater than or equal to 2 atomic %, greater than or equal to 2.25 atomic %, greater than or equal to 2.5 atomic %, greater than or equal to 2.75 atomic %, greater than or equal to 3 atomic %, greater than or equal to 4 atomic %, or greater than or equal to 5 atomic % nitrogen. In some embodiments, the layer (e.g., on the cathode and/or anode) comprises less than or equal to 10 atomic %, less than or equal to 9 atomic %, less than or equal to 8 atomic %, less than or equal to 7 atomic %, less than or equal to 6 atomic %, less than or equal to 5 atomic %, less than or equal to 4.5 atomic %, less than or equal to 4 atomic %, less than or equal to 3.5 atomic %, less than or equal to 3 atomic %, less than or equal to 2.5 atomic %, less than or equal to 2 atomic %, or less than or equal to 1.5 atomic % nitrogen. Combinations of these ranges are also possible (e.g., greater than or equal to 0.1 atomic % and less than or equal to 10 atomic %, greater than or equal to 0.1 atomic % and less than or equal to 5 atomic %, greater than or equal to 0.5 atomic % and less than or equal to 3 atomic %, greater than or equal to 1 atomic % and less than or equal to 5 atomic %, or greater than or equal to 0.5 atomic % and less than or equal to 2 atomic %). Without wishing to be bound by theory, it is believed that the presence of nitrogen in the layer demonstrates that the layer comprises the first reactive species and/or a reaction product thereof.

In some embodiments, the layer (e.g., on the cathode and/or anode) comprises more of an element (e.g., nitrogen) than a layer and/or a surface of an electrode in an electrochemical cell where the electrolyte does not comprise the first reactive species, all other factors being equal. For example, in some embodiments, the layer (e.g., on the cathode and/or anode) comprises greater than or equal to 0.1 atomic %, greater than or equal to 0.25 atomic %, greater than or equal to 0.5 atomic %, greater than or equal to 0.75 atomic %, greater than or equal to 1 atomic %, greater than or equal to 1.25 atomic %, greater than or equal to 1.5 atomic %, greater than or equal to 1.75 atomic %, greater than or equal to 2 atomic %, greater than or equal to 2.25 atomic %, greater than or equal to 2.5 atomic %, greater than or equal to 2.75 atomic %, greater than or equal to 3 atomic %, greater than or equal to 4 atomic %, or greater than or equal to 5 atomic % nitrogen more than a layer and/or a surface of an electrode in an electrochemical cell where the electrolyte does not comprise the first reactive species, all other factors being equal. In some embodiments, the layer (e.g., on the cathode and/or anode) comprises less than or equal to 10 atomic %, less than or equal to 9 atomic %, less than or equal to 8 atomic %, less than or equal to 7 atomic %, less than or equal to 6 atomic %, less than or equal to 5 atomic %, less than or equal to 4.5 atomic %, less than or equal to 4 atomic %, less than or equal to 3.5 atomic %, less than or equal to 3 atomic %, less than or equal to 2.5 atomic %, less than or equal to 2 atomic %, or less than or equal to 1.5 atomic % nitrogen more than a layer and/or a surface of an electrode in an electrochemical cell where the electrolyte does not comprise the first reactive species, all other factors being equal. Combinations of these ranges are also possible (e.g., greater than or equal to 0.1 atomic % and less than or equal to 10 atomic %, greater than or equal to 0.1 atomic % and less than or equal to 5 atomic %, greater than or equal to 0.5 atomic % and less than or equal to 3 atomic %, or greater than or equal to 0.5 atomic % and less than or equal to 2 atomic %) than a layer and/or a surface of an electrode in an electrochemical cell where the electrolyte does not comprise the first reactive species, all other factors being equal. For example, if a layer on a cathode described herein comprises 3 atomic % nitrogen and a surface of a cathode in an electrochemical cell where the electrolyte does not comprise a first reactive species, all other factors being equal, comprises 1 atomic % nitrogen, then the former has 2 atomic % more nitrogen than the latter.

In some embodiments, a protective layer comprises a plurality of particles (e.g., deposited by aerosol deposition). The plurality of particles may be at least partially fused together and/or may have a structure indicative of particles deposited by aerosol deposition. Non-limiting examples of suitable types of fused particles and suitable methods of aerosol deposition include those described in U.S. Pat. Pub. No. 2016/0344067, U.S. Pat. No. 9,825,328, U.S. Pat. Pub. No. 2017/0338475, and U.S. Pat. Pub. No. 2018/0351148, each of which are incorporated herein by reference in their entirety and for all purposes. The plurality of particles that are at least partially fused together and/or that have a structure indicative of particles deposited by aerosol deposition may extend throughout the protective layer or through only a portion thereof. When the plurality of particles that are at least partially fused together and/or that have a structure indicative of particles deposited by aerosol deposition extend throughout the protective layer, the protective layer may be relatively uniform or may vary spatially (e.g., one or more other components of the protective layer, such as a first reactive species and/or one or more of the reaction products thereof, may not extend fully therethrough). When the plurality of particles that are at least partially fused together and/or that have a structure indicative of particles deposited by aerosol deposition extend only through a portion of the protective layer, they may form a discrete sublayer separate from one or more other sublayers of the protective layer or may interpenetrate with one or more other sublayers. Other morphologies are also possible.

For instance, a plurality of particles that are at least partially fused together and/or that have a structure indicative of particles deposited by aerosol deposition may form a relatively uniform layer together with one or more of the components described elsewhere herein (e.g., a first reactive species and/or a reaction product thereof, such as a reaction product of this species with a metal (e.g., a transition metal or lithium metal), a reaction product of this species with a second reactive species and/or a further reaction product thereof with a metal (e.g., a transition metal or lithium metal)). In some such embodiments, the plurality of particles that are at least partially fused together and/or that have a structure indicative of particles deposited by aerosol deposition may, together with this component(s), form an interpenetrating structure. The interpenetrating structure may be a three-dimensional structure and/or may span the thickness of the protective layer.

In some embodiments, a protective layer comprises a first sublayer comprising a plurality of particles that are at least partially fused together and/or that have a structure indicative of particles deposited by aerosol deposition, and a second sublayer. The second sublayer may have one or more features described elsewhere herein with respect to protective layers as a whole. By way of example, the second sublayer may comprise a first reactive species and/or one or more of the reaction products described elsewhere herein (e.g., a reaction product of a first reactive species with a metal (e.g., a transition metal or lithium metal), a reaction product of this species with a second reactive species and/or a further reaction product thereof with a metal (e.g., a transition metal or lithium metal)). When a protective layer comprises two or more sublayers, the sublayers may be positioned with respect to each other in a variety of suitable manners. For instance, a protective layer may comprise a sublayer comprising a plurality of particles that are at least partially fused together and/or that have a structure indicative of particles deposited by aerosol deposition that is directly adjacent to an electrode (e.g., a first electrode comprising lithium metal or a second electrode comprising a transition metal) or may comprise a sublayer comprising a plurality of particles that are at least partially fused together and/or that have a structure indicative of particles deposited by aerosol deposition that is separated from an electrode by one or more intervening layers (e.g., intervening layers having one or more features described elsewhere herein with respect to protective layers as a whole). In some embodiments, a sublayer comprising a plurality of particles that are at least partially fused together and/or that have a structure indicative of particles deposited by aerosol deposition is the outermost sublayer of a multilayer protective layer.

A plurality of particles that are at least partially fused together and/or that have a structure indicative of particles deposited by aerosol deposition may be formed by a variety of suitable methods. One such method comprises depositing the particles onto an electrode (and/or any layer(s) disposed thereon) by aerosol deposition. The other component(s) of the protective layer may form upon exposure of the electrode to the relevant species (e.g., to a species comprising a conjugated, negatively-charged ring, to a species comprising a labile halogen atom), such as during electrochemical cell assembly and/or cycling. Other methods are also possible.

As described above, a protective layer may comprise a layer and/or sublayer comprising a plurality of particles at least partially fused together. The terms "fuse" and "fused" (and "fusion") are given their typical meaning in the art and generally refers to the physical joining of two or more objects (e.g., particles) such that they form a single object. For example, in some cases, the volume occupied by a single particle (e.g., the entire volume within the outer surface of the particle) prior to fusion is substantially equal to half the volume occupied by two fused particles. Those skilled in the art would understand that the terms "fuse," "fused," and "fusion" do not refer to particles that simply contact one another at one or more surfaces, but particles wherein at least a portion of the original surface of each individual particle can no longer be discerned from the other particle. In some embodiments, a fused particle (e.g., a fused particle having the equivalent volume of the particle prior to fusion) may have a minimum cross-sectional dimension of less than 1 micron. For example, the plurality of particles after being fused may have an average minimum cross-sectional dimension of less than 1 micron, less than 0.75 microns, less than 0.5 microns, less than 0.2 microns, or less than 0.1 microns. In some embodiments, the plurality of particles after being fused have an average minimum cross-sectional dimension of greater than or equal to 0.05 microns, greater than or equal to 0.1 microns, greater than or equal to 0.2 microns, greater than or equal to 0.5 microns, or greater than or equal to 0.75 microns. Combinations of the above-referenced ranges are also possible (e.g., less than 1 micron and greater than or equal to 0.05 microns). Other ranges are also possible.

In some cases, a plurality of particles is fused such that at least a portion of the plurality of particles form a continuous pathway across the protective layer and/or sublayer thereof (e.g., between a first surface of the protective layer and a second, opposing, surface of the protective layer; between a first surface of the sublayer and a second, opposing, surface of the sublayer). A continuous pathway may include, for example, an ionically-conductive pathway from a first surface to a second, opposing surface of the protective layer and/or sublayer thereof in which there are substantially no gaps, breakages, or discontinuities in the pathway. While fused particles across a layer may form a continuous pathway, a pathway including packed, unfused particles may have gaps or discontinuities between the particles that would not render the pathway continuous. Such gaps and/or discontinuities may be filled (completely or partially) by another component of the protective layer and/or sublayer thereof, such as a first reactive species and/or one or more of the reaction products thereof (e.g., a reaction product of a first reactive species with a metal; a reaction product of a first reactive species with a second reactive species; and/or a reaction product of a metal (e.g., a transition metal or lithium metal), a first reactive species, and a second reactive species).

In some embodiments, a plurality of particles at least partially fused together forms a plurality of such continuous pathways across the protective layer and/or sublayer thereof. In some embodiments, at least 10 vol %, at least 30 vol %, at least 50 vol %, or at least 70 vol % of the protective layer and/or sublayer thereof comprises one or more continuous pathways comprising fused particles (e.g., which may comprise an ionically conductive material). In some embodiments, less than or equal to 100 vol %, less than or equal to 90 vol %, less than or equal to 70 vol %, less than or equal to 50 vol %, less than or equal to 30 vol %, less than or equal to 10 vol %, or less than or equal to 5 vol % of the protective layer and/or sublayer thereof comprises one or more continuous pathways comprising fused particles. Combinations of the above-referenced ranges are also possible (e.g., at least 10 vol % and less than or equal to 100 vol %). In some cases, 100 vol % of a sublayer of a protective layer comprises one or more continuous pathways comprising fused particles. That is to say, in some embodiments, a sublayer of the protective layer consists essentially of fused particles (e.g., the second layer comprises substantially no unfused particles). In other embodiments, the protective layer lacks unfused particles and/or is substantially free from unfused particles.

Those skilled in the art would be capable of selecting suitable methods for determining if particles are fused including, for example, performing Confocal Raman Microscopy (CRM). CRM may be used to determine the percentage of fused areas within a protective layer and/or sublayer thereof. For instance, in some aspects the fused areas may be less crystalline (more amorphous) compared to the unfused areas (e.g., particles) within the protective layer and/or sublayer thereof, and may provide different Raman characteristic spectral bands than those of the unfused areas. In some embodiments, the fused areas may be amorphous and the unfused areas (e.g., particles) within the layer may be crystalline. Crystalline and amorphous areas may have peaks at the same/similar wavelengths, while amorphous peaks may be broader/less intense than those of crystalline areas. In some instances, the unfused areas may include spectral bands substantially similar to the spectral bands of the bulk particles prior to formation of the layer (the bulk spectrum). For example, an unfused area may include peaks at the same or similar wavelengths and having a similar area under the peak (integrated signal) as the peaks within the spectral bands of the particles prior to formation of the layer. An unfused area may have, for instance, an integrated signal (area under the peak) for the largest peak (the peak having the largest integrated signal) in the spectrum that may be, e.g., within at least 70%, at least 75%, at least 80%, at least 85%, at least 90%, at least 95%, or at least 97% of the value of the integrated signal for the corresponding largest peak of the bulk spectrum. By contrast, the fused areas may include spectral bands different from (e.g., peaks at the same or similar wavelengths but having a substantially different/lower integrated signal than) the spectral bands of the particles prior to formation of the layer. A fused area may have, for instance, an integrated signal (area under the peak) for the largest peak (the peak having the largest integrated signal) in the spectrum that may be, e.g., less than 50%, less than 60%, less than 70%, less than 75%, less than 80%, less than 85%, less than 90%, less than 95%, or less than 97% of the value of the integrated signal for the corresponding largest peak of the bulk spectrum.

In some embodiments, two dimensional and/or three dimensional mapping of CRM may be used to determine the percentage of fused areas in a protective layer and/or sublayer thereof (e.g., the percentage of area, within a minimum cross-sectional area, having an integrated signal for the largest peak of the spectrum that differs from that for the particles prior to formation of the layer, as described above).

As described above, some methods relate to forming a portion of a protective layer and/or a sublayer of a protective layer by an aerosol deposition process. Aerosol deposition processes generally comprise depositing (e.g., spraying) particles (e.g., inorganic particles, polymeric particles) at a relatively high velocity on a surface. Aerosol deposition, as described herein, generally results in the collision and/or elastic deformation of at least some of the plurality of particles. In some aspects, aerosol deposition can be carried out under conditions (e.g., using a velocity) sufficient to cause fusion of at least some of the plurality of particles to at least another portion of the plurality of particles. For example, in some embodiments, a plurality of particles is deposited on an electrode (and/or any sublayer(s) disposed thereon) at a relatively high velocity such that at least a portion of the plurality of particles fuse (e.g., forming the portion and/or sublayer of the protective layer). The velocity required for particle fusion may depend on factors such as the material composition of the particles, the size of the particles, the Young's elastic modulus of the particles, and/or the yield strength of the particles or material forming the particles.

In some embodiments, a plurality of particles is deposited at a velocity sufficient to cause fusion of at least some of the particles therein. It should be appreciated, however, that in some aspects, the particles are deposited at a velocity such that at least some of the particles are not fused. In some aspects, the velocity of the particles is at least 150 m/s, at least 200 m/s, at least 300 m/s, at least 400 m/s, or at least 500 m/s, at least 600 m/s, at least 800 m/s, at least 1000 m/s, or at least 1500 m/s. In some embodiments, the velocity is less than or equal to 2000 m/s, less than or equal to 1500 m/s, less than or equal to 1000 m/s, less than or equal to 800 m/s, less than or equal to 600 m/s, less than or equal to 500 m/s, less than or equal to 400 m/s, less than or equal to 300 m/s, or less than or equal to 200 m/s. Combinations of the above-referenced ranges are also possible (e.g., at least 150 m/s and less than or equal to 2000 m/s, at least 150 m/s and less than or equal to 600 m/s, at least 200 m/s and less than or equal to 500 m/s, at least 200 m/s and less than or equal to 400 m/s, or at least 500 m/s and less than or equal to 2000 m/s). Other velocities are also possible. In some embodiments in which more than one particle type is included in a protective layer and/or sublayer thereof, each particle type may be deposited at a velocity in one or more of the above-referenced ranges.

In some embodiments, a plurality of particles to be at least partially fused is deposited by a method that comprises spraying the particles (e.g., via aerosol deposition) on the surface of an electrode (and/or any sublayer(s) disposed thereon) by pressurizing a carrier gas with the particles. In some embodiments, the pressure of the carrier gas is at least 5 psi, at least 10 psi, at least 20 psi, at least 50 psi, at least 90 psi, at least 100 psi, at least 150 psi, at least 200 psi, at least 250 psi, or at least 300 psi. In some embodiments, the pressure of the carrier gas is less than or equal to 350 psi, less than or equal to 300 psi, less than or equal to 250 psi, less than or equal to 200 psi, less than or equal to 150 psi, less than or equal to 100 psi, less than or equal to 90 psi, less than or equal to 50 psi, less than or equal to 20 psi, or less than or equal to 10 psi. Combinations of the above-referenced ranges are also possible (e.g., at least 5 psi and less than or equal to 350 psi). Other ranges are also possible and those skilled in the art would be capable of selecting the pressure of the carrier gas based upon the teachings of this specification. For example, in some embodiments, the pressure of the carrier gas is such that the velocity of the particles deposited on the electroactive material (and/or any sublayer(s) disposed thereon) is sufficient to fuse at least some of the particles to one another.

In some aspects, a carrier gas (e.g., the carrier gas transporting a plurality of particles to be at least partially fused) is heated prior to deposition. In some aspects, the temperature of the carrier gas is at least 20° C., at least 25° C., at least 30° C., at least 50° C., at least 75° C., at least 100° C., at least 150° C., at least 200° C., at least 300° C., or at least 400° C. In some embodiments, the temperature of the carrier gas is less than or equal to 500° C., less than or equal to 400° C., less than or equal to 300° C., less than or equal to 200° C., less than or equal to 150° C., less than or equal to 100° C., less than or equal to 75° C., less than or equal to 50° C., less than or equal to 30° C., or less than or equal to 20° C. Combinations of the above-referenced ranges are also possible (e.g., at least 20° C. and less than or equal to 500° C.). Other ranges are also possible.

In some embodiments, a plurality of particles to be at least partially fused are deposited under a vacuum environment. For example, the particles may be deposited on the surface of an electrode (and/or any sublayer(s) disposed thereon) in a container in which vacuum is applied to the container (e.g., to remove atmospheric resistance to particle flow, to permit high velocity of the particles, and/or to remove contaminants). In some embodiments, the vacuum pressure within the container is at least 0.5 mTorr, at least 1 mTorr, at least 2 mTorr, at least 5 mTorr, at least 10 mTorr, at least 20 mTorr, or at least 50 mTorr. In some embodiments, the vacuum pressure within the container is less than or equal to 100 mTorr, less than or equal to 50 mTorr, less than or equal to 20 mTorr, less than or equal to 10 mTorr, less than or equal to 5 mTorr, less than or equal to 2 mTorr, or less than or equal to 1 mTorr. Combinations of the above-referenced ranges are also possible (e.g., at least 0.5 mTorr and less than or equal to 100 mTorr). Other ranges are also possible.

In some embodiments, a process described herein for forming a protective layer and/or a sublayer thereof can be carried out such that the bulk properties of the precursor materials (e.g., particles) are maintained in the resulting layer (e.g., crystallinity, ion-conductivity).

In some embodiments, a plurality of particles that are at least partially fused together and/or that have a structure indicative of particles deposited by aerosol deposition comprises an inorganic material. For instance, a plurality of particles that are at least partially fused together and/or that have a structure indicative of particles deposited by aerosol deposition may be formed of an inorganic material. In some embodiments, a plurality of particles that are at least partially fused together and/or that have a structure indicative of particles deposited by aerosol deposition comprise two or more types of inorganic materials. The inorganic material(s) may comprise a ceramic material (e.g., a glass, a glassy-ceramic material). The inorganic material(s) may be crystalline, amorphous, or partially crystalline and partially amorphous.

In some embodiments, a plurality of particles that are at least partially fused together and/or that have a structure indicative of particles deposited by aerosol deposition comprises $Li_xMP_yS_z$. For such inorganic materials, x, y, and z may be integers (e.g., integers less than 32) and/or M may comprise Sn, Ge, and/or Si. By way of example, the inorganic material may comprise $Li_{22}SiP_2S_{18}$, $Li_{24}MP_2S_{19}$ (e.g., $Li_{24}SiP_2Si_9$), $LiMP_2S_{12}$ (e.g., where M=Sn, Ge, Si), and/or LiSiPS. Even further examples of suitable inorganic materials include garnets, sulfides, phosphates, perovskites, anti-perovskites, other ion conductive inorganic materials, and/or mixtures thereof. When $Li_xMP_yS_z$ particles are employed in a protective layer and/or sublayer thereof, they may be formed, for example, by using raw components $Li_2S$, $SiS_2$ and $P_2S_5$ (or alternatively $Li_2S$, Si, S and $P_2S_5$).

In some embodiments, a plurality of particles that are at least partially fused together and/or that have a structure indicative of particles deposited by aerosol deposition comprises an oxide, nitride, and/or oxynitride of lithium, aluminum, silicon, zinc, tin, vanadium, zirconium, magnesium, and/or indium, and/or an alloy thereof. Non-limiting examples of suitable oxides include $Li_2O$, LiO, $LiO_2$, $LiRO_2$ where R is a rare earth metal (e.g., lithium lanthanum oxides), lithium titanium oxides, $Al_2O_3$, $ZrO_2$, $SiO_2$, $CeO_2$, and $Al_2TiO_5$. Further examples of suitable materials that may be employed in a plurality of particles that are at least partially fused together and/or that have a structure indicative of particles deposited by aerosol deposition include lithium nitrates (e.g., $LiNO_3$), lithium silicates, lithium borates (e.g., lithium bis(oxalato)borate, lithium difluoro (oxalato)borate), lithium aluminates, lithium oxalates, lithium phosphates (e.g., $LiPO_3$, $Li_3PO_4$), lithium phosphorus oxynitrides, lithium silicosulfides, lithium germanosulfides, lithium fluorides (e.g., LiF, $LiBF_4$, $LiAlF_4$, $LiPF_6$, $LiAsF_6$, $LiSbF_6$, $Li_2SiF_6$, $LiSO_3F$, $LiN(SO_2F)_2$, $LiN(SO_2CF_3)_2$), lithium borosulfides, lithium aluminosulfides, lithium phosphosulfides, oxy-sulfides (e.g., lithium oxy-sulfides), and/or combinations thereof. In some embodiments, the plurality of particles comprises Li—Al—Ti—$PO_4$ (LATP).

As described above, in some embodiments, the electrochemical cell comprises an electrolyte. As also described above, the electrolyte may comprise a first reactive species (i.e., a species comprising a conjugated, negatively-charged ring including a nitrogen atom) and/or a second reactive species (e.g., a species comprising a labile halogen atom). The electrolyte may further comprise additional components, such as those described in greater detail below.

In some embodiments, an electrochemical cell includes an electrolyte (e.g., a liquid electrolyte). In some embodiments, the electrolyte (e.g., liquid electrolyte) comprises a solvent. In some embodiments, the electrolyte (e.g., liquid electrolyte) is a non-aqueous electrolyte. Suitable non-aqueous electrolytes may include organic electrolytes such as liquid electrolytes, gel polymer electrolytes, and solid polymer electrolytes. These electrolytes may optionally include one or more ionic electrolyte salts (e.g., to provide or enhance ionic conductivity). Examples of useful solvents (e.g., non-aqueous liquid electrolyte solvents) include, but are not limited to, non-aqueous organic solvents, such as, for example, N-methyl acetamide, acetonitrile, acetals, ketals, esters (e.g., esters of carbonic acid, sulfonic acid, an/or phosphoric acid), carbonates (e.g., dimethyl carbonate, diethyl carbonate, ethyl methyl carbonate, propylene carbonate, ethylene carbonate, fluoroethylene carbonate, difluoroethylene carbonate), sulfones, sulfites, sulfolanes, sulfonimidies (e.g., bis(trifluoromethane)sulfonimide lithium salt), ethers (e.g., aliphatic ethers, acyclic ethers, cyclic ethers), glymes, polyethers, phosphate esters (e.g., hexafluorophosphate), siloxanes, dioxolanes, N-alkylpyrrolidones, nitrate containing compounds, substituted forms of the foregoing, and blends thereof. Examples of acyclic ethers that may be used include, but are not limited to, diethyl ether, dipropyl ether, dibutyl ether, dimethoxymethane, trimethoxymethane, 1,2-dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents.

In some cases, mixtures of the solvents described herein may also be used. For example, in some embodiments, mixtures of solvents are selected from the group consisting of 1,3-dioxolane and dimethoxyethane, 1,3-dioxolane and diethyleneglycol dimethyl ether, 1,3-dioxolane and triethyleneglycol dimethyl ether, and 1,3-dioxolane and sulfolane. In some embodiments, the mixture of solvents comprises dimethyl carbonate and ethylene carbonate. In some embodiments, the mixture of solvents comprises ethylene carbonate and ethyl methyl carbonate. The weight ratio of the two solvents in the mixtures may range, in some cases, from about 5 wt %:95 wt % to 95 wt %:5 wt %. For example, in some embodiments the electrolyte comprises a 50 wt %:50 wt % mixture of dimethyl carbonate:ethylene carbonate. In some other embodiments, the electrolyte comprises a 30 wt %:70 wt % mixture of ethylene carbonate:ethyl methyl carbonate. An electrolyte may comprise a mixture of dimethyl carbonate:ethylene carbonate with a ratio of dimethyl carbonate:ethylene carbonate that is less than or equal to 50 wt %:50 wt % and greater than or equal to 30 wt %:70 wt %.

In some embodiments, an electrolyte may comprise a mixture of fluoroethylene carbonate and dimethyl carbonate. A weight ratio of fluoroethylene carbonate to dimethyl carbonate may be 20 wt %:80 wt % or 25 wt %:75 wt %. A weight ratio of fluoroethylene carbonate to dimethyl carbonate may be greater than or equal to 20 wt %:80 wt % and less than or equal to 25 wt %:75 wt %.

Non-limiting examples of suitable gel polymer electrolytes include polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, cross-linked and network structures of the foregoing, and blends of the foregoing.

Non-limiting examples of suitable solid polymer electrolytes include polyethers, polyethylene oxides, polypropylene oxides, polyimides, polyphosphazenes, polyacrylonitriles, polysiloxanes, derivatives of the foregoing, copolymers of the foregoing, cross-linked and network structures of the foregoing, and blends of the foregoing.

In some embodiments, an electrolyte is in the form of a layer having a particular thickness. An electrolyte layer may have a thickness of, for example, at least 1 micron, at least 5 microns, at least 10 microns, at least 15 microns, at least 20 microns, at least 25 microns, at least 30 microns, at least 40 microns, at least 50 microns, at least 70 microns, at least 100 microns, at least 200 microns, at least 500 microns, or at least 1 mm. In some embodiments, the thickness of the electrolyte layer is less than or equal to 1 mm, less than or equal to 500 microns, less than or equal to 200 microns, less than or equal to 100 microns, less than or equal to 70 microns, less than or equal to 50 microns, less than or equal to 40 microns, less than or equal to 30 microns, less than or equal to 20 microns, less than or equal to 10 microns, or less than or equal to 5 microns. Other values are also possible. Combinations of the above-noted ranges are also possible.

In some embodiments, the electrolyte comprises at least one salt (e.g., lithium salt). For example, in some cases, the at least one salt (e.g., lithium salt) comprises LiSCN, LiBr, LiI, LiSO$_3$CH$_3$, LiNO$_3$, LiPF$_6$, LiBF$_4$, LiB(Ph)$_4$, LiClO$_4$, LiAsF$_6$, Li$_2$SiF$_6$, LiSbF$_6$, LiAlCl$_4$, an oxalo(borate group) (e.g., lithium bis(oxalato)borate), lithium difluoro(oxalato) borate, a salt comprising a tris(oxalato)phosphate anion (e.g., lithium tris(oxalato)phosphate), LiCF$_3$SO$_3$, LiN(SO$_2$F)$_2$, LiN(SO$_2$CF$_3$)$_2$, LiC(C$_n$F$_{2n+1}$SO$_2$)$_3$ wherein n is an integer in the range of from 1 to 20, and (C$_n$F$_{2n+1}$SO$_2$)$_m$XLi with n being an integer in the range of from 1 to 20, m being 1 when X is selected from oxygen or sulfur, m being 2 when X is selected from nitrogen or phosphorus, and m being 3 when X is selected from carbon or silicon.

When present, a lithium salt may be present in the electrolyte at a variety of suitable concentrations. In some embodiments, the lithium salt is present in the electrolyte at a concentration of greater than or equal to 0.01 M, greater than or equal to 0.02 M, greater than or equal to 0.05 M, greater than or equal to 0.1 M, greater than or equal to 0.2 M, greater than or equal to 0.5 M, greater than or equal to 1 M, greater than or equal to 2 M, or greater than or equal to 5 M. The lithium salt may be present in the electrolyte at a concentration of less than or equal to 10 M, less than or equal to 5 M, less than or equal to 2 M, less than or equal to 1 M, less than or equal to 0.5 M, less than or equal to 0.2 M, less than or equal to 0.1 M, less than or equal to 0.05 M, or less than or equal to 0.02 M. Combinations of the above-referenced ranges are also possible (e.g., greater than or equal to 0.01 M and less than or equal to 10 M, or greater than or equal to 0.01 M and less than or equal to 5 M). Other ranges are also possible.

In some embodiments, an electrolyte may comprise LiPF$_6$ in an advantageous amount. In some embodiments, the electrolyte comprises LiPF$_6$ at a concentration of greater than or equal to 0.01 M, greater than or equal to 0.02 M, greater than or equal to 0.05 M, greater than or equal to 0.1 M, greater than or equal to 0.2 M, greater than or equal to 0.5 M, greater than or equal to 1 M, or greater than or equal to 2 M. The electrolyte may comprise LiPF$_6$ at a concentration of less than or equal to 5 M, less than or equal to 2 M, less than or equal to 1 M, less than or equal to 0.5 M, less than or equal to 0.2 M, less than or equal to 0.1 M, less than or equal to 0.05 M, or less than or equal to 0.02 M. Combinations of the above-referenced ranges are also possible (e.g., greater than or equal to 0.01 M and less than or equal to 5 M). Other ranges are also possible.

In some embodiments, an electrolyte comprises a species with an oxalato(borate) group (e.g., LiBOB, lithium difluoro(oxalato)borate), and the total weight of the species with an (oxalato)borate group in the electrolyte may be less than or equal to 30 wt %, less than or equal to 28 wt %, less than or equal to 25 wt %, less than or equal to 22 wt %, less than or equal to 20 wt %, less than or equal to 18 wt %, less than or equal to 15 wt %, less than or equal to 12 wt %, less than or equal to 10 wt %, less than or equal to 8 wt %, less than or equal to 6 wt %, less than or equal to 5 wt %, less than or equal to 4 wt %, less than or equal to 3 wt %, less than or equal to 2 wt %, or less than or equal to 1 wt % versus the total weight of the electrolyte. In some embodiments, the total weight of the species with an (oxalato)borate group in the electrochemical cell is greater than 0.2 wt %, greater than 0.5 wt %, greater than 1 wt %, greater than 2 wt %, greater than 3 wt %, greater than 4 wt %, greater than 6 wt %, greater than 8 wt %, greater than 10 wt %, greater than 15 wt %, greater 18 wt %, greater than 20 wt %, greater than 22 wt %, greater than 25 wt %, or greater than 28 wt % versus the total weight of the electrolyte. Combinations of the above-referenced ranges are also possible (e.g., greater than 0.2 wt % and less than or equal to 30 wt %, greater than 0.2 wt % and less than or equal to 20 wt %, greater than 0.5 wt % and less than or equal to 20 wt %, greater than 1 wt % and less than or equal to 8 wt %, greater than 1 wt % and less than or equal to 6 wt %, greater than 4 wt % and less than or equal to 10 wt %, greater than 6 wt % and less than or equal to 15 wt %, or greater than 8 wt % and less than or equal to 20 wt %). Other ranges are also possible.

In some embodiments, an electrolyte comprises fluoroethylene carbonate. In some embodiments, the total weight of the fluoroethylene carbonate in the electrolyte may be less than or equal to 30 wt %, less than or equal to 28 wt %, less than or equal to 25 wt %, less than or equal to 22 wt %, less than or equal to 20 wt %, less than or equal to 18 wt %, less than or equal to 15 wt %, less than or equal to 12 wt %, less than or equal to 10 wt %, less than or equal to 8 wt %, less than or equal to 6 wt %, less than or equal to 5 wt %, less than or equal to 4 wt %, less than or equal to 3 wt %, less than or equal to 2 wt %, or less than or equal to 1 wt % versus the total weight of the electrolyte. In some embodiments, the total weight of the fluoroethylene carbonate in the electrolyte is greater than 0.2 wt %, greater than 0.5 wt %, greater than 1 wt %, greater than 2 wt %, greater than 3 wt %, greater than 4 wt %, greater than 6 wt %, greater than 8 wt %, greater than 10 wt %, greater than 15 wt %, greater than 18 wt %, greater than 20 wt %, greater than 22 wt %, greater than 25 wt %, or greater than 28 wt % versus the total weight of the electrolyte. Combinations of the above-referenced ranges are also possible (e.g., less than or equal to 0.2 wt % and greater than 30 wt %, less than or equal to 15 wt % and greater than 20 wt %, or less than or equal to 20 wt % and greater than 25 wt %). Other ranges are also possible.

In some embodiments, the wt % of one or more electrolyte components is measured prior to first use or first discharge of the electrochemical cell using known amounts of the various components. In other embodiments, the wt % is measured at a point in time during the cycle life of the cell. In some such embodiments, the cycling of an electrochemical cell may be stopped and the wt % of the relevant component in the electrolyte may be determined using, for example, gas chromatography-mass spectrometry. Other methods such as NMR, inductively coupled plasma mass spectrometry (ICP-MS), and elemental analysis can also be used.

In some embodiments, an electrolyte may comprise several species together that are particularly beneficial in combination. For instance, in some embodiments, the electrolyte comprises fluoroethylene carbonate, dimethyl carbonate, and $LiPF_6$. The weight ratio of fluoroethylene carbonate to dimethyl carbonate may be between 20 wt %:80 wt % and 25 wt %:75 wt % and the concentration of $LiPF_6$ in the electrolyte may be approximately 1 M (e.g., between 0.05 M and 2 M). The electrolyte may further comprise lithium bis(oxalato)borate (e.g., at a concentration between 0.1 wt % and 6 wt %, between 0.5 wt % and 6 wt %, or between 1 wt % and 6 wt % in the electrolyte), and/or lithium tris(oxalato) phosphate (e.g., at a concentration between 1 wt % and 6 wt % in the electrolyte).

As described above, in some embodiments, an electrochemical cell comprises a first electrode. The first electrode may be an anode and/or a negative electrode (e.g., an electrode at which oxidation occurs during discharging and reduction occurs during charging).

In some embodiments, the first electrode comprises an electroactive material comprising lithium (e.g., lithium metal). In some embodiments, a first electrode comprises an electroactive material in which lithium forms part of an alloy. Suitable lithium alloys can include alloys of lithium and aluminum, magnesium, silicium (silicon), indium, and/or tin. In some embodiments, a first electrode comprises an electroactive material that contains at least 50 wt % lithium. In some cases, the electroactive material contains at least 75 wt %, at least 90 wt %, at least 95 wt %, or at least 99 wt % lithium.

The electroactive material in a first electrode may take the form of a foil (e.g., lithium foil), lithium deposited (e.g., vacuum deposited) onto a conductive substrate (e.g., lithium deposited onto a conductive substrate, such as a released Cu/PVOH substrate), or may have another suitable structure. In some embodiments, the electroactive material in the first electrode forms one film or several films, which are optionally separated from each other. In some embodiments, the first electrode and/or electroactive material comprises a lithium intercalation compound (e.g., a compound that is capable of reversibly inserting lithium ions at lattice sites and/or interstitial sites), such as a lithium carbon anode.

In some embodiments, a surface of the electroactive material of the first electrode may be passivated. Without wishing to be bound by theory, electroactive material surfaces that are passivated are surfaces that have undergone a chemical reaction to form a layer that is less reactive (e.g., with an electrolyte) than material that is present in the bulk of the electroactive material. One method of passivating an electroactive material surface is to expose the electroactive material to a plasma comprising $CO_2$ and/or $SO_2$ to form a $CO_2$- and/or $SO_2$-induced layer. Some inventive methods and articles may comprise passivating an electroactive material by exposing it to $CO_2$ and/or $SO_2$, or an electroactive material with a surface that has been passivated by exposure to $CO_2$ and/or $SO_2$. Such exposure may form a porous passivation layer on the electroactive material (e.g., a $CO_2$- and/or $SO_2$-induced layer).

As described above, in some embodiments, an electrochemical cell described herein comprises a second electrode. The second electrode may be a cathode and/or a positive electrode (e.g., an electrode at which reduction occurs during discharging and oxidation occurs during charging).

In some embodiments, the second electrode comprises an electroactive material. A second electrode may comprise an electroactive material comprising a lithium intercalation compound (e.g., a compound that is capable of reversibly inserting lithium ions at lattice sites and/or interstitial sites). In some cases, the electroactive material comprises a lithium transition metal oxo compound (i.e., a lithium transition metal oxide or a lithium transition metal salt of an oxoacid). The electroactive material may be a layered oxide (e.g., a layered oxide that is also a lithium transition metal oxo compound). A layered oxide generally refers to an oxide having a lamellar structure (e.g., a plurality of sheets, or layers, stacked upon each other). Non-limiting examples of suitable layered oxides (e.g., lithium transition metal oxides) include lithium nickel manganese cobalt oxide, lithium nickel cobalt aluminum oxide, lithium cobalt oxide ($LiCoO_2$), lithium nickel oxide ($LiNiO_2$), and lithium manganese oxide ($LiMnO_2$).

In some embodiments, a second electrode comprises a layered oxide that is lithium nickel manganese cobalt oxide ($LiNi_xMn_yCo_zO_2$, also referred to as "NMC" or "NCM," such as NCM622, NCM721, and/or NCM811). In some such embodiments, the sum of x, y, and z is 1. For example, a non-limiting example of a suitable NMC compound is $LiNi_{1/3}Mn_{1/3}Co_{1/3}O_2$. Other non-limiting examples of suitable NMC compounds include $LiNi_{3/5}Mn_{1/5}Co_{1/5}O_2$ and $LiNi_{7/10}Mn_{1/10}Co_{1/5}O_2$.

In some embodiments, a second electrode comprises a layered oxide that is lithium nickel cobalt aluminum oxide ($LiNi_xCo_yAl_zO_2$, also referred to as "NCA"). In some such embodiments, the sum of x, y, and z is 1. For example, a non-limiting example of a suitable NCA compound is $LiNi_{0.8}Co_{0.15}Al_{0.05}O_2$.

In some embodiments, the second electrode and/or the electroactive material comprises a transition metal. In some embodiments, the transition metal comprises Co, Ni, Mn, Fe, Cr, V, Cu, Zr, Nb, Mo, Ag, and/or lanthanide metals. In some embodiments, the transition metal comprises a transition metal oxide (e.g., a lithium transition metal oxide, as discussed above). For example, in some embodiments, the second electrode and/or the electroactive material comprises a transition metal polyanion oxide (e.g., a compound comprising a transition metal, an oxygen, and/or an anion having a charge with an absolute value greater than 1). A non-limiting example of a suitable transition metal polyanion oxide is lithium iron phosphate (LiFePO$_4$, also referred to as "LFP"). Another non-limiting example of a suitable transition metal polyanion oxide is lithium manganese iron phosphate (LiMn$_x$Fe$_{1-x}$PO$_4$, also referred to as "LMFP"). A non-limiting example of a suitable LMFP compound is LiMn$_{0.8}$Fe$_{0.2}$PO$_4$.

In some embodiments, the electroactive material comprises a spinel (e.g., a compound having the structure AB$_2$O$_4$, where A can be Li, Mg, Fe, Mn, Zn, Cu, Ni, Ti, or Si, and B can be Al, Fe, Cr, Mn, or V). A non-limiting example of a suitable spinel is lithium manganese oxide (LiMn$_2$O$_4$, also referred to as "LMO"). Another non-limiting example is lithium manganese nickel oxide (LiNi$_x$M$_{2-x}$O$_4$, also referred to as "LMNO"). A non-limiting example of a suitable LMNO compound is LiNi$_{0.5}$Mn$_{1.5}$O$_4$. In some cases, the electroactive material comprises Li$_{1.14}$Mn$_{0.42}$Ni$_{0.25}$Co$_{0.29}$O$_2$ ("HC-MNC"), lithium carbonate (Li$_2$CO$_3$), lithium carbides (e.g., Li$_2$C$_2$, Li$_4$C, Li$_6$C$_2$, Li$_8$C$_3$, Li$_6$C$_3$, Li$_4$C$_3$, Li$_4$C$_5$), vanadium oxides (e.g., V$_2$O$_5$, V$_2$O$_3$, V$_6$O$_{13}$), and/or vanadium phosphates (e.g., lithium vanadium phosphates, such as Li$_3$V$_2$(PO$_4$)$_3$), or any combination thereof.

In some embodiments, the electroactive material in a second electrode comprises a conversion compound. For instance, the electroactive material may be a lithium conversion material. It has been recognized that a cathode comprising a conversion compound may have a relatively large specific capacity. Without wishing to be bound by a particular theory, a relatively large specific capacity may be achieved by utilizing all possible oxidation states of a compound through a conversion reaction in which more than one electron transfer takes place per transition metal (e.g., compared to 0.1-1 electron transfer in intercalation compounds). Suitable conversion compounds include, but are not limited to, transition metal oxides (e.g., Co$_3$O$_4$), transition metal hydrides, transition metal sulfides, transition metal nitrides, and transition metal fluorides (e.g., CuF$_2$, FeF$_2$, FeF$_3$). A transition metal generally refers to an element whose atom has a partially filled d sub-shell (e.g., Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs). In some cases, the electroactive material may comprise a material that is doped with one or more dopants to alter the electrical properties (e.g., electrical conductivity) of the electroactive material. Non-limiting examples of suitable dopants include aluminum, niobium, silver, and zirconium.

In some embodiments, the electroactive material in a second electrode can comprise sulfur. In some embodiments, an electrode that is a cathode can comprise electroactive sulfur-containing materials. "Electroactive sulfur-containing materials," as used herein, refers to electroactive materials which comprise the element sulfur in any form, wherein the electrochemical activity involves the oxidation or reduction of sulfur atoms or moieties. As an example, the electroactive sulfur-containing material may comprise elemental sulfur (e.g., S$_8$). In some embodiments, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electroactive sulfur-containing material within a second electrode (e.g., a cathode) comprises at least 40 wt % sulfur. In some cases, the electroactive sulfur-containing material comprises at least 50 wt %, at least 75 wt %, or at least 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130, which are incorporated herein by reference in their entirety and for all purposes. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al., which are incorporated herein by reference in their entirety and for all purposes. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al., which are incorporated herein by reference in their entirety and for all purposes.

In some embodiments, the second electrode and/or electroactive material comprises a combination of any of the electroactive materials described for the second electrode (e.g., NCM811 and NCM721).

In some embodiments, a layer (e.g., a protective layer, such as an SEI) is disposed on the second electrode. In some embodiments, the layer comprises a first reactive species and/or a reaction product thereof. For example, in some embodiments, the layer comprises a reaction product between a component of the electroactive material (e.g., a transition metal) and the first reactive species (i.e., a species comprising a conjugated, negatively-charged ring comprising a nitrogen atom). As another example, in some embodiments, the layer comprises a reaction product between the first reactive species (i.e., a species comprising a conjugated, negatively-charged ring comprising a nitrogen atom) and a second reactive species (e.g., a species comprising the labile halogen atom). As yet another example, in some embodiments, the layer comprises a reaction product between a component of the electroactive material (e.g., a transition metal), a first reactive species, and a second reactive species (e.g., a reaction product between a transition metal and a reaction product of a first reactive species and a second reactive species)).

As described herein, in some embodiments, an electrochemical cell includes a separator. In some embodiments, the separator comprises a polymeric material (e.g., polymeric material that does or does not swell upon exposure to electrolyte) (e.g., monolayer or multilayer), glass, ceramic, and/or combinations thereof (e.g., ceramic/polymer composite or ceramic coated polymer). In some embodiments, the separator is located between an electrolyte and an electrode (e.g., between the electrolyte and a first electrode, between the electrolyte and a second electrode) and/or between two electrodes (e.g., between a first electrode and a second electrode).

The separator can be configured to inhibit (e.g., prevent) physical contact between two electrodes (e.g., between a first electrode and a second electrode), which could result in short circuiting of the electrochemical cell. The separator can be configured to be substantially electronically non-conductive, which can reduce the tendency of electric current to flow therethrough and thus reduce the possibility that a short circuit passes therethrough. In some embodiments, all or one or more portions of the separator can be formed of a material with a bulk electronic resistivity of at least $10^4$, at least $10^5$, at least $10^{10}$, at least $10^{15}$, or at least $10^{20}$ Ohm-meters. The bulk electronic resistivity may be measured at room temperature (e.g., 25° C.).

In some embodiments, the separator can be ionically conductive, while in other embodiments, the separator is substantially ionically non-conductive. In some embodiments, the average ionic conductivity of the separator is at least $10^{-7}$ S/cm, at least $10^{-6}$ S/cm, at least $10^{-5}$ S/cm, at least $10^{-4}$ S/cm, at least $10^{-2}$ S/cm, or at least $10^{-1}$ S/cm. In some embodiments, the average ionic conductivity of the separator may be less than or equal to 1 S/cm, less than or equal to $10^{-1}$ S/cm, less than or equal to $10^{-2}$ S/cm, less than or equal to $10^{-3}$ S/cm, less than or equal to $10^{-4}$ S/cm, less than or equal to $10^{-5}$ S/cm, less than or equal to $10^{-6}$ S/cm, less than or equal to $10^{-7}$ S/cm, or less than or equal to $10^{-8}$ S/cm. Combinations of the above-referenced ranges are also possible (e.g., an average ionic conductivity of at least $10^{-8}$ S/cm and less than or equal to $10^{-1}$ S/cm). Other values of ionic conductivity are also possible.

The average ionic conductivity of the separator can be determined by employing a conductivity bridge (i.e., an impedance measuring circuit) to measure the average resistivity of the separator at a series of increasing pressures until the average resistivity of the separator does not change as the pressure is increased. This value is considered to be the average resistivity of the separator, and its inverse is considered to be the average conductivity of the separator. The conductivity bridge may be operated at 1 kHz. The pressure may be applied to the separator in 500 kg/cm² increments by two copper cylinders positioned on opposite sides of the separator that are capable of applying a pressure to the separator of at least 3 tons/cm². The average ionic conductivity may be measured at room temperature (e.g., 25° C.).

In some embodiments, the separator can be a solid. The separator may be sufficiently porous such that it allows an electrolyte solvent to pass through it. In some embodiments, the separator does not substantially include a solvent (e.g., it may be unlike a gel that comprises solvent throughout its bulk), except for solvent that may pass through or reside in the pores of the separator. In other embodiments, a separator may be in the form of a gel.

A separator can comprise a variety of materials. The separator may comprise one or more polymers (e.g., the separator may be polymeric, the separator may be formed of one or more polymers), and/or may comprise an inorganic material (e.g., the separator may be inorganic, the separator may be formed of one or more inorganic materials).

Examples of suitable polymers that may be employed in separators include, but are not limited to, polyolefins (e.g., polyethylenes, poly(butene-1), poly(n-pentene-2), polypropylene, polytetrafluoroethylene); polyamines (e.g., poly(ethylene imine) and polypropylene imine (PPI)); polyamides (e.g., polyamide (Nylon), poly(e-caprolactam) (Nylon 6), poly(hexamethylene adipamide) (Nylon 66)); polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly (isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcyanoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly (methyl styrene), poly(methylmethacrylate) (PMMA), poly (vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(e-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK), and combinations thereof.

Non-limiting examples of suitable inorganic separator materials include glass fibers. For instance, in some embodiments, an electrochemical cell comprises a separator that is a glass fiber filter paper.

When present, the separator may be porous. In some embodiments, the pore size of the separator is less than or equal to 5 microns, less than or equal to 3 microns, less than or equal to 1 micron, less than or equal to 500 nm, less than or equal to 300 nm, less than or equal to 100 nm, or less than or equal to 50 nm. In some embodiments, the pore size of the separator is greater than or equal to 50 nm, greater than or equal to 100 nm, greater than or equal to 300 nm, greater than or equal to 500 nm, greater than or equal to 1 micron, or greater than or equal to 3 microns. Other values are also possible. Combinations of the above-noted ranges are also possible (e.g., less than or equal to 5 microns and greater than or equal to 50 nm, less than or equal to 300 nm and greater than or equal to 100 nm, less than or equal to 1 micron and greater than or equal to 300 nm, or less than or equal to 5 microns and greater than or equal to 500 nm).

In some embodiments, the separator is substantially non-porous. In other words, in some embodiments, the separator may lack pores, include a minimal number of pores, and/or not include pores in large portions thereof.

In some embodiments, an electrochemical cell described herein comprises at least one current collector. A current collector may be disposed on an electrode (e.g., a first electrode, a second electrode), and may provide electrons from the electrode to an external circuit (e.g., in the case of a current collector disposed on an anode or negative electrode) or may supply electrons to the electrode from an external circuit (e.g., in the case of a current collector disposed on a cathode or positive electrode). Non-limiting examples of suitable materials that may be employed in current collectors include metals (e.g., copper, nickel, aluminum, passivated metals), metallized polymers (e.g., metallized PET), electrically conductive polymers, and polymers comprising conductive particles dispersed therein.

Current collectors may be formed in a variety of manners. For instance, a current collector may be deposited onto an electrode by physical vapor deposition, chemical vapor deposition, electrochemical deposition, sputtering, doctor blading, flash evaporation, or any other appropriate deposition technique for the selected material. As another example, in some embodiments, a current collector is formed separately from an electrode and then bonded to the electrode (and/or to a component, such as a layer, thereof). It should be appreciated, however, that in some embodiments a current collector separate from an electrode (e.g., separate from a first electrode, separate from a second electrode) is not needed or present. This may be true when the electrode itself (and/or the electroactive material therein) is electrically conductive. In some embodiments, one or more portions of an electrochemical cell described herein (e.g., an electrode, a protective layer) may be disposed on or deposited onto a support layer. A support layer may be a layer that supports the relevant portion of the electrochemical cell, and/or may be a layer onto which it is beneficial to deposit the relevant portion of the electrochemical cell. For example, in one set of embodiments, the support layer may be disposed on a layer such as a carrier substrate that is not designed to be incorporated into a final electrochemical cell and may be capable of releasing the relevant portion of the electrochemical cell from that layer. When the support layer is adjacent a carrier substrate, the support layer may be partially or entirely delaminated from the electroactive material or layer during subsequent steps in electrochemical cell formation, and/or it may be partially or entirely delaminated from the carrier substrate during subsequent steps in electrochemical cell formation.

As another example, the support layer may be disposed on a layer which may be incorporated into an electrochemical cell but onto which it may be challenging to deposit one or more portions of an electrochemical cell (e.g., an electrode, a protective layer). For instance, the support layer may be disposed on a separator or an additional support layer (e.g., an additional support layer on a separator). A support layer that is adjacent a separator may serve to prevent deposition of one or more portions of the relevant portion of the electrochemical cell into any pores present in the separator and/or may serve to prevent contact between the separator and the relevant portion of the electrochemical cell. In some embodiments, a support layer that is initially adjacent a carrier substrate or a separator may be incorporated into a final electrochemical cell.

In some such cases, such as when a support layer is incorporated into a final electrochemical cell, the support layer may be formed of a material that is stable in the electrolyte and does not substantially interfere with the structural integrity of the electrode. For example, the support layer may be formed of a polymer or gel electrolyte (e.g., it may comprise lithium ions and/or be conductive to lithium ions) and/or a polymer that may swell in a liquid electrolyte to form a polymer gel electrolyte. In certain embodiments, the support layer itself may function as a separator. In some embodiments, a support layer may be formed of a polymer that is soluble in an electrolyte present in an electrochemical cell in which the electrode comprising the composite protective layer is positioned (e.g., an aprotic electrolyte), and/or may be dissolved upon exposure to the electrolyte (e.g., upon exposure to the aprotic electrolyte).

Non-limiting examples of suitable structures for portions of electrochemical cells that include support layers include the following: optional carrier substrate/support layer/optional current collector/first electrode/optional protective layer/optional separator and optional carrier substrate/support layer/optional separator/protective layer/electrode/optional current collector. The layers described as optional in the preceding sentence may be present in the structure or may optionally be absent. When absent, the layers described as being positioned on either side of the optional layer may be positioned directly adjacent each other or may be positioned on opposite sides of a different layer. Similarly, it should be understood that the layers separated by slashes above may be directly adjacent each other or may be separated by one or more intervening layers.

In some embodiments, the support layer may be a release layer, such as the release layers described in U.S. Pat. Pub. No. 2014/272,565, U.S. Pat. Pub. No. 2014/272,597, and U.S. Pat. Pub. No. 2011/068,001, each of which are herein incorporated by reference in their entirety. In some embodiments, it may be preferred for the support layer to be a release layer comprising hydroxyl functional groups (e.g., comprising PVOH and/or EVAL) and having one of the structures described above.

In one set of embodiments, a support layer (e.g., a polymeric support layer, a release layer) is formed of a polymeric material. Specific examples of appropriate polymers include, but are not limited to, polyoxides, poly(alkyl oxides)/polyalkylene oxides (e.g., polyethylene oxide, polypropylene oxide, polybutylene oxide), polyvinyl alcohols, polyvinyl butyral, polyvinyl formal, vinyl acetate-vinyl alcohol copolymers, ethylene-vinyl alcohol copolymers, and vinyl alcohol-methyl methacrylate copolymers, polysiloxanes, and fluorinated polymers. The polymer may be in the form of, for example, a solid polymer (e.g., a solid polymer electrolyte), a glassy-state polymer, or a polymer gel.

Additional examples of polymeric materials include polysulfones, polyethersulfone, polyphenylsulfones (e.g., Ultrason® S 6010, S 3010 and S 2010, available from BASF), polyethersulfone-polyalkyleneoxide copolymers, polyphenylsulfone-polyalkyleneoxide copolymers, polysulfone-polyalkylene oxide copolymers, polyisobutylene (e.g., Oppanol® B10, B15, B30, B80, B150 and B200, available from BASF), polyisobutylene succinic anhydride (PIBSA), polyisobutylene-polyalkyleneoxide copolymers, polyamide 6 (e.g., Ultramid® B33, available from BASF) (e.g., extrusion of 2 m polyamide layer on polyolefin carrier or solution casting of PA layer on polyolefin carrier substrate), polyvinylpyrrolidone, polyvinylpyrrolidone-polyvinylimidazole copolymers (e.g., Sokalan® HP56, available from BASF), polyvinylpyrrolidone-polyvinylactetate copolymers (e.g., Luviskol®, available from BASF), maleinimide-vinylether copolymers, polyacrylamides, fluorinated polyacrylates (optionally including surface reactive comonomers), polyethylene-polyvinylalcohol copolymers (e.g., Kuraray®, available from BASF), polyethylene-polyvinylacetate copolymers, polyvinylalcohol and polyvinylacetate copolymers, polyoxymethylene (e.g., extruded), polyvinylbutyral (e.g., Kuraray®, available from BASF), polyureas (e.g., branched), polymers based on photopolymerization of acrolein derivatives ($CH_2$=CR—C(O)R), polysulfone-polyalkyleneoxide copolymers, polyvinylidene difluoride (e.g., Kynar® D155, available from BASF), and combinations thereof.

In one embodiment, a support layer comprises a polyethersulfone-polyalkylene oxide copolymer. In one particular embodiment, the polyethersulfone-polyalkylene oxide copolymer is a polyarylethersulfone-polyalkylene oxide copolymer (PPC) obtained by polycondensation of reaction mixture (RG) comprising the components: (A1) at least one aromatic dihalogen compound, (B1) at least one aromatic dihydroxyl compound, and (B2) at least one polyalkylene oxide having at least two hydroxyl groups. The reaction mixture may also include (C) at least one aprotic polar solvent and (D) at least one metal carbonate, where the reaction mixture (RG) does not comprise any substance which forms an azeotrope with water. The resulting copolymer may be a random copolymer or a block copolymer. For instance, the resulting copolymer may include blocks of A1-B1, and blocks of A1-B2. The resulting copolymer may, in some instances, include blocks of A1-B1-A1-B2.

Further examples of polymeric materials include polyimide (e.g., Kapton®) with a hexafluoropropylene (HFP) coating (e.g., available from Dupont); siliconized polyester films (e.g., a Mitsubishi polyester), metallized polyester films (e.g., available from Mitsubishi or Sion Power), polybenzimidazoles (PBI; e.g., low molecular weight PBI-available from Celanese), polybenzoxazoles (e.g., available from Foster-Miller, Toyobo), ethylene-acrylic acid copolymers (e.g., Poligen®, available from BASF), acrylate based polymers (e.g., Acronal®, available from BASF), (charged) polyvinylpyrrolidone-polyvinylimidazole copolymers (e.g., Sokalane® HP56, Luviquat®, available from BASF), polyacrylonitriles (PAN), styrene-acrylonitriles (SAN), thermoplastic polyurethanes (e.g., Elastollan® 1195 A 10, available from BASF), polysulfone-poly(akylene oxide) copolymers, benzophenone-modified polysulfone (PSU) polymers, polyvinylpyrrolidone-polyvinylactetate copolymers (e.g., Luviskol®, available from BASF), and combinations thereof.

In some embodiments, a support layer includes a polymer that is conductive to certain ions (e.g., alkali metal ions) but is also substantially electrically conductive. Examples of such materials include electrically conductive polymers (also known as electronic polymers or conductive polymers) that are doped with lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$). Examples of conductive polymers include, but are not limited to, poly (acetylene)s, poly(pyrrole)s, poly(thiophene)s, poly(aniline) s, poly(fluorene)s, polynaphthalenes, poly(p-phenylene sulfide), and poly(para-phenylene vinylene)s. Electrically-conductive additives may also be added to polymers to form electrically-conductive polymers.

In some embodiments, a support layer includes a polymer that is conductive to one or more types of ions. In some cases, the support layer may be substantially non-electrically conductive. Examples of ion-conductive species (that may be substantially non-electrically conductive) include non-electrically conductive materials (e.g., electrically insulating materials) that are doped with lithium salts. E.g., acrylate, polyethyleneoxide, silicones, polyvinylchlorides, and other insulating polymers that are doped with lithium salts can be ion-conductive (but substantially non-electrically conductive). Additional examples of polymers include ionically conductive polymers, sulfonated polymers, and hydrocarbon polymers.

Suitable ionically conductive polymers may include, e.g., ionically conductive polymers known to be useful in solid polymer electrolytes and gel polymer electrolytes for lithium electrochemical cells, such as, for example, polyethylene oxides. Suitable sulfonated polymers may include, e.g., sulfonated siloxane polymers, sulfonated polystyrene-ethylene-butylene polymers, and sulfonated polystyrene polymers. Suitable hydrocarbon polymers may include, e.g., ethylene-propylene polymers, polystyrene polymers, and the like.

In some embodiments, a support layer includes a crosslinkable polymer. Non-limiting examples of crosslinkable polymers include: polyvinyl alcohol, polyvinylbutyral, polyvinylpyridyl, polyvinyl pyrrolidone, polyvinyl acetate, acrylonitrile butadiene styrene (ABS), ethylene-propylene rubbers (EPDM), EPR, chlorinated polyethylene (CPE), ethylenebisacrylamide (EBA), acrylates (e.g., alkyl acrylates, glycol acrylates, polyglycol acrylates, ethylene ethyl acrylate (EEA)), hydrogenated nitrile butadiene rubber (HNBR), natural rubber, nitrile butadiene rubber (NBR), certain fluoropolymers, silicone rubber, polyisoprene, ethylene vinyl acetate (EVA), chlorosulfonyl rubber, fluorinated poly(arylene ether) (FPAE), polyether ketones, polysulfones, polyether imides, diepoxides, diisocyanates, diisothiocyanates, formaldehyde resins, amino resins, polyurethanes, unsaturated polyethers, polyglycol vinyl ethers, polyglycol divinyl ethers, copolymers thereof, and those described in U.S. Pat. No. 6,183,901 to Ying et al. of the common assignee for protective coating layers for separator layers.

Additional examples of crosslinkable or crosslinked polymers include UV/E-beam crosslinked Ultrason® or similar polymers (i.e., polymers comprising an amorphous blend of one or more of poly(sulfone), poly(ethersulfone), and poly (phenylsulfone)), UV crosslinked Ultrason®-polyalkyleneoxide copolymers, UV/E-beam crosslinked Ultrason®-acrylamide blends, crosslinked polyisobutylene-polyalkyleneoxide copolymers, crosslinked branched polyimides (BPI), crosslinked maleinimide-Jeffamine polymers (MSI gels), crosslinked acrylamides, and combinations thereof.

Those of ordinary skill in the art can choose appropriate polymers that can be crosslinked, as well as suitable methods of crosslinking, based upon general knowledge of the art in combination with the description herein. Crosslinked polymer materials may further comprise salts, for example, lithium salts, to enhance lithium ion conductivity.

If a crosslinkable polymer is used, the polymer (or polymer precursor) may include one or more crosslinking agents. A crosslinking agent is a molecule with a reactive portion(s) designed to interact with functional groups on the polymer chains in a manner that will form a crosslinking bond between one or more polymer chains. Examples of crosslinking agents that can crosslink polymeric materials used for support layers described herein include, but are not limited to: polyamide-epichlorohydrin (polycup 172); aldehydes (e.g., formaldehyde and urea-formaldehyde); dialdehydes (e.g., glyoxal glutaraldehyde, and hydroxyadipaldehyde); acrylates (e.g., ethylene glycol diacrylate, di(ethylene glycol) diacrylate, tetra(ethylene glycol) diacrylate, methacrylates, ethylene glycol dimethacrylate, di(ethylene glycol) dimethacrylate, tri(ethylene glycol) dimethacrylate); amides (e.g., N,N'-methylenebisacrylamide, N,N'-ethylenebisacrylamide, N,N'-(1,2-dihydroxyethylene)bisacrylamide, N-(1-hydroxy-2,2-dimethoxyethyl)acrylamide); silanes (e.g., methyltrimethoxysilane, methyltriethoxysilane, tetramethoxysilane (TMOS), tetraethoxysilane (TEOS), tetrapropoxysilane, methyltris(methylethyldetoxime)silane, methyltris(acetoxime)silane, methyltris(methylisobutylketoxime)silane, dimethyldi(methylethyldetoxime)silane, trimethyl(methylethylketoxime)silane, vinyltris(methylethylketoxime)silane, methylvinyldi(mtheylethylketoxime)silane, methylvinyldi(cyclohexaneoneoxxime)silane, vinyltris(mtehylisobutylketoxime)silane, methyltriacetoxysilane, tetraacetoxysilane, and phenyltris(methylethylketoxime)silane); divinylbenzene; melamine; zirconium ammonium carbonate; dicyclohexylcarbodiimide/dimethylaminopyridine (DCC/DMAP); 2-chloropyridinium ion; 1-hydroxycyclohexylphenyl ketone; acetophenon dimethylketal; benzoylmethyl ether; aryl triflourovinyl ethers; benzocyclobutenes; phenolic resins (e.g., condensates of phenol with formaldehyde and lower alcohols, such as methanol, ethanol, butanol, and isobutanol), epoxides; melamine resins (e.g., condensates of melamine with formaldehyde and lower alcohols, such as methanol, ethanol, butanol, and isobutanol); polyisocyanates; and dialdehydes.

Other classes of polymers that may be suitable for use in a support layer may include, but are not limited to, polyamines (e.g., poly(ethylene imine) and polypropylene imine (PPI)); polyamides (e.g., poly(e-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly (vinyl fluoride), poly(2-vinyl pyridine), polychlorotrifluoro ethylene, and poly(isohexylcynaoacrylate)); polyacetals; polyolefins (e.g., poly(butene-1), poly(n-pentene-2), polypropylene, polytetrafluoroethylene); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride), poly(vinylidene difluoride, poly(vinylidene difluoride block copolymers); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes).

In some embodiments, the molecular weight of a polymer may be chosen to achieve a particular adhesive affinity and can vary in a support layer. In some embodiments, the molecular weight of a polymer used in a support layer may be greater than or equal to 1,000 g/mol, greater than or equal to 5,000 g/mol, greater than or equal to 10,000 g/mol, greater than or equal to 15,000 g/mol, greater than or equal to 20,000 g/mol, greater than or equal to 25,000 g/mol, greater than or equal to 30,000 g/mol, greater than or equal to 50,000 g/mol, greater than or equal to 100,000 g/mol or greater than or equal to 150,000 g/mol. In certain embodiments, the molecular weight of a polymer used in a support layer may be less than or equal to 150,000 g/mol, less than or equal to 100,000 g/mol, less than or equal to 50,000 g/mol, less than or equal to 30,000 g/mol, less than or equal to 25,000 g/mol, less than or equal to 20,000 g/mol, less than or equal to 10,000 g/mol, less than or equal to 5,000 g/mol, or less than or equal to 1,000 g/mol. Other ranges are also possible. Combinations of the above-referenced ranges are also possible (e.g., greater than or equal to about 5,000 g/mol and less than or equal to about 50,000 g/mol).

When polymers are used, the polymer may be substantially crosslinked, substantially uncrosslinked, or partially crosslinked as the current disclosure is not limited in this fashion. Further, the polymer may be substantially crystalline, partially crystalline, or substantially amorphous. Without wishing to be bound by theory, embodiments in which the polymer is amorphous may exhibit smoother surfaces since crystallization of the polymer may lead to increased surface roughness. In certain embodiments, the release layer is formed of or includes a wax.

The polymer materials listed above and described herein may further comprise salts, for example, lithium salts (e.g., LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, and $LiN(SO_2CF_3)_2$), to enhance lithium ion conductivity. As described herein, a support layer may be positioned on a carrier substrate to facilitate fabrication of an electrode. Any suitable material can be used as a carrier substrate. In some embodiments, the material (and thickness) of a carrier substrate may be chosen at least in part due to its ability to withstand certain processing conditions such as high temperature. The substrate material may also be chosen at least in part based on its adhesive affinity to a release layer. In some cases, a carrier substrate is a polymeric material. Examples of suitable materials that can be used to form all or portions of a carrier substrate include certain of those described herein suitable as release layers, optionally with modified molecular weight, cross-linking density, and/or addition of additives or other components. In certain embodiments, a carrier substrate comprises a polyester such as a polyethylene terephthalate (PET) (e.g., optical grade polyethylene terephthalate), polyolefins, polypropylene, nylon, polyvinyl chloride, and polyethylene (which may optionally be metalized). In some cases, a carrier substrate comprises a metal (e.g., a foil such as nickel foil and/or aluminum foil), a glass, or a ceramic material. In some embodiments, a carrier substrate includes a film that may be optionally disposed on a thicker substrate material. For instance, in certain embodiments, a carrier substrate includes one or more films, such as a polymer film (e.g., a PET film) and/or a metalized polymer film (using various metals such as aluminum and copper). A carrier substrate may also include additional components such as fillers, binders, and/or surfactants.

Additionally, a carrier substrate may have any suitable thickness. For instance, the thickness of a carrier substrate may be greater than or equal to about 5 microns, greater than or equal to about 15 microns, greater than or equal to about 25 microns, greater than or equal to about 50 microns, greater than or equal to about 75 microns, greater than or equal to about 100 microns, greater than or equal to about 200 microns, greater than or equal to about 500 microns, or greater than or equal to about 1 mm. In some embodiments, the carrier substrate may have a thickness of less than or equal to about 10 mm, less than or equal to about 5 mm, less than or equal to about 3 mm, or less than or equal to about 1 mm. Combinations of the above-referenced ranges are also possible (e.g., greater than or equal to about 100 microns and less than or equal to about 1 mm.) Other ranges are also possible. In some cases, the carrier substrate has a thickness that is equal to or greater than the thickness of the release layer.

In certain embodiments, the one or more carrier substrates may be left intact with an electrode after fabrication of the electrode, but may be delaminated before the electrode is incorporated into an electrochemical cell. For instance, the electrode may be packaged and shipped to a manufacturer who may then incorporate the electrode into an electrochemical cell. In such embodiments, the electrode may be inserted into an air and/or moisture-tight package to prevent or inhibit deterioration and/or contamination of one or more components of the electrode structure. Allowing the one or more carrier substrates to remain attached to the electrode can facilitate handling and transportation of the electrode. For instance, the carrier substrate(s) may be relatively thick and have a relatively high rigidity or stiffness, which can prevent or inhibit the electrode from distorting during handling. In such embodiments, the carrier substrate(s) can be removed by the manufacturer before, during, or after assembly of an electrochemical cell.

It can be advantageous, according to some embodiments, to apply an anisotropic force to the electrochemical cells described herein during charge and/or discharge. In some embodiments, the electrochemical cells and/or the electrodes described herein can be configured to withstand an applied anisotropic force (e.g., a force applied to enhance the morphology of an electrode within the cell) while maintaining their structural integrity.

In some embodiments, any of the electrodes described herein can be part of an electrochemical cell that is constructed and arranged such that, during at least one period of time during charge and/or discharge of the cell, an anisotropic force with a component normal to the active surface of an electrode within the electrochemical cell (e.g., an electrode comprising lithium metal and/or a lithium alloy, such as an anode comprising lithium metal and/or a lithium alloy) is applied to the cell. In some embodiments, any of the protective layers and/or SEIs described herein can be part of an electrochemical cell that is constructed and arranged such that, during at least one period of time during charge and/or discharge of the cell, an anisotropic force with a component normal to the active surface of an electrode within the electrochemical cell (e.g., an electrode comprising lithium metal and/or a lithium alloy, such as an anode comprising lithium metal and/or a lithium alloy) is applied to the cell. In one set of embodiments, the applied anisotropic force can be selected to enhance the morphology of an electrode (e.g., an electrode comprising lithium metal and/or a lithium alloy, such as a lithium metal and/or a lithium alloy anode).

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes a force applied by a band arranged around a perimeter of an object.

For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

Figure 2:
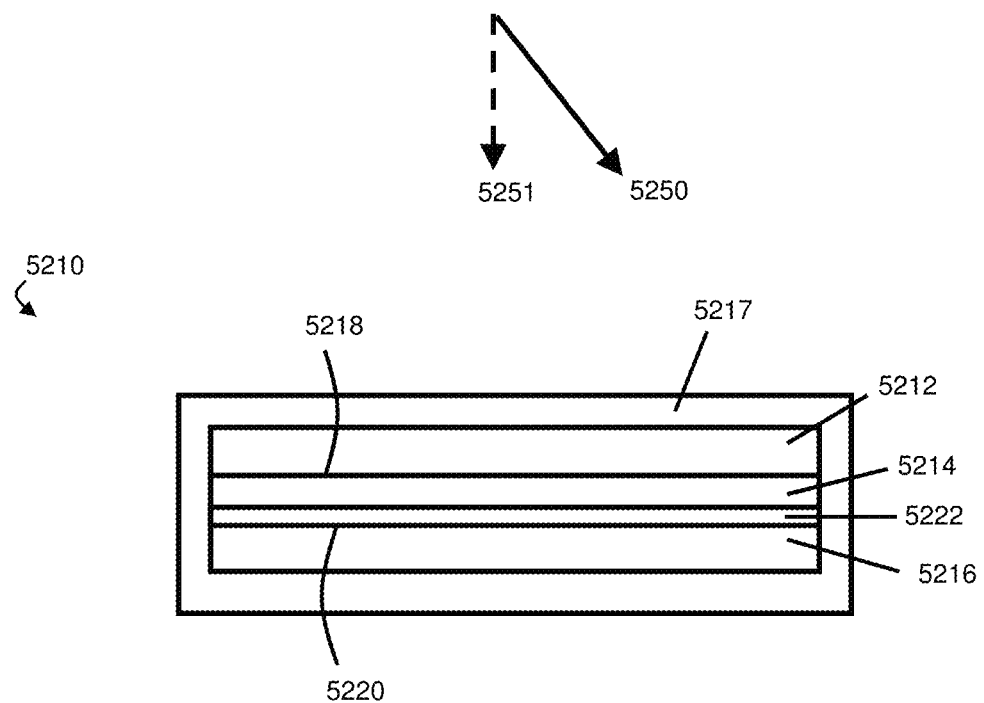
FIG. 2 shows, in accordance with some embodiments, an electrochemical cell to which an anisotropic force is applied.

In some such cases, the anisotropic force comprises a component normal to an active surface of an electrode within an electrochemical cell. As used herein, the term "active surface" is used to describe a surface of an electrode at which electrochemical reactions may take place. For example, referring to FIG. 2, an electrochemical cell 5210 can comprise a second electrode 5212 which can include an active surface 5218 and/or a first electrode 5216 which can include an active surface 5220. The electrochemical cell 5210 further comprises an electrolyte 5214 and a protective layer 5222. In some embodiments, an electrochemical cell to which an anisotropic force is applied comprises an SEI (e.g., in addition to, instead of, or as a component of a protective layer). In FIG. 2, a component 5251 of an anisotropic force 5250 is normal to both the active surface of the second electrode and the active surface of the first electrode. In some embodiments, the anisotropic force comprises a component normal to a surface of a protective layer in contact with an electrolyte.

A force with a "component normal" to a surface is given its ordinary meaning as would be understood by those of ordinary skill in the art and includes, for example, a force which at least in part exerts itself in a direction substantially perpendicular to the surface. For example, in the case of a horizontal table with an object resting on the table and affected only by gravity, the object exerts a force essentially completely normal to the surface of the table. If the object is also urged laterally across the horizontal table surface, then it exerts a force on the table which, while not completely perpendicular to the horizontal surface, includes a component normal to the table surface. Those of ordinary skill can understand other examples of these terms, especially as applied within the description of this document. In the case of a curved surface (for example, a concave surface or a convex surface), the component of the anisotropic force that is normal to an active surface of an electrode may correspond to the component normal to a plane that is tangent to the curved surface at the point at which the anisotropic force is applied. The anisotropic force may be applied, in some cases, at one or more pre-determined locations, optionally distributed over the active surface of the electrode and/or over a surface of a protective layer. In some embodiments, the anisotropic force is applied uniformly over the active surface of the first electrode (e.g., of the anode) and/or uniformly over a surface of a protective layer in contact with an electrolyte.

Any of the electrochemical cell properties and/or performance metrics described herein may be achieved, alone or in combination with each other, while an anisotropic force is applied to the electrochemical cell (e.g., during charge and/or discharge of the cell) during charge and/or discharge. In some embodiments, the anisotropic force applied to the electrode and/or to the electrochemical cell (e.g., during at least one period of time during charge and/or discharge of the cell) can include a component normal to an active surface of an electrode (e.g., an anode such as a lithium metal and/or lithium alloy anode within the electrochemical cell). In some embodiments, the component of the anisotropic force that is normal to the active surface of the electrode defines a pressure of greater than or equal to 1 kg/cm$^2$, greater than or equal to 2 kg/cm$^2$, greater than or equal to 4 kg/cm$^2$, greater than or equal to 6 kg/cm$^2$, greater than or equal to 8 kg/cm$^2$, greater than or equal to 10 kg/cm$^2$, greater than or equal to 12 kg/cm$^2$, greater than or equal to 14 kg/cm$^2$, greater than or equal to 16 kg/cm$^2$, greater than or equal to 18 kg/cm², greater than or equal to 20 kg/cm², greater than or equal to 22 kg/cm², greater than or equal to 24 kg/cm², greater than or equal to 26 kg/cm², greater than or equal to 28 kg/cm², greater than or equal to 30 kg/cm², greater than or equal to 32 kg/cm², greater than or equal to 34 kg/cm², greater than or equal to 36 kg/cm², greater than or equal to 38 kg/cm², greater than or equal to 40 kg/cm², greater than or equal too 42 kg/cm², greater than or equal to 44 kg/cm², greater than or equal to 46 kg/cm², or greater than or equal to 48 kg/cm². In some embodiments, the component of the anisotropic force normal to the active surface may, for example, define a pressure of less than or equal to 50 kg/cm², less than or equal to 48 kg/cm², less than or equal to 46 kg/cm², less than or equal to 44 kg/cm², less than or equal to 42 kg/cm², less than or equal to 40 kg/cm², less than or equal to 38 kg/cm², less than or equal to 36 kg/cm², less than or equal to 34 kg/cm², less than or equal to 32 kg/cm², less than or equal to 30 kg/cm², less than or equal to 28 kg/cm², less than or equal to 26 kg/cm², less than or equal to 24 kg/cm², less than or equal to 22 kg/cm², less than or equal to 20 kg/cm², less than or equal to 18 kg/cm², less or equal to 16 kg/cm², less than or equal to 14 kg/cm², less than or equal to 12 kg/cm², less than or equal to 10 kg/cm², less than or equal to 8 kg/cm², less than or equal to 6 kg/cm², less than or equal to 4 kg/cm², or less than or equal to 2 kg/cm². Combinations of the above-referenced ranges are also possible (e.g., greater than or equal to 1 kg/cm² and less than or equal to 50 kg/cm², greater than or equal to 1 kg/cm² and less than or equal to 40 kg/cm², greater than or equal to 1 kg/cm² and less than or equal to 30 kg/cm², greater than or equal to 1 kg/cm² and less than or equal to 20 kg/cm², or greater than or equal to 10 kg/cm² and less than or equal to 20 kg/cm²). Other ranges are also possible.

In some embodiments, the component of the anisotropic force normal to the anode active surface is between about 20% and about 200% of the yield stress of the anode material (e.g., lithium metal), between about 50% and about 120% of the yield stress of the anode material, or between about 80% and about 100% of the yield stress of the anode material.

The anisotropic forces applied during charge and/or discharge as described herein may be applied using any method known in the art. In some embodiments, the force may be applied using compression springs. Forces may be applied using other elements (either inside or outside a containment structure) including, but not limited to Belleville washers, machine screws, pneumatic devices, and/or weights, among others. In some cases, cells may be pre-compressed before they are inserted into containment structures, and, upon being inserted to the containment structure, they may expand to produce a net force on the cell. Suitable methods for applying such forces are described in detail, for example, in U.S. Pat. No. 9,105,938, which is incorporated herein by reference in its entirety.

In some embodiments, the articles (e.g., electrochemical cells and/or electrochemical cell components) described herein have one or more advantages (e.g., an increased cycle life, increased capacity, increased stability, reduced oxidation of the electrolyte on an electrode (e.g., the cathode and/or second electrode), increased ability to operate at high voltages, increased ability to be charged to high voltages, increased voltage discharge, increased discharge energy, and/or reduced diffusion of cations of the transition metal (e.g., Co, Ni, Mn) from the second electrode to the electrolyte and/or reduction on the first electrode) compared to an article without the first reactive species, one or more (e.g., all) of the reaction products disclosed herein, one or more of the protective layers (e.g., all) disclosed herein, and/or an electrolyte comprising the first reactive species and/or second reactive species, all other factors being equal.

For example, in some embodiments, the article (e.g., electrochemical cell and/or electrochemical cell component) completes (or is configured to complete) greater than or equal to 115%, greater than or equal to 120%, greater than or equal to 140%, greater than or equal to 160%, greater than or equal to 180%, or greater than or equal to 200% the number of charge-discharge cycles before the capacity decreases to 80% of initial capacity compared to an article without the first reactive species, one or more (e.g., all) of the reaction products disclosed herein, one or more of the protective layers (e.g., all) disclosed herein, and/or electrolyte comprising the first reactive species and/or second reactive species, all other factors being equal. In some embodiments, the article completes (or is configured to complete) less than or equal to 500%, less than or equal to 400%, less than or equal to 350%, less than or equal to 300%, less than or equal to 250%, or less than or equal to 200% the number of charge-discharge cycles before the capacity decreases to 80% of initial capacity compared to an article without the first reactive species, one or more (e.g., all) of the reaction products disclosed herein, one or more of the protective layers (e.g., all) disclosed herein, and/or electrolyte comprising the first reactive species and/or second reactive species, all other factors being equal. Combinations of these ranges are also possible (e.g., greater than or equal to 115% and less than or equal to 500% or greater than or equal to 115% and less than or equal to 200%). For example, if the article disclosed herein completes 200 charge-discharge cycles before the capacity decreases to 80% of initial capacity, while an article without the first reactive species, one or more (e.g., all) of the reaction products disclosed herein, one or more of the protective layers (e.g., all) disclosed herein, and/or electrolyte comprising the first reactive species and/or second reactive species (but with all other factors being equal) completes 100 charge-discharge cycles before the capacity decreases to 80% of initial capacity, then the article disclosed herein completed 200% of the charge-discharge cycles of the article without the first reactive species, one or more (e.g., all) of the reaction products disclosed herein, one or more of the protective layers (e.g., all) disclosed herein, and/or electrolyte comprising the first reactive species and/or second reactive species (but with all other factors being equal).

Similarly, in some embodiments, the article (e.g., electrochemical cell and/or electrochemical cell component) completes (or is configured to complete) greater than or equal to 115%, greater than or equal to 125%, greater than or equal to 140%, greater than or equal to 150%, greater than or equal to 175%, greater than or equal to 200%, greater than or equal to 250%, greater than or equal to 300%, greater than or equal to 350%, greater than or equal to 400%, greater than or equal to 450%, greater than or equal to 500%, or greater than or equal to 550% the number of charge-discharge cycles before the capacity decreases to 62.5% of initial capacity compared to an article without the first reactive species, one or more (e.g., all) of the reaction products disclosed herein, one or more of the protective layers (e.g., all) disclosed herein, and/or electrolyte comprising the first reactive species and/or second reactive species, all other factors being equal. In some embodiments, the article completes (or is configured to complete) less than or equal to 1,000%, less than or equal to 900%, less than or equal to 800%, less than or equal to 700%, less than or equal to 600%, or less than or equal to 550% the number of charge-discharge cycles before the capacity decreases to 62.5% of initial capacity compared to an article without the first reactive species, one or more (e.g., all) of the reaction products disclosed herein, one or more of the protective layers (e.g., all) disclosed herein, and/or electrolyte comprising the first reactive species and/or second reactive species, all other factors being equal. Combinations of these ranges are also possible (e.g., greater than or equal to 115% and less than or equal to 1,000%, greater than or equal to 115% and less than or equal to 600%, or greater than or equal to 150% and less than or equal to 550%). For example, if the article disclosed herein completes 500 charge-discharge cycles before the capacity decreases to 62.5% of initial capacity, while an article without the first reactive species, one or more (e.g., all) of the reaction products disclosed herein, one or more of the protective layers (e.g., all) disclosed herein, and/or electrolyte comprising the first reactive species and/or second reactive species (but with all other factors being equal) completes 100 charge-discharge cycles before the capacity decreases to 62.5% of initial capacity, then the article disclosed herein completed 500% of the charge-discharge cycles of the article without the reactive species, one or more (e.g., all) of the reaction products disclosed herein, one or more of the protective layers (e.g., all) disclosed herein, and/or electrolyte comprising the first reactive species and/or second reactive species (but with all other factors being equal).

In some embodiments, the articles (e.g., electrochemical cells and/or electrochemical cell components) described herein has one or more advantages (e.g., an increased cycle life (as discussed in more detail above), increased capacity, increased stability, reduced oxidation of the electrolyte on an electrode (e.g., the cathode and/or second electrode) compared to an article without the first reactive species, one or more (e.g., all) of the reaction products disclosed herein, one or more of the protective layers (e.g., all) disclosed herein, and/or electrolyte comprising the first reactive species and/or second reactive species, all other factors being equal, when the articles are charged at high voltage. As used herein, a high voltage is a voltage greater than or equal to 4.0 V. For example, in some embodiments, the high voltage is greater than or equal to 4.0 V, greater than or equal to 4.1 V, greater than or equal to 4.2 V, greater than or equal to 4.3 V, greater than or equal to 4.35 V, greater than or equal to 4.5 V, or greater than or equal to 4.6 V. In some embodiments, the high voltage is less than or equal to 4.75 V, less than or equal to 4.7 V, or less than or equal to 4.65 V. Combinations of these ranges are also possible (e.g., greater than or equal to 4.0 V and less than or equal to 4.75 V or greater than or equal to 4.35 V and less than or equal to 4.65 V).

For convenience, some of the terms employed in the specification, examples, and appended claims are listed here. Definitions of specific functional groups and chemical terms are described in more detail below. For purposes of this invention, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito: 1999.

The term "aliphatic," as used herein, includes both saturated and unsaturated, nonaromatic, straight chain (i.e., unbranched), branched, acyclic, and cyclic (i.e., carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl," "alkynyl," and the like. Furthermore, as used herein, the terms "alkyl," "alkenyl," "alkynyl," and the like encompass both substituted and unsubstituted groups. In some embodiments, as used herein, "aliphatic" is used to indicate those aliphatic groups (cyclic, acyclic, substituted, unsubstituted, branched or unbranched) having 1-20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "alkyl" refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. The alkyl groups may be optionally substituted, as described more fully below. Examples of alkyl groups include, but are not limited to, methyl, ethyl, propyl, isopropyl, butyl, isobutyl, tert-butyl, 2-ethylhexyl, cyclopropyl, cyclobutyl, cyclopentyl, cyclohexyl, and the like. "Heteroalkyl" groups are alkyl groups wherein at least one atom is a heteroatom (e.g., oxygen, sulfur, nitrogen, phosphorus, etc.), with the remainder of the atoms being carbon atoms. Examples of heteroalkyl groups include, but are not limited to, alkoxy, poly(ethylene glycol)-, alkyl-substituted amino, tetrahydrofuranyl, piperidinyl, morpholinyl, etc.

The terms "alkenyl" and "alkynyl" refer to unsaturated aliphatic groups analogous to the alkyl groups described above, but containing at least one double or triple bond respectively.

The term "aryl" refers to an aromatic carbocyclic group having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl), all optionally substituted. "Heteroaryl" groups are aryl groups wherein at least one ring atom in the aromatic ring is a heteroatom, with the remainder of the ring atoms being carbon atoms. Examples of heteroaryl groups include furanyl, thienyl, pyridyl, pyrrolyl, N lower alkyl pyrrolyl, pyridyl N oxide, pyrimidyl, pyrazinyl, imidazolyl, indolyl and the like, all optionally substituted.

The terms "amine" and "amino" refer to both unsubstituted and substituted amines, e.g., a moiety that can be represented by the general formula: N(R')(R")(R'") wherein R', R", and R'" each independently represent a group permitted by the rules of valence.

The term "acyl" is recognized in the art and can include such moieties as can be represented by the general formula:

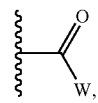

wherein W is H, OH, O-alkyl, O-alkenyl, or a salt thereof. Where W is O-alkyl, the formula represents an "ester." Where W is OH, the formula represents a "carboxylic acid." In general, where the oxygen atom of the above formula is replaced by sulfur, the formula represents a "thiocarbonyl" group. Where W is a S-alkyl, the formula represents a "thioester." On the other hand, where W is alkyl, the above formula represents a "ketone" group. Where W is hydrogen, the above formula represents an "aldehyde" group.

As used herein, the term "heteroaromatic" or "heteroaryl" means a monocyclic or polycyclic heteroaromatic ring (or radical thereof) comprising carbon atom ring members and one or more heteroatom ring members (such as, for example, oxygen, sulfur or nitrogen). Typically, the heteroaromatic ring has from 5 to about 14 ring members in which at least 1 ring member is a heteroatom selected from oxygen, sulfur, and nitrogen. In another embodiment, the heteroaromatic ring is a 5 or 6 membered ring and may contain from 1 to about 4 heteroatoms. In another embodiment, the heteroaromatic ring system has a 7 to 14 ring members and may contain from 1 to about 7 heteroatoms. Representative heteroaryls include pyridyl, furyl, thienyl, pyrrolyl, oxazolyl, imidazolyl, indolizinyl, thiazolyl, isoxazolyl, pyrazolyl, isothiazolyl, pyridazinyl, pyrimidinyl, pyrazinyl, triazinyl, triazolyl, pyridinyl, thiadiazolyl, pyrazinyl, quinolyl, isoquinolyl, indazolyl, benzoxazolyl, benzofuryl, benzothiazolyl, indolizinyl, imidazopyridinyl, isothiazolyl, tetrazolyl, benzimidazolyl, benzoxazolyl, benzothiazolyl, benzothiadiazolyl, benzoxadiazolyl, carbazolyl, indolyl, tetrahydroindolyl, azaindolyl, imidazopyridyl, qunizaolinyl, purinyl, pyrrolo[2,3]pyrimidyl, pyrazolo[3,4]pyrimidyl, benzo(b)thienyl, and the like. These heteroaryl groups may be optionally substituted with one or more substituents.

The term "substituted" is contemplated to include all permissible substituents of organic compounds, "permissible" being in the context of the chemical rules of valence known to those of ordinary skill in the art. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl" must still comprise the phenyl moiety and cannot be modified by substitution, in this definition, to become, e.g., a heteroaryl group such as pyridine. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. This invention is not intended to be limited in any manner by the permissible substituents of organic compounds.

Examples of substituents include, but are not limited to, alkyl, aryl, aralkyl, cyclic alkyl, heterocycloalkyl, hydroxy, alkoxy, aryloxy, perhaloalkoxy, aralkoxy, heteroaryl, heteroaryloxy, heteroarylalkyl, heteroaralkoxy, azido, amino, halogen, alkylthio, oxo, acyl, acylalkyl, carboxy esters, carboxyl, carboxamido, nitro, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, alkoxyalkyl, perhaloalkyl, arylalkyloxyalkyl, and the like.

EXAMPLES

Example 1

This Example describes the fabrication of LCO cathodes treated with potassium 1H-1,2,4-triazolate. This Example demonstrates an increased cycle life for electrochemical cells comprising the treated cathodes.

LCO cathodes were treated by dipping them into a 1 wt. % solution of potassium 1H-1,2,4-triazolate in ethanol at room temperature for 1-2 minutes. The treated cathodes were dried at room temperature until the ethanol evaporated and were then dried at 130° C. overnight.

Electrochemical cells ("Example 1") were then made with these treated LCO cathodes, vacuum deposited lithium as anode, and an ENTEK EP separator. The cells were filled with 0.55 g of an electrolyte (a 1M solution of $LiPF_6$ in a mixture of dimethylcarbonate/fluoroethylenecarbonate (4:1 w/w) with 1 wt. % of lithium bis(oxalatoborate)).

Two groups of control electrochemical cells were made, which were identical to the Example 1 electrochemical cell, except that the LCO cathode of Control Group 1 was left untreated and Control Group 2 was only treated with ethanol.

All of the electrochemical cells were charged to 4.55 V with 30 mA current, and discharged to 3.2 V with 120 mA current. All of the electrochemical cells had a 510 mAh capacity during first discharge, which was taken as the initial capacity. Control Group 1 and Control Group 2 completed 45 cycles before reaching a capacity that was 80% of the initial capacity. The Example 1 electrochemical cell completed 90 cycles before reaching a capacity that was 80% of the initial capacity. Accordingly, treating the cathodes with potassium 1H-1,2,4-triazolate resulted in 200% the number of cycles before reaching a capacity that was 80% of the initial capacity compared to the untreated controls.

Example 2

This Example describes the fabrication of NCM 811 cathodes treated with metal triflates and potassium 1H-1,2,4-triazolate. This Example demonstrates an increased cycle life for electrochemical cells comprising the treated cathodes, and that potassium 1H-1,2,4-triazolate additives were incorporated into the NCM 811 cathode.

NCM 811 cathodes were treated by dipping them into a solution of 5 wt. % triflate (e.g., of Cu, Zn, Ni, Co, or Ca) in benzonitrile for 30 seconds. The cathodes were dried at 50° C. in a vacuum overnight. The cathodes were then treated with a solution of 1 wt. % potassium 1H-1,2,4-triazolate in ethanol at room temperature for 1 minute. The cathodes were then dried at 130° C. overnight. SEM (scanning electron microscopy) and EDS (energy dispersive x-ray spectroscopy) analysis showed uniform distribution of cobalt and nitrogen on the surface of the cathodes. The presence and uniform distribution of the nitrogen (from the potassium 1H-1,2,4-triazolate) and the cobalt (from the NCM 811 cathodes) demonstrates that the potassium 1H-1,2,4-triazolate additives were incorporated into the SEI layer on the NCM 811 cathode.

Electrochemical cells ("Example 2") were made with these treated NCM 811 cathodes, vacuum deposited lithium as anode, and an ENTEK EP separator. The cells were filled with 0.55 g of an electrolyte (a 1M solution of LiPF$_6$ in a mixture of dimethylcarbonate/fluoroethylenecarbonate (4:1 w/w) with 1 wt. % of lithium bis(oxalatoborate)).

Two groups of control electrochemical cells were made, which were identical to the Example 2 electrochemical cell, except that the NCM 811 cathode of Control Group 1 was left untreated and Control Group 2 was only treated with benzonitrile/ethanol.

All the electrochemical cells were charged to 4.5 V with 30 mA current, and discharged to 3.2 V with 120 mA current. All of the electrochemical cells showed 400 mAh capacity during third discharge, which was taken as the initial capacity. Table 1 shows how many cycles were completed for each of the studied electrochemical cells before the capacity decreased to 250 mAh (62.5% initial capacity).

TABLE 1

Performance of Electrochemical Cells

| Electrochemical Cell | # Cycles to 250 mAh Capacity |
|---|---|
| Control Group 1 | 296 |
| Control Group 2 | 324 |
| Treated with copper(II) triflate and potassium 1H-1,2,4-triazolate | 358 |
| Treated with zinc triflate and potassium 1H-1,2,4-triazolate | 353 |
| Treated with nickel(II) triflate and potassium 1H-1,2,4-triazolate | 460 |
| Treated with cobalt(II) triflate and potassium 1H-1,2,4-triazolate | 377 |
| Treated with calcium triflate and potassium 1H-1,2,4-triazolate | 347 |

Accordingly, treating the cathodes with metal triflates and potassium 1H-1,2,4-triazolate resulted in 107-155% the number of cycles before reaching a capacity that was 80% of the initial capacity compared to the untreated controls.

Example 3

This Example describes the fabrication of NCM 811 cathodes treated with potassium 1H-1,2,4-triazolate. This Example demonstrates that the potassium 1H-1,2,4-triazolate additive was incorporated into the SEI layer on the NCM 811 cathode and remained there during cycling.

NCM 811 cathodes were treated by dipping them into a 1 wt. % solution of potassium 1H-1,2,4-triazolate in ethanol at room temperature for 1-2 minutes. The treated cathodes were dried at room temperature until the ethanol evaporated and were then dried at 130° C. overnight. Electrochemical cells ("Example 3") were then made with these treated NCM 811 cathodes, vacuum deposited lithium as anode, and an ENTEK EP separator. The cells were filled with 0.55 g of an electrolyte (a 1M solution of LiPF$_6$ in a mixture of dimethylcarbonate/fluoroethylenecarbonate (4:1 w/w) with 1 wt. % of lithium bis(oxalatoborate)).

All of the electrochemical cells were charged to 4.5 V with 30 mA current, and discharged to 3.2 V with 120 mA current. After 20 charge-discharge cycles, the cathodes were removed from the electrochemical cells. The cathodes were rinsed with dimethyl carbonate and dried at room temperature. The surfaces of the cathodes were analyzed with EDS (energy dispersive x-ray spectroscopy). EDS analysis identified 0.517 atomic % of nitrogen on the surface of the cathodes, demonstrating that the potassium 1H-1,2,4-triazolate additive was incorporated into the SEI layers of the NCM811 cathodes and remained there during cycling.

Example 4

This Example describes the fabrication of LCO cathodes with potassium 1H-1,2,4-triazolate. This Example demonstrates that the addition of potassium 1H-1,2,4-triazolate to the cathode slurry when making the cathode resulted in increased cycle life.

A LCO cathode slurry was made containing 40 wt. % solid components and 60 wt. % of NMP (N-methyl-2-pyrrolidone) solvent. The solid components included 95 wt. % of LCO, 2 wt. % of binder (PVDF) and 3 wt. % of carbon black and graphite. Potassium 1H-1,2,4-triazolate was then added to the LCO cathode slurry in an amount of 0.53 wt % relative to the total solid components to form a mixture.

The mixture was coated on a 20 micron thick aluminum foil substrate and then dried, forming a cathode. The cathode was assembled into electrochemical cells as in Example 1. The electrochemical cells were charged at 75 mA to 4.55 V and discharged at 300 mA to 3.2 V. The electrochemical cells delivered 410-411 mAh of initial capacity. The cells completed 137 charge-discharge cycles before capacity was decreased to 250 mAh (approximately 61% initial capacity).

Identical cathodes and electrochemical cells were made except without the addition of potassium 1H-1,2,4-triazolate into the LCO cathode slurry. These electrochemical cells delivered 410-412 mAh of initial capacity and completed 93 charge-discharge cycles before capacity was decreased to 250 mAh (approximately 61% initial capacity).

Accordingly, the addition of potassium 1H-1,2,4-triazolate resulted in approximately 147% the number of cycles before reaching a capacity that was 61% of the initial capacity compared to the controls without the addition of potassium 1H-1,2,4-triazolate.

Example 5

This Example describes the fabrication of NCM 811 cathodes treated with cobalt nitrate and potassium 1H-1,2,4-triazolate. This Example demonstrates that both the cobalt nitrate and potassium 1H-1,2,4-triazolate additives were incorporated into the SEI layer on the NCM 811 cathode.

NCM 811 cathodes were treated by dipping them into a solution of 5 wt. % cobalt nitrate in ethanol for 30 seconds. The cathodes were dried at room temperature for 20 minutes and then treated with a solution of 1 wt. % potassium 1H-1,2,4-triazolate in ethanol at room temperature for 1 minute. The treated cathodes were dried at 130° C. overnight. The surfaces of the cathodes were analyzed with SEM (scanning electron microscopy) and EDS (energy dispersive x-ray spectroscopy). EDS analysis showed uniform distribution of cobalt and nitrogen on the surface of the cathode, indicating that the cobalt nitrate and potassium 1H-1,2,4-triazolate additives were incorporated into SEI layers on the NCM811 cathodes.

Example 6

This Example describes the synthesis of potassium triazolate. A solution of 6.57 g of 1H-1,2,4-triazole dissolved in 150 mL anhydrous tetrahydrofuran was prepared. At room temperature, under argon, and with constant stirring, 3.82 g of potassium hydride was added portionwise to this solution. The resultant reaction mixture was stirred for 1 hour, and then the product was recovered by filtration in an inert atmosphere. After filtration, the product was washed with 20 mL of tetrahydrofuran and then dried under vacuum at 130° C. overnight. 9.4 g of potassium triazolate was recovered at a yield of 92.2%. The potassium triazolate had a melting point of 246-247° C. When analyzed by $^1$H NMR in MeOH-d$_4$ at 400 MHz, the potassium triazolate showed a singlet peak at 7.92 ppm. When analyzed by $^{13}$C NMR in MeOH-d$_4$ at 100 MHz, the potassium triazolate showed a peak at 150.37 ppm.

Example 7

This Example describes the synthesis of lithium triazolate. A solution of 10.78 g of 1H-1,2,4-triazole dissolved in 150 mL anhydrous tetrahydrofuran was prepared. At room temperature, under argon, and with constant stirring, 62.4 mL of a 2.5 M solution of butyl lithium in hexane was added dropwise to this solution. The resultant reaction mixture was stirred for 1 hour, and then the product was recovered by filtration in an inert atmosphere. After filtration, the product was washed with 20 mL of tetrahydrofuran and then dried under vacuum at 130° C. overnight. 9.4 g of lithium triazolate was recovered at a yield of 80.3%. The lithium triazolate had a melting point of 261-262° C. When analyzed by $^1$H NMR in MeOH-d$_4$ at 400 MHz, the lithium triazolate showed a singlet peak at 7.91 ppm. When analyzed by $^{13}$C NMR in MeOH-d$_4$ at 100 MHz, the lithium triazolate showed a peak at 150.20 ppm.

Example 8

This Example describes the effects of combining an electrolyte comprising potassium 1H-1,2,4-triazolate with Example 4 (i.e., an LCO cathode comprising potassium 1H-1,2,4-triazolate) in an electrochemical cell. This Example demonstrates that the addition of an electrolyte comprising potassium 1H-1,2,4-triazolate increased the cycle life of Example 4 even further.

The electrochemical cells were made according to Example 4, but filled with 0.55 g of an electrolyte containing 2% wt of potassium 1H-1,2,4-triazolate. The electrolyte was prepared by addition of 2 wt % potassium 1H-1,2,4-triazolate to the electrolyte of Example 1.

The electrochemical cells were charged at 30 mA to 4.55 V and discharged at 120 mA to 3.2 V. The electrochemical cells delivered 407 mAh of initial capacity. The cells completed 289 charge-discharge cycles before capacity was decreased to 250 mAh (approximately 61% initial capacity) compared to the 137 charge-discharge cycles (charged at 75 mA to 4.55 V and discharged at 300 mA to 3.2 V) completed by Example 4 without the electrolyte comprising potassium 1H-1,2,4-triazolate.

The following applications are incorporated herein by reference, in their entirety, for all purposes: U.S. Patent Publication No. US 2007/0221265, published on Sep. 27, 2007, filed as application Ser. No. 11/400,781 on Apr. 6, 2006, and entitled "Rechargeable Lithium/Water, Lithium/Air Batteries"; U.S. Patent Publication No. US 2009/0035646, published on Feb. 5, 2009, filed as application Ser. No. 11/888,339 on Jul. 31, 2007, and entitled "Swelling Inhibition in Batteries"; U.S. Patent Publication No. US 2010/0129699, published on May 17, 2010, filed as application Ser. No. 12/312,674 on Feb. 2, 2010, patented as U.S. Pat. No. 8,617,748 on Dec. 31, 2013, and entitled "Separation of Electrolytes"; U.S. Patent Publication No. US 2010/0291442, published on Nov. 18, 2010, filed as application Ser. No. 12/682,011 on Jul. 30, 2010, patented as U.S. Pat. No. 8,871,387 on Oct. 28, 2014, and entitled "Primer for Battery Electrode"; U.S. Patent Publication No. US 2009/0200986, published on Aug. 31, 2009, filed as application Ser. No. 12/069,335 on Feb. 8, 2008, patented as U.S. Pat. No. 8,264,205 on Sep. 11, 2012, and entitled "Circuit for Charge and/or Discharge Protection in an Energy-Storage Device"; U.S. Patent Publication No. US 2007/0224502, published on Sep. 27, 2007, filed as application Ser. No. 11/400,025 on Apr. 6, 2006, patented as U.S. Pat. No. 7,771,870 on Aug. 10, 2010, and entitled "Electrode Protection in Both Aqueous and Non-Aqueous Electrochemical cells, Including Rechargeable Lithium Batteries"; U.S. Patent Publication No. US 2008/0318128, published on Dec. 25, 2008, filed as application Ser. No. 11/821,576 on Jun. 22, 2007, and entitled "Lithium Alloy/Sulfur Batteries"; U.S. Patent Publication No. US 2002/0055040, published on May 9, 2002, filed as application Ser. No. 09/795,915 on Feb. 27, 2001, patented as U.S. Pat. No. 7,939,198 on May 10, 2011, and entitled "Novel Composite Cathodes, Electrochemical Cells Comprising Novel Composite Cathodes, and Processes for Fabricating Same"; U.S. Patent Publication No. US 2006/0238203, published on Oct. 26, 2006, filed as application Ser. No. 11/111,262 on Apr. 20, 2005, patented as U.S. Pat. No. 7,688,075 on Mar. 30, 2010, and entitled "Lithium Sulfur Rechargeable Battery Fuel Gauge Systems and Methods"; U.S. Patent Publication No. US 2008/0187663, published on Aug. 7, 2008, filed as application Ser. No. 11/728,197 on Mar. 23, 2007, patented as U.S. Pat. No. 8,084,102 on Dec. 27, 2011, and entitled "Methods for Co-Flash Evaporation of Polymerizable Monomers and Non-Polymerizable Carrier Solvent/Salt Mixtures/Solutions"; U.S. Patent Publication No. US 2011/0006738, published on Jan. 13, 2011, filed as application Ser. No. 12/679,371 on Sep. 23, 2010, and entitled "Electrolyte Additives for Lithium Batteries and Related Methods"; U.S. Patent Publication No. US 2011/0008531, published on Jan. 13, 2011, filed as application Ser. No. 12/811,576 on Sep. 23, 2010, patented as U.S. Pat. No. 9,034,421 on May 19, 2015, and entitled "Methods of Forming Electrodes Comprising Sulfur and Porous Material Comprising Carbon"; U.S. Patent Publication No. US 2010/0035128, published on Feb. 11, 2010, filed as application Ser. No. 12/535,328 on Aug. 4, 2009, patented as U.S. Pat. No. 9,105,938 on Aug. 11, 2015, and entitled "Application of Force in Electrochemical Cells"; U.S. Patent Publication No. US 2011/0165471, published on Jul. 15, 2011, filed as application Ser. No. 12/180,379 on Jul. 25, 2008, and entitled "Protection of Anodes for Electrochemical Cells"; U.S. Patent Publication No. US 2006/0222954, published on Oct. 5, 2006, filed as application Ser. No. 11/452,445 on Jun. 13, 2006, patented as U.S. Pat. No. 8,415,054 on Apr. 9, 2013, and entitled "Lithium Anodes for Electrochemical Cells"; U.S. Patent Publication No. US 2010/0239914, published on Sep. 23, 2010, filed as application Ser. No. 12/727,862 on Mar. 19, 2010, and entitled "Cathode for Lithium Battery"; U.S. Patent Publication No. US 2010/0294049, published on Nov. 25, 2010, filed as application Ser. No. 12/471,095 on May 22, 2009, patented as U.S. Pat. No. 8,087,309 on Jan. 3, 2012, and entitled "Hermetic Sample Holder and Method for Performing Microanalysis under Controlled Atmosphere Environment"; U.S. Patent Publication No. US 2011/00765560, published on Mar. 31, 2011, filed as application Ser. No. 12/862,581 on Aug. 24, 2010, and entitled "Electrochemical Cells Comprising Porous Structures Comprising Sulfur"; U.S. Patent Publication No. US 2011/0068001, published on Mar. 24, 2011, filed as application Ser. No. 12/862,513 on Aug. 24, 2010, and entitled "Release System for Electrochemical Cells"; U.S. Patent Publication No. US 2012/0048729, published on Mar. 1, 2012, filed as application Ser. No. 13/216,559 on Aug. 24, 2011, and entitled "Electrically Non- Conductive Materials for Electrochemical Cells"; U.S. Patent Publication No. US 2011/0177398, published on Jul. 21, 2011, filed as application Ser. No. 12/862,528 on Aug. 24, 2010, and entitled "Electrochemical Cell"; U.S. Patent Publication No. US 2011/0070494, published on Mar. 24, 2011, filed as application Ser. No. 12/862,563 on Aug. 24, 2010, and entitled "Electrochemical Cells Comprising Porous Structures Comprising Sulfur"; U.S. Patent Publication No. US 2011/0070491, published on Mar. 24, 2011, filed as application Ser. No. 12/862,551 on Aug. 24, 2010, and entitled "Electrochemical Cells Comprising Porous Structures Comprising Sulfur"; U.S. Patent Publication No. US 2011/0059361, published on Mar. 10, 2011, filed as application Ser. No. 12/862,576 on Aug. 24, 2010, patented as U.S. Pat. No. 9,005,009 on Apr. 14, 2015, and entitled "Electrochemical Cells Comprising Porous Structures Comprising Sulfur"; U.S. Patent Publication No. US 2012/0070746, published on Mar. 22, 2012, filed as application Ser. No. 13/240,113 on Sep. 22, 2011, and entitled "Low Electrolyte Electrochemical Cells"; U.S. Patent Publication No. US 2011/0206992, published on Aug. 25, 2011, filed as application Ser. No. 13/033,419 on Feb. 23, 2011, and entitled "Porous Structures for Energy Storage Devices"; U.S. Patent Publication No. 2013/0017441, published on Jan. 17, 2013, filed as application Ser. No. 13/524,662 on Jun. 15, 2012, patented as U.S. Pat. No. 9,548,492 on Jan. 17, 2017, and entitled "Plating Technique for Electrode"; U.S. Patent Publication No. US 2013/0224601, published on Aug. 29, 2013, filed as application Ser. No. 13/766,862 on Feb. 14, 2013, patented as U.S. Pat. No. 9,077,041 on Jul. 7, 2015, and entitled "Electrode Structure for Electrochemical Cell"; U.S. Patent Publication No. US 2013/0252103, published on Sep. 26, 2013, filed as application Ser. No. 13/789,783 on Mar. 8, 2013, patented as U.S. Pat. No. 9,214,678 on Dec. 15, 2015, and entitled "Porous Support Structures, Electrodes Containing Same, and Associated Methods"; U.S. Patent Publication No. US 2013/0095380, published on Apr. 18, 2013, filed as application Ser. No. 13/644,933 on Oct. 4, 2012, patented as U.S. Pat. No. 8,936,870 on Jan. 20, 2015, and entitled "Electrode Structure and Method for Making the Same"; U.S. Patent Publication No. US 2014/0123477, published on May 8, 2014, filed as application Ser. No. 14/069,698 on Nov. 1, 2013, patented as U.S. Pat. No. 9,005,311 on Apr. 14, 2015, and entitled "Electrode Active Surface Pretreatment"; U.S. Patent Publication No. US 2014/0193723, published on Jul. 10, 2014, filed as application Ser. No. 14/150,156 on Jan. 8, 2014, patented as U.S. Pat. No. 9,559,348 on Jan. 31, 2017, and entitled "Conductivity Control in Electrochemical Cells"; U.S. Patent Publication No. US 2014/0255780, published on Sep. 11, 2014, filed as application Ser. No. 14/197,782 on Mar. 5, 2014, patented as U.S. Pat. No. 9,490,478 on Nov. 6, 2016, and entitled "Electrochemical Cells Comprising Fibril Materials"; U.S. Patent Publication No. US 2014/0272594, published on Sep. 18, 2014, filed as application Ser. No. 13/833,377 on Mar. 15, 2013, and entitled "Protective Structures for Electrodes"; U.S. Patent Publication No. US 2014/0272597, published on Sep. 18, 2014, filed as application Ser. No. 14/209,274 on Mar. 13, 2014, and entitled "Protected Electrode Structures and Methods"; U.S. Patent Publication No. US 2014/0193713, published on Jul. 10, 2014, filed as application Ser. No. 14/150,196 on Jan. 8, 2014, patented as U.S. Pat. No. 9,531,009 on Dec. 27, 2016, and entitled "Passivation of Electrodes in Electrochemical Cells"; U.S. Patent Publication No. US 2014/0272565, published on Sep. 18, 2014, filed as application Ser. No. 14/209,396 on Mar. 13, 2014, and entitled "Protected Electrode Structures"; U.S. Patent Publication No. US 2015/0010804, published on Jan. 8, 2015, filed as application Ser. No. 14/323,269 on Jul. 3, 2014, and entitled "Ceramic/Polymer Matrix for Electrode Protection in Electrochemical Cells, Including Rechargeable Lithium Batteries"; U.S. Patent Publication No. US 2015/044517, published on Feb. 12, 2015, filed as application Ser. No. 14/455,230 on Aug. 8, 2014, and entitled "Self-Healing Electrode Protection in Electrochemical Cells"; U.S. Patent Publication No. US 2015/0236322, published on Aug. 20, 2015, filed as application Ser. No. 14/184,037 on Feb. 19, 2014, and entitled "Electrode Protection Using Electrolyte-Inhibiting Ion Conductor"; U.S. Patent Publication No. US 2016/0072132, published on Mar. 10, 2016, filed as application Ser. No. 14/848,659 on Sep. 9, 2015, and entitled "Protective Layers in Lithium-Ion Electrochemical Cells and Associated Electrodes and Methods"; U.S. patent application Ser. No. 16/670,933, filed Oct. 31, 2019, entitled "System And Method For Operating A Rechargeable Electrochemical Cell Or Battery"; U.S. patent application Ser. No. 16/527,903, filed Jul. 31, 2019, published as U.S. Pub. No. US2020-0044460, and entitled "Multiplexed Charge Discharge Battery Management System"; U.S. patent application Ser. No. 16/670,905, filed Oct. 31, 2019, entitled "System And Method For Operating A Rechargeable Electrochemical Cell Or Battery"; and International Patent Apl. Serial No. PCT/US2019/059142, filed Oct. 31, 2019, entitled "System And Method For Operating A Rechargeable Electrochemical Cell Or Battery". All other patents and patent applications disclosed herein are also incorporated by reference in their entirety for all purposes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell, comprising:
   a first electrode; and
   a second electrode comprising a species comprising a conjugated, negatively-charged ring comprising a nitrogen atom and/or a reaction product thereof, wherein the second electrode comprises a transition metal.

2. The electrochemical cell of claim 1, further comprising a protective later disposed on the second electrode, wherein the protective layer disposed on the second electrode comprises the species and/or the reaction product.

3. The electrochemical cell of claim 1, wherein the reaction product comprises a reaction product between the transition metal and the species.

4. The electrochemical cell of claim 1, wherein the reaction product comprises a reaction product between the species and a second species, wherein the second species comprises a labile halogen atom.

5. An electrochemical cell, comprising:
   a first electrode; and
   a second electrode comprising a species comprising a conjugated, negatively-charged ring comprising a nitrogen atom and/or a reaction product thereof, wherein the species comprises substituted or unsubstituted 1,2,4-triazole, 1,2,3-triazole, 1,3,4-triazole, pyrazole, imidazole, tetrazole, benzimidazole, indazole, and/or benzotriazole.

6. The electrochemical cell of claim 5, wherein the second electrode comprises a transition metal.

7. A method, comprising:
   exposing an electrode comprising a transition metal to a solution comprising a species comprising a conjugated, negatively-charged ring comprising a nitrogen atom; and
   forming a protective layer disposed on the electrode, wherein the protective layer comprises the species and/or a reaction product thereof.

8. The method of claim 7, wherein the species is present in the solution in an amount of greater than or equal to 0.1 wt. % and less than or equal to 5 wt. %.

9. The method of claim 7, wherein the solution further comprises a second species comprising a labile halogen atom.

10. The method of claim 9, wherein the solution comprises greater than or equal to 5 wt % and less than or equal to 50 wt. % of the second species.

11. The method of claim 7, wherein the electrode comprises electroactive material and the electroactive material comprises a surface, and the exposing the electrode to the solution comprises wetting greater than or equal to 80% of the surface of the electrode active material.

12. The method of claim 7, wherein the exposing the electrode to the solution is:
   (a) at a temperature greater than or equal to 0° C. and less than or equal to 40° C.;
   (b) for greater than or equal to 30 seconds and less than or equal to 5 minutes; and/or
   (c) under vacuum.

13. The method of claim 7, further comprising drying the electrode, wherein the drying comprises drying at a temperature for a duration of time and (a) the temperature is greater than or equal to room temperature and less than or equal to 150° C.; and/or (b) the duration of time is greater than or equal to 1 second and less than or equal to 24 hours.

14. A method, comprising:

combining an electrode material comprising a transition metal with a species comprising a conjugated, negatively-charged ring comprising a nitrogen atom to form a mixture, coating a metal substrate with the mixture, and drying the mixture to form an electrode.

15. The method of claim 14, wherein a protective layer is disposed on the electrode, and wherein the protective layer comprises the species and/or a reaction product thereof.

16. The method of claim 14, wherein the mixture comprises greater than or equal to 0.1 wt. % and less than or equal to 20 wt. % of the species.

17. The method of claim 14, wherein the mixture comprises a solid component and a liquid component.

18. The method of claim 17, wherein:

(a) the mixture comprises greater than or equal to 10 wt % and less than or equal to 50 wt. % of the solid component;

(b) the electrode material and/or solid component comprises a metal and/or metal oxide;

(c) the electrode material and/or solid component comprises greater than or equal to 80 wt. % metal and/or metal oxide;

(d) the electrode material and/or solid component comprises a binder;

(e) the electrode material and/or solid component comprises greater than or equal to 0.1 wt. % binder and less than or equal to 10 wt. % binder;

(f) the electrode material and/or solid component comprises carbon-based materials; and/or (g) the electrode material and/or solid component comprises greater than or equal to 0.1 wt. % and less than or equal to 10 wt. % carbon-based materials.

19. The method of claim 17, wherein the liquid component comprises an organic solvent.

20. The method of claim 14, wherein the metal substrate comprises aluminum, an aluminum alloy, and/or a metallized polymer film and/or wherein the metal substrate has a thickness of greater than or equal to 4 microns and less than or equal to 50 microns.

* * * * *